United States Patent
Frayne et al.

(10) Patent No.: US 12,357,950 B2
(45) Date of Patent: *Jul. 15, 2025

(54) DURABLE GRAPHENE OXIDE MEMBRANES

(71) Applicant: Via Separations, Inc., Watertown, MA (US)

(72) Inventors: Stephen Frayne, Wayland, MA (US); Michelle MacLeod, Boston, MA (US); Brandon Ian MacDonald, Maynard, MA (US); Lymaris Ortiz Rivera, Cambridge, MA (US); Brent Keller, Somerville, MA (US)

(73) Assignee: Via Separations, Inc., Watertown, MA (US)

( * ) Notice: Subject to any disclaimer, the term of this patent is extended or adjusted under 35 U.S.C. 154(b) by 73 days.

This patent is subject to a terminal disclaimer.

(21) Appl. No.: 17/960,440

(22) Filed: Oct. 5, 2022

(65) Prior Publication Data

US 2023/0173435 A1 Jun. 8, 2023

Related U.S. Application Data

(63) Continuation of application No. 17/380,566, filed on Jul. 20, 2021, now Pat. No. 11,498,034, which is a
(Continued)

(51) Int. Cl.
*B01D 71/02* (2006.01)
*B01D 67/00* (2006.01)
(Continued)

(52) U.S. Cl.
CPC ...... *B01D 71/0211* (2022.08); *B01D 67/0069* (2013.01); *B01D 67/00793* (2022.08);
(Continued)

(58) Field of Classification Search
None
See application file for complete search history.

(56) References Cited

U.S. PATENT DOCUMENTS

| 3,457,171 A | 7/1969 | Flowers et al. |
| 3,839,201 A | 10/1974 | Miller |

(Continued)

FOREIGN PATENT DOCUMENTS

| CN | 106064023 A | 11/2016 |
| CN | 106345466 A | 1/2017 |

(Continued)

OTHER PUBLICATIONS

Abraham et al., "Tunable sieving of ions using graphene oxide membranes," Nature Nanotechnology, 12:546-550 (2017), including Methods, 1 page.
(Continued)

*Primary Examiner* — Ryan B Huang
(74) *Attorney, Agent, or Firm* — Cooley LLP

(57) ABSTRACT

Embodiments described herein relate generally to durable graphene oxide membranes for fluid filtration. For example, the graphene oxide membranes can be durable under high temperatures non-neutral pH, and/or high pressures. One aspect of the present disclosure relates to a filtration apparatus comprising: a support substrate, and a graphene oxide membrane disposed on the support substrate. The graphene oxide membrane has a first lactose rejection rate of at least 50% with a first 1 wt % lactose solution at room temperature. The graphene oxide membrane has a second lactose rejection rate of at least 50% with a second 1 wt % lactose solution at room temperature after the graphene oxide membrane is contacted with a solution that is at least 80° C. for a period of time.

16 Claims, 16 Drawing Sheets

Related U.S. Application Data continuation of application No. 16/887,555, filed on May 29, 2020, now Pat. No. 11,097,227, and a continuation of application No. PCT/US2020/033246, filed on May 15, 2020.

(60) Provisional application No. 62/910,789, filed on Oct. 4, 2019, provisional application No. 62/848,014, filed on May 15, 2019.

(51) Int. Cl.
*B01D 69/10* (2006.01)
*B01D 69/12* (2006.01)

(52) U.S. Cl.
CPC ....... *B01D 67/0093* (2013.01); *B01D 69/107* (2022.08); *B01D 69/125* (2013.01); *B01D 2323/36* (2013.01); *B01D 2325/20* (2013.01)

(56) References Cited

U.S. PATENT DOCUMENTS

| | | | |
|---|---|---|---|
| 4,337,154 A | 6/1982 | Fukuchi et al. |
| 4,767,422 A | 8/1988 | Bikson et al. |
| 4,894,160 A | 1/1990 | Abe et al. |
| 5,224,972 A | 7/1993 | Frye et al. |
| 5,352,272 A | 10/1994 | Moll et al. |
| 5,368,889 A | 11/1994 | Johnson et al. |
| 5,538,536 A | 7/1996 | Fuentes et al. |
| 5,762,685 A | 6/1998 | Baker et al. |
| 5,888,272 A | 3/1999 | Prasad et al. |
| 6,117,341 A | 9/2000 | Bray et al. |
| 6,365,041 B1 | 4/2002 | Hoadley |
| 6,730,145 B1 | 5/2004 | Li |
| 8,177,978 B2 | 5/2012 | Kurth et al. |
| 8,231,013 B2 | 7/2012 | Chu et al. |
| 8,361,321 B2 | 1/2013 | Stetson et al. |
| 8,376,100 B2 | 2/2013 | Avadhany et al. |
| 8,476,510 B2 | 7/2013 | Swager et al. |
| 8,709,213 B2 | 4/2014 | Compton et al. |
| 9,795,930 B2 | 10/2017 | Lai et al. |
| 9,844,758 B2 | 12/2017 | Nair et al. |
| 9,902,141 B2 | 2/2018 | Mi et al. |
| 10,500,546 B2 | 12/2019 | Sinsabaugh et al. |
| 10,653,824 B2 | 5/2020 | Bedworth et al. |
| 10,894,725 B1 | 1/2021 | Arnold et al. |
| 10,974,208 B2 | 4/2021 | Dave et al. |
| 11,097,227 B2 | 8/2021 | Frayne et al. |
| 11,123,694 B2 | 9/2021 | Macleod et al. |
| 11,465,398 B2 | 10/2022 | Mi et al. |
| 11,484,838 B2 | 11/2022 | Rashidi et al. |
| 11,498,034 B2 | 11/2022 | Frayne et al. |
| 11,913,692 B2 | 2/2024 | Vanzandt et al. |
| 2002/0088748 A1 | 7/2002 | Allcock et al. |
| 2003/0185741 A1 | 10/2003 | Matyjaszewski et al. |
| 2004/0211726 A1 | 10/2004 | Baig et al. |
| 2006/0016751 A1 | 1/2006 | Ali et al. |
| 2006/0201884 A1 | 9/2006 | Kulprathipanja et al. |
| 2007/0017861 A1 | 1/2007 | Foley et al. |
| 2008/0020197 A1 | 1/2008 | Ayers |
| 2008/0149561 A1 | 6/2008 | Chu et al. |
| 2009/0000651 A1 | 1/2009 | Qiao |
| 2009/0120874 A1 | 5/2009 | Jensen et al. |
| 2009/0155678 A1 | 6/2009 | Less et al. |
| 2010/0194474 A1 | 8/2010 | Ishikawa et al. |
| 2011/0056892 A1 | 3/2011 | Strauss et al. |
| 2011/0108521 A1 | 5/2011 | Woo et al. |
| 2011/0133134 A1 | 6/2011 | Varma et al. |
| 2011/0139707 A1 | 6/2011 | Siwy et al. |
| 2011/0186786 A1 | 8/2011 | Scheffer et al. |
| 2011/0189452 A1 | 8/2011 | Lettow et al. |
| 2011/0223494 A1 | 9/2011 | Feaver et al. |
| 2012/0000845 A1 | 1/2012 | Park et al. |
| 2012/0048804 A1 | 3/2012 | Stetson et al. |
| 2012/0108418 A1 | 5/2012 | Nair et al. |
| 2012/0152840 A1 | 6/2012 | Fujita et al. |
| 2012/0171376 A1 | 7/2012 | Dodge |
| 2012/0186980 A1 | 7/2012 | Ramaprabhu et al. |
| 2012/0255899 A1 | 10/2012 | Choi et al. |
| 2012/0267064 A1 | 10/2012 | Joensson et al. |
| 2012/0295091 A1 | 11/2012 | Pasquali et al. |
| 2013/0040283 A1 | 2/2013 | Star et al. |
| 2013/0105417 A1 | 5/2013 | Stetson et al. |
| 2013/0192460 A1 | 8/2013 | Miller et al. |
| 2013/0270188 A1 | 10/2013 | Karnik et al. |
| 2013/0305927 A1 | 11/2013 | Choi et al. |
| 2013/0309776 A1 | 11/2013 | Drndic et al. |
| 2013/0314844 A1 | 11/2013 | Chen et al. |
| 2014/0026820 A1 | 1/2014 | Casto et al. |
| 2014/0030482 A1 | 1/2014 | Miller et al. |
| 2014/0138314 A1 | 5/2014 | Liu et al. |
| 2014/0199777 A2 | 7/2014 | Ruiz et al. |
| 2014/0242496 A1 | 8/2014 | Ryu et al. |
| 2014/0262820 A1 | 9/2014 | Kuan et al. |
| 2014/0272286 A1 | 9/2014 | Stoltenberg et al. |
| 2014/0311967 A1 | 10/2014 | Grossman et al. |
| 2014/0332814 A1 | 11/2014 | Peng et al. |
| 2014/0374267 A1 | 12/2014 | Monteiro et al. |
| 2015/0010714 A1 | 1/2015 | Appleton et al. |
| 2015/0122727 A1 | 5/2015 | Karnik et al. |
| 2015/0224451 A1 | 8/2015 | Miyahara et al. |
| 2015/0258506 A1 | 9/2015 | Mi et al. |
| 2015/0273401 A1 | 10/2015 | Miller et al. |
| 2015/0298115 A1 | 10/2015 | Campidelli et al. |
| 2016/0009049 A1 | 1/2016 | Stoltenberg et al. |
| 2016/0051942 A1 | 2/2016 | Park et al. |
| 2016/0339160 A1* | 11/2016 | Bedworth ........... H01J 37/3056 |
| 2016/0354729 A1 | 12/2016 | Krishna et al. |
| 2017/0015692 A1 | 1/2017 | Samec et al. |
| 2017/0021366 A1 | 1/2017 | Chapman et al. |
| 2017/0154975 A1 | 6/2017 | Liu et al. |
| 2017/0157570 A1 | 6/2017 | Chu et al. |
| 2017/0174537 A1* | 6/2017 | Zheng ................. B01D 69/12 |
| 2017/0298121 A1 | 10/2017 | Bullock et al. |
| 2017/0341034 A1 | 11/2017 | Dave et al. |
| 2017/0368508 A1 | 12/2017 | Grossman et al. |
| 2018/0001267 A1 | 1/2018 | Lee et al. |
| 2018/0036690 A1* | 2/2018 | Saleh ............... B01D 67/00933 |
| 2018/0071684 A1 | 3/2018 | Nair et al. |
| 2018/0326362 A1 | 11/2018 | Niu et al. |
| 2019/0224628 A1 | 7/2019 | Lin et al. |
| 2019/0283388 A1 | 9/2019 | Mi et al. |
| 2019/0314770 A1 | 10/2019 | Wang et al. |
| 2020/0261861 A1 | 8/2020 | Zheng et al. |
| 2020/0360868 A1 | 11/2020 | Macleod et al. |
| 2020/0360869 A1 | 11/2020 | Frayne et al. |
| 2020/0376442 A1 | 12/2020 | Zheng et al. |
| 2021/0086142 A1 | 3/2021 | Liu |
| 2021/0162336 A1 | 6/2021 | Terrien et al. |
| 2021/0229048 A1 | 7/2021 | Zheng et al. |
| 2021/0354094 A1 | 11/2021 | Frayne et al. |
| 2021/0370242 A1 | 12/2021 | Macleod et al. |
| 2021/0394127 A1 | 12/2021 | Ho et al. |
| 2023/0130300 A1 | 4/2023 | Andreeva-Baeumler et al. |
| 2023/0249137 A1 | 8/2023 | Frayne et al. |
| 2023/0258378 A1 | 8/2023 | Vanzandt et al. |

FOREIGN PATENT DOCUMENTS

| | | |
|---|---|---|
| CN | 105617882 B | 10/2018 |
| CN | 106345466 B | 5/2020 |
| DE | 102010001504 A1 | 8/2011 |
| EP | 2511002 A1 | 10/2012 |
| JP | 2018506418 A | 3/2018 |
| KR | 20180000781 A | 1/2018 |
| KR | 20220083902 A | 6/2022 |
| WO | WO-2010030382 A1 | 3/2010 |
| WO | WO-2010043914 A2 | 4/2010 |
| WO | WO-2010126686 A2 | 11/2010 |
| WO | WO-2014152407 A1 | 9/2014 |
| WO | WO-2015075451 A1 | 5/2015 |
| WO | WO-2016011124 A1 | 1/2016 |
| WO | WO-2016189320 A1 | 12/2016 |
| WO | WO-2017106540 A1 | 6/2017 |

(56) References Cited

FOREIGN PATENT DOCUMENTS

| | | |
|---|---|---|
| WO | WO-2017197205 A1 | 11/2017 |
| WO | WO-2017201482 A1 | 11/2017 |
| WO | WO-2018067269 A1 | 4/2018 |
| WO | WO-2018150690 A1 | 8/2018 |
| WO | WO-2018160871 A2 | 9/2018 |
| WO | WO-2019028280 A1 | 2/2019 |
| WO | WO-2020232395 A1 | 11/2020 |
| WO | WO-2020232398 A1 | 11/2020 |
| WO | WO-2023064859 A1 | 4/2023 |
| WO | WO-2023097166 A1 | 6/2023 |
| WO | WO-2024077298 A1 | 4/2024 |
| WO | WO-2024151542 A1 | 7/2024 |
| WO | WO-2024173691 A1 | 8/2024 |
| WO | WO-2025035048 A1 | 2/2025 |

OTHER PUBLICATIONS

Aleman et al., "Transfer-Free Batch Fabrication of Large-Area Suspended Graphene Membranes," ACS NANO, 4(8):4762-4768 (2010).
Allen et al., "Honeycomb carbon: a review of graphene," Chem Rev., 110(1):132-145 (2010); doi:10.1021/cr900070d.
An et al., "Separation performance of graphene oxide in aqueous solution," I&EC Research, 55:4803-4810 (2016).
Apel, Invited Talk. "Track etching technique in membrane technology," Radiational Measurements, 34:559-566 (2001).
Bagri et al., "Structural evolution during the reduction of chemically derived graphene oxide," Nat. Chem, 2:581-587 (2010).
Boukai et al., "Efficiency enhancement of copper contaminated radial p—n junction solar cells," Chem Phys Lett., 501:153-158 (2011).
Bourlinos et al., "Graphite oxide: Chemical reduction to graphite and surface modification with primary aliphatic amines and amno acids," Langmuir, 19(15):6050-6055 (2003).
Boutilier et al., "Implications of Permeation Through Intrinsic Defects in Graphene on the Design of Defect-Tolerant Membranes for Gas Separation," ACS Nano, 891:841-849 (2014).
Bowden, "A perspective on resist materials for fine line lithography," Materials for Microlithography, Advances in Chemistry Series, #266, American Chemical Society, Washington, D.C., 1984, Chapter 3:39-117.
Buffle et al., "Metal flux and dynamic speciation at (bio)interfaces. Part 1: Critical evaluation and compilation of physicochemical parameters for complexes with simple ligands and fulvic/humic substances," Environmental Science & Technology, 41(22):7609-7620 (2007).
Burress et al., "Graphene oxide framework materials: Theoretical predictions and experimental results," Ang Chem Intl Ed., 49(47):8902-8904 (2010).
Cath et al., "Forward osmosis: Principles, applications, and recent developments," Journal of Membrane Science, 281(1-2):70-87 (2006).
Chang et al., "Densely packed arrays of ultra-high-aspect-ratio silicon nanowires fabricated using block-copolymer lithography and metal-assisted etching," Adv Funct Mater., 19:2495-2500 (2009).
Choi et al., "Layer-by-Layer assembly of graphene oxide nanosheets on polyamide membranes for durable reverse-osmosis applications," ACS Appl. Mater. Interfaces, 5(23):12510-12519 (2013).
Chowdhury et al., "Fullerenic nanostructures in flames," J Mater Res., 11:341-347 (1996).
Chu, "Plugging up leaky graphene," MIT News Office, May 8, 2015, pp. 1-3; Available at http://news.mit.edu/2015/repair-graphene-leaks-0508.
Chung et al., "Emerging forward osmosis (fo) technologies and challenges ahead for clean water and clean energy applications," Current Opinion in Chemical Engineering, 1(3):246-257 (2012).
Cohen-Tanugi et al., "Mechanical strength of nanoporous graphene as a desalination membrane," Nano Lett., 14:6171-6178 (2014).
Cohen-Tanugi et al., "Quantifying the potential of ultra-permeable membranes for water desalination," Energy & Environmental Science, 7:1134-1141 (2014).
Cohen-Tanugi et al., "Water desalination across nanoporous graphene," Nano Lett., 12(7):3602-3608 (2012).
Dave, "Assessing Graphene Oxide for Water Desalination Applications," Ph.D. Thesis. Submitted to the Department of Mechanical Engineering, Massachusetts Institute of Technology, Jun. 2016, 134 pages.
Decker & Schmitt, "Fine-tuning of the film thickness of ultrathin multilayer films composed of consecutively alternating layers of anionic and cationic polyelectrolytes," In Trends in Colloid and Interface Science VI, Springer, 1992, pp. 160-164.
Decher, "Fuzzy nanoassemblies-toward layered polymeric multicomposites," Science, 277:1232-1237 (1997).
Deng et al., "Developments and new applications of UV-induced surface graft polymerizations," Progress in Polymer Science, 34(2):156-193 (2009).
Dikin et al., "Preparation and characterization of graphene oxide paper," Nature, 448(7152):457-460 (2007).
Dreyer et al., "The chemistry of graphene oxide," Chem Soc Rev, 39(1):228-240 (2010).
Du et al., "Separation of Hydrogen and Nitrogen Gases with Porous Graphene Membrane," J of Physical Chemistry, 115:23261-23266 (2011).
Dubas et al., "Polyelectrolyte multilayers containing a weak polyacid: construction and deconstruction," Macromolecules, 34(11):3736-3740 (2001).
Erickson et al., "Determination of the local chemical structure of graphene oxide and reduced graphene oxide," Adv Mater., 22:4467-4472 (2010).
Fang et al., "Constructing hierarchically structured interphases for strong and tough epoxy nanocomposites by amine-rich graphene surfaces," J Mater Chem., 20(43):9635-9643 (2010).
Fang et al., "Modification of polyethersulfone membrane by grafting bovine serum albumin on the surface of polyethersulfone/poly(acrylonitrile-co-acrylic acid) blended membrane," Journal of Membrane Science, 329:46-55 (2009).
Fang et al., "Pore size control of ultrathin silicon membranes by rapid thermal carbonization," Nano Lett., 10:3904-3908 (2010).
Fischbein et al., "Electron beam nanosculpting of suspended graphene sheets," Applied Physics Letters, 93:113107 (2008); https://doi.org/10.1063/1.2980518.
Georgakilas et al., "Functionalization of graphene: Covalent and non-covalent approaches, derivatives and applications," Chem Rev., 112(11):6156-6214 (2012). Epub Sep. 25, 2012.
Goel et al., "Size analysis of single fullerene molecules by electron microscopy," J Carbon, 42:1907-1915 (2004).
Grantab et al., "Anomalous strength characteristics of tilt grain boundaries in graphene," Science, 330(6006):946-948 (2010).
Hammond, "Recent explorations in electrostatic multilayer thin film assembly," Current Opinion in Colloid & Interface Science, 4(6):430-442 (1999).
Han et al., "Ultrathin graphene nanofiltration membrane for water purification," Advanced Function Materials, 23(29):3693-3700 (2013); doi:10.1002/ADFM.201202601.
Henis et al., "Composite hollow fiber membranes for gas separation: the resistance model approach," Journal of Membrane Science, 8:233-246 (1981).
Herrera-Alonso et al., "Intercalation and stitching of graphite oxide with diaminoalkanes," Langmuir, 23(21):10644-10649 (2007). Epub Sep. 7, 2007.
Hu et al., "Enabling graphene oxide nanosheets as water separation membranes," Env Sci & Technol., 47(8):3715-3723 (2013). Epub Mar. 14, 2013.
Hu et al., "Graphene Oxide Membranes: Layer-by-layer Assembly via Electrostatic Interaction and Elucidation of Water and Solute Transport Mechanisms," Environmental Science & Technology, Univ. of Maryland, 2014, pp. 1-26.
Huang et al., "Graphene-based membranes for molecular separation," J Phys Chem Lett., 6(14):2806-2815 (2015). Epub Jun. 24, 2015.

(56) References Cited

OTHER PUBLICATIONS

Huang et al., "Ultrafast viscous water flow through nanostrand-channelled graphene oxide membranes," Nat Commun., 4:2979 (2013); doi: 10.1038/ncomms3979.
Hummers & Offerman, "Preparation of graphitic oxide," Journal of the American Chemical Society, 80(6):1339-1339 (1958).
Hung W., et al., "Cross-Linking with Diamine Monomers to Prepare Composite Graphene Oxide-Framework Membranes with Varying d-Spacing," Chemistry of Materials, 2014, vol. 26(9), pp. 2983-2990.
Jia et al., "Dicarboxylic acids crosslinked graphene oxide membranes for salt solution permeation," Colloids Surf A: Physicochem Eng Aspects, 494:101-107 (2016). Epub Jan. 19, 2016.
Jia, Z. & Wang, Y., "Covalently crosslinked graphene oxide membranes by esterification reactions for ions separation," J. Mater. Chem. A, 3:4405-4412 (2015).
Jiang et al., "Porous Graphene as the Ultimate Membrane for Gas Separation," Nano Letters, 9(12):4019-4024 (2009).
Jin et al., "Use of polyelectrolyte layer-by-layer assemblies as nanofiltration and reverse osmosis membranes," Langmuir, 19(7):2550-2553 (2003).
Joshi et al., "Graphene oxide: The new membrane material," Appl Mater Today, 1(1):1-12 (2015).
Joshi et al., "Precise and ultrafast molecular sieving through graphene oxide membranes," Science, 343:752-754 (2014).
Kannam et al., "Interfacial slip friction at a fluid-solid cylindrical boundary," The Journal of Chemical Physics, 136(24):244704; doi:10.1063/1.4730167.
Karousis et al., "Graphene oxide with covalently linked porphyrin antennae: Synthesis, characterization and photophysical properties," J mater Chem., 21(1):107-117 (2011). Epub Oct. 4, 2010.
Kemell et al., "Transparent superhydrophobic surfaces by self-assembly of hydrophobic monolayers on nanostructured surfaces," Phys Stat Sol (a), 203:1453-1458 (2006).
Kim et al., "Applications of atomic layer deposition to nanofabrication and emerging nanodevices," Thin Solid Films, 517:2563-2580 (2009).
Kim et al., "Selective gas transport through few-layered graphene and graphene oxide membranes," Science, 342:91-94 (2013).
Kim et al., "Fabrication and Characterization of Large-Area, Semiconducting Nanoperforated Graphene Materials," Nano Letters, 10:1125-1131 (2010); doi:10.1021/nl9032318.
Koenig et al., "Selective Molecular Sieving Through Porous Graphene," Nature Nano Technology, 7:728-732 (2012).
Kotov et al., "Ultrathin graphite oxide-polyelectrolyte composites prepared by self-assembly: Transition between conductive and non-conductive states," Advanced Materials, 8(8):637-641 (1996).
Kovtyukhova et al., "Layer-by-layer assembly of ultrathin composite films from micron-sized graphite oxide sheets and polycations," Chemistry of Materials, 11(3):771-778 (1999).
Krasemann et al., "Self-assembled polyelectrolyte multilayer membranes with highly improved pervaporation separation of ethanol/water mixtures," Journal of Membrane Science, 181(2):221-228 (2001).
Lee et al., "Measurement of the elastic properties and intrinsic strength of monolayer graphene," Science, 321(5887):385-388 (2008).
Lehtinen et al., "Effects of Ion Bombardment on a Two-Dimensional Target: Atomistic Simulations of Graphene Irradiation," Physical Review B, 81:153401.01-153401.04 (2010).
Lerf et al., "Hydration behavior and dynamics of water molecules in graphite oxide," J Phys Chem Sol., 67:1106-1110 (2006).
Li et al., "Processable aqueous dispersions of graphene nanosheets," Nature Nanotechnology, 3(2):101-105 (2008).
Li et al., "Ultrathin, molecular-sieving graphene oxide membranes for selective hydrogen separation," Science, 342:95-98 (2013).
Li, Y. et al., "Mild annealing reduced graphene oxide membrane for nanofiltration," Journal of Membrane Science, 601:117900, 7 pages; doi.org/10.1016/j.memsci.2020.117900.

Liu et al., "Graphene facilitated visible light photodegradation of methylene blue over titanium dioxide photocatalysts," Chem Eng J, 214:298-303 (2013).
Liu et al., "Two-Dimensional-Material Membranes: A New Family of High-Performance Separation Membranes," Angew Chem Int Ed Engl., 55(43):13384-13397 (2016); doi:10.1002/anie.201600438. Epub Jul. 1, 2016.
Malaisamy et al., "High-flux nanofiltration membranes prepared by adsorption of multilayer polyelectrolyte membranes on polymeric supports," Langmuir, 21:10587-10592 (2005).
Marcano et al., "Improved synthesis of graphene oxide," ACS Nano, 4(8):4806-4814 (2010).
Mattevi et al., "Evolution of electrical, chemical, and structural properties of transparent and conducting chemically derived graphene thin films," Adv Funct mater., 19(16):2577-2583 (2009).
Mcginnis et al., "Global challenges in energy and water supply: The promise of engineered osmosis," Environmental Science & Technology, 42(23):8625-8629 (2008).
Mi et al., "Organic fouling of forward osmosis membranes: Fouling reversibility and cleaning without chemical reagents," Journal of Membrane Science, 348(1-2):337-345 (2010).
Mi, "Graphene Oxide Membranes for Ionic and Molecular Sieving," Science, 343:740-742 (2014).
Miller et al., "Mutual diffusion coefficients and ionic transport coefficients lij of magnesium chloride-water at 25.degree.C," The Journal of Physical Chemistry, 88(23):5739-5748 (1984).
Miller et al., "Ring-closing metathesis as a new methodology for the synthesis of monomeric flavonoids and neoflavonoids," Tetrahedron Lett., 53(35):4708-4710 (2012). Epub Jun. 28, 2012.
Min et al., "Mechanical properties of graphene under shear deformation," Applied Physics Letters, 98(1):013113 (2011); https://doi.org/10.1063/1.3534787.
Mooney et al., "Simulation studies for liquid phenol: properties evaluated and tested over a range of temperatures," Chem Phys Lett., 294:135-142 (1998).
Nair et al., "Unimpeded permeation of water through helium-leak-tight graphene-based membranes," Science, 335(6067):442-444 (2012).
Nan, Q. et al., "Fabrication of positively charged nanofiltration membrane via thelayer-by-layer assembly of graphene oxide and polyethylenimine fordesalination," Appiled Surface Science, 387:521-528 (2016).
Nyyssonen, "Optical linewidth measurement on patterned wafers," SPIE Proceedings, Integrated Circuit Metrology, 480:65 (1984).
O'Hern et al., "Selective molecular transport through intrinsic defects in a single layer of CVD graphene," ACS Nano, 6(11):10130-10138 (2012).
Okazoe et al., "Alkylidenation of ester carbonyl groups by means of a reagent derived from RCHBr2, Zn, TiCl4, and TMEDA. Stereoselective preparation of (Z)-alkenyl ethers," J Org Chem., 52(19):4410-4412 (1987).
Ouyang et al., "Multilayer polyelectrolyte films as nanofiltration membranes for separating monovalent and divalent cations," Journal of Membrane Science, 310(1-2):76-84 (2008).
Park et al., "Covalent functionalization of graphene with reactive intermediates," Accts of Chem Research, 46(1):181-189 (2013). Epub Nov. 1, 2012.
Pendergast et al., "A review of water treatment membrane nanotechnologies," Energy Environ Sci., 4:1946-1971 (2011).
Perrault et al., "Thin-Film Composite Polyamide Membranes Functionalized with Biocidal Graphene Oxide Nanosheets," Environ. Sci. Technol. Lett., 1(1):71-76 (2014).
Perry et al., "Reliable, bench-top measurements of charge density in the active layers of thin-film composite and nanocomposite membranes using quartz crystal microbalance technology," Journal of Membrane Science, 429:23-33 (2013).
Pine et al., "Ketone methylenation using the Tebbe and Wittig reagents-A comparison," Synthesis, 1991(2):165-167 (1991).
Prabhu et al., "SEM-induced shrinking of solid-state nanopores for single molecule detection," Nanotech., 22:425302-425311 (2011).
Qiu et al., "Controllable corrugation of chemically converted graphene sheets in water and potential application for nanofiltration," Chem Commun, 47(20):5810-5812 (2011).

(56) References Cited

OTHER PUBLICATIONS

Qiu et al., "Synthesis of high flux forward osmosis membranes by chemically crosslinked layer-by-layer polyelectrolytes," Journal of Membrane Science, 381(1-2):74-80 (2011).

Russo et al., "Atom-By-Atom Nucleation And Growth of Graphene Nanopores," PNAS, 109(16):5953-5957 (2012).

Saren et al., "Synthesis and characterization of novel forward osmosis membranes based on layer-by-layer assembly," Environmental Science & Technology, 45(12):5201-5208 (2011).

Schrier, "Carbon dioxide separation with a two-dimensional polymer membrane," ACS Appl Mater Interfaces, 4*7):3745-3752 (2012).

Shiratori et al., "Ph-dependent thickness behavior of sequentially adsorbed layers of weak polyelectrolytes," Macromolecules, 33(11):4213-4219 (2000).

Singh et al., "Modification of regenerated cellulose ultrafiltration membranes by surface-initiated atom transfer radical polymerization," Journal of Membrane Science, 311:225-234 (2008).

Sint et al., "Selective ion passage through functionalized graphene nanopores," J am Chem Soc., 130(49):16448-16449 (2008).

Srinivas et al., "Porous graphene oxide frameworks: Synthesis and gas sorption properties," 21(30):11323-11329 (2011). Epub Jun. 23, 2011.

Stanton et al., "Ultrathin, multilayered polyelectrolyte films as nanofiltration membranes," Langmuir, 19(17):7038-7042 (2003).

Storm et al., "Fabrication of solid-state nanopores with single-nanometre precision," Nat Mater Lett., 2:537-540 (2003), including Supplementary Information, 1 page.

Suess, "Abundances of the elements," Reviews of Modern Physics, 18:53-74 (1956).

Suk et al., "Molecular and continuum hydrodynamics in graphene nanopores," RSC Adv., 3:9365-9372 (2013).

Suk et al., "Water transport through ultrathin graphene," J. Phys. Chem. Lett., 1:1590-1594 (2010).

Sun et al., Selective ion penetration of graphene oxide membranes, ACS Nano., 7(1):428-437 (2013).

Sun et al., "Laminar MoS2 membranes for molecule separation," Chem Commun., 49(91):10718-10720 (2013).

Surwade et al., "Water desalination using nanoporous single-layer graphene," Nat Nanotechnol., 23:1-6 (2015).

Sydlik, S. A & Swager, T. M., "Functional Graphenic Materials Via a Johnson-Claisen Rearrangement," Adv. Funct. Mater., 23:1873-1882 (2013).

Szabo et al., "Evolution of surface functional groups in a series of progressively oxidized graphite oxides," Chemistry of Materials, 18(11):2740-2749 (2006).

Taffa et al., "Pore size and surface charge control in mesoporous Ti02 using post-grafted SAMs," Phys Chem Chem Phys., 12:1473-1482 (2010).

Tiraferri et al., "Relating performance of thin-film composite forward osmosis membranes to support layer formation and structure," Journal of Membrane Science, 367(1-2):340-352 (2011).

Ulman, A, "Formation and Structure of Self-Assembled Monolayers," Chem. Rev., 96(4):1533-1554 (1996).

Van Den Haut et al., Controlling nanopore size, shape and stability, Nanotech., 21:115304-115309 (2010).

Wang et al., "Characterization of novel forward osmosis hollow fiber membranes," Journal of Membrane Science, 355(1):158-167 (2010).

Xia et al., "Ultrathin graphene oxide nanosheet membranes with various d-spacing using the pressure-assisted filtration method for removing natural organic matter," Desalination, 371:78-87 (2015). Epub Jun. 11, 2015.

Yeh et al., "On the origin of the stability of graphene oxide membranes in water," Nat Chem., 7(2):166-170 (2015). Epub Jan. 5, 2015.

Yip et al., "High performance thin-film composite forward osmosis membrane," Environmental Science & Technology, 44(10):3812-3818 (2010).

Yip et al., "Thin-film composite pressure retarded osmosis membranes for sustainable power generation from salinity gradients," Environmental Science & Technology, 45(10):4360-4369 (2011).

Yoon et al., "Graphene-based membranes: status and prospects," Phil. Trans. R. Soc. A, 374: 20150024 (2016); doi:10.1098/rsta.2015.0024.

Zangmeister et al., "Restructuring of graphene oxide sheets into monodisperse nanospheres," Chemistry of Materials, 24(13):2554-2557 (2012).

Zhang et al., "Self-assembly of polyelectrolyte multilayer pervaporation membranes by a dynamic layer-by-layer technique on a hydrolyzed polyacrylonitrile ultrafiltration membrane," Journal of Membrane Science, 292(1-2):1-8 (2007).

Zhao et al., "Recent developments in forward osmosis: Opportunities and challenges," Journal of Membrane Science, 396(0):1-21 (2012).

Zhou et al., "Surface modification of thin film composite polyamide membranes by electrostatic self deposition of polycations for improved fouling resistance," Separation and Purification Technology, 66(2):287-294 (2009).

Zhu et al., "Surface modification of PVDF porous membranes via poly(DOPA) coating and heparin immobilization," Colloids Surf B Biointerfaces, 69(1):152-155 (2009); doi:10.1016/j.colsurfb.2008.11.011. Epub Nov. 25, 2008.

Alen, Saif Khan et al., "Recent advances in graphene oxide membranes for gas separation applications," International Journal of Molecular Sciences, 20(22): 5609, (2019), 20 pages.

Collins, W. R., et al.; "Claisen rearrangement of graphite oxide: a route to covalently functionalized graphenes," Angew Chem Int Ed Engl., (2011) 50(38):8848-8852.

Convective Heat Transfer Coefficients Table Chart; https://www.engineersedge.com/heat_transfer/convective_heat_transfer_coefficients_13378.htm- accessed Jun. 27, 2023 (Year: 2023), 7 pages.

Efosa, I., et al.; "Graphene oxide functionalized polyethersulfone membrane to reduce organic fouling," Journal of Membrane Science (2016); 514, pp. 518-526.

Eryldiz, Bahriye, et al. "Flux-enhanced reduced graphene oxide (rGO)/PVDF nanofibrous membrane distillation membranes for the removal of boron from geothermal water." Separation and Purification Technology, 27:4:119058. (Year: 2021), 8 pages.

Kaeselev, B., et al.; "Influence of the surface structure on the filtration performance of UV-modified PES membranes," Desalination (2002); 146(1-3):265-271.

Karkhanechi et al., "Biofouling Resistance of Reverse Osmosis Membrane Modified With Polydopamine," Desalination, 2014, vol. 336, 2014, pp. 87-96.

Mohan et al., "Graphene-based materials and their composites: A review on production, applications and product limitations," Composites Part B: Engineering, 142:200-220 (2018).

Navaee, A., et al.; "Efficient amine functionalization of graphene oxide through the Bucherer reaction: an extraordinary metal-free electrocatalyst for the oxygen reduction reaction," RSC Advances (2015), 5(74):59874-59880.

Orevaighene A.: An illustration of the range of nominal membrane pore sizes for reverse osmosis (RO), nanofiltration (NF), ultrafiltration (UF), and microfiltration (MF) (Source: [23]). (Aug. 2017) 1 page; DOI: 10.5772/intechopen.69312.

Rahimpour, A.: "UV photo-grafting of hydrophilic monomers onto the surface of nano-porous PES membranes for improving surface properties," Desalination (2011); 265(1-3):93-101.

Sevigny, Gary J. et al., "Separation of tritiated water using graphene oxide membrane," PNN L-24411. Pacific Northwest National Lab. (PNNL), Richland, WA (United States), 2015, 39 pages.

Shen et al., "Covalent synthesis of organophilic chemically functionalized graphene sheets," Journal of Colloid and Interface Science, 348(2):377-383 (2010).

Wallmo, H., et al.; "The influence of hemicelluloses during the precipitation of lignin in kraft black liquor," Nordic Pulp & Paper Research Journal (2009) 24(2):165-171.

Wang, Z., et al.; "Kraft Black Liquor Concentration with Graphene Oxide Membranes: Process Simulations and Technoeconomic Analysis," Journal of Advanced Manufacturing and Processing (Aug. 2021); 3(4), 17 pages, DOI: 10.1002/amp2.10104.

(56) References Cited

OTHER PUBLICATIONS

Wang, Z., et al.; "Tuning interlayer structure to construct steady dual-crosslinked graphene oxide membranes for desalination of hypersaline brine via pervaporation," Separation and Purification Technology; 286:120459, 10 pages; doi:10.1016/j.seppur.2022.120459 (2022).

Wang, Z., et al.; "Supporting Information for Kraft Black Liquor Concentration with Graphene Oxide Membranes: Process Simulations and Technoeconomic Analysis," Journal of Advanced Manufacturing and Processing (Aug. 13, 2021); 3(4), pp. S1-S20.

Yang, Y-H. et al., "Super Gas Barrier and Selectivity of Graphene Oxide-Polymer Multilayer Thin Films," 2013, Adv. Mater., 25:503-508.

Yu, L., et al.; "Preparation and characterization of HPEI-GO/PES ultrafiltration membrane with antifouling and antibacterial properties," Journal of Membrane Science; 447; pp. 452-462; doi:10.1016/j.memsci.2013.07.042 (2013).

\* cited by examiner

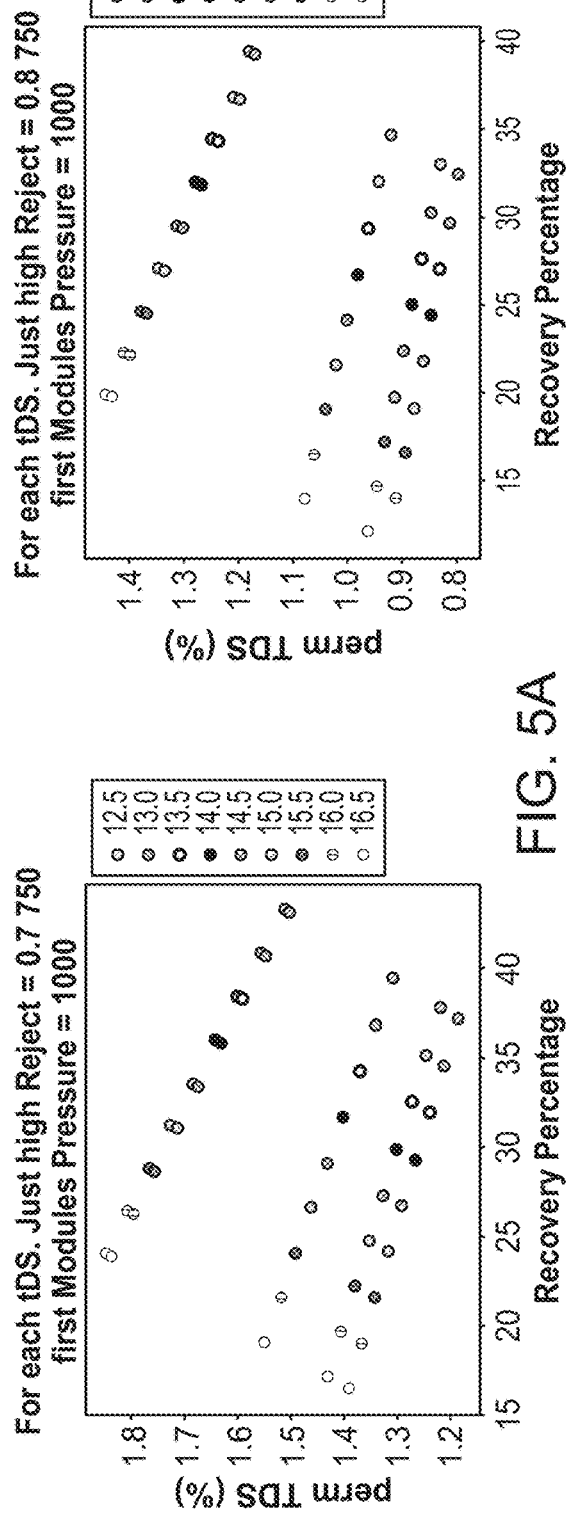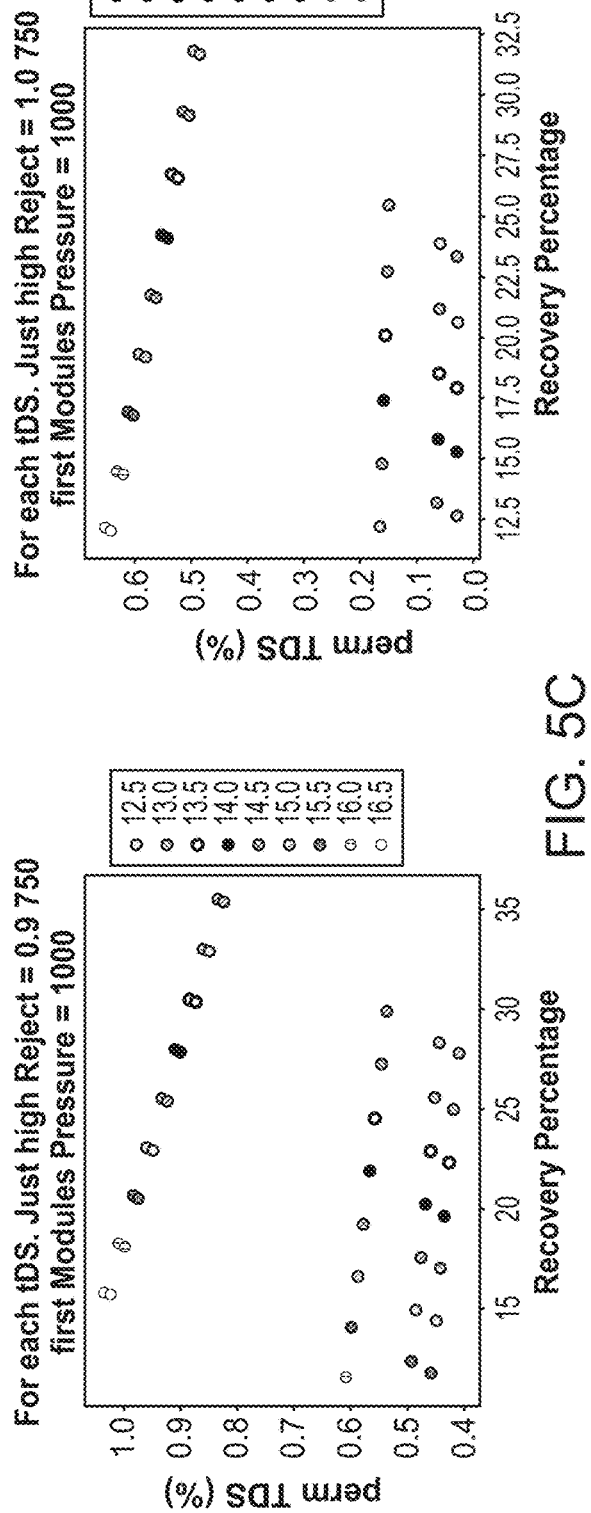
FIG. 5A  FIG. 5B  FIG. 5C  FIG. 5D

Lactose and $MgSO_4$ rejection (%) for membranes functionalized at different pH and concentration of propionamide (M).

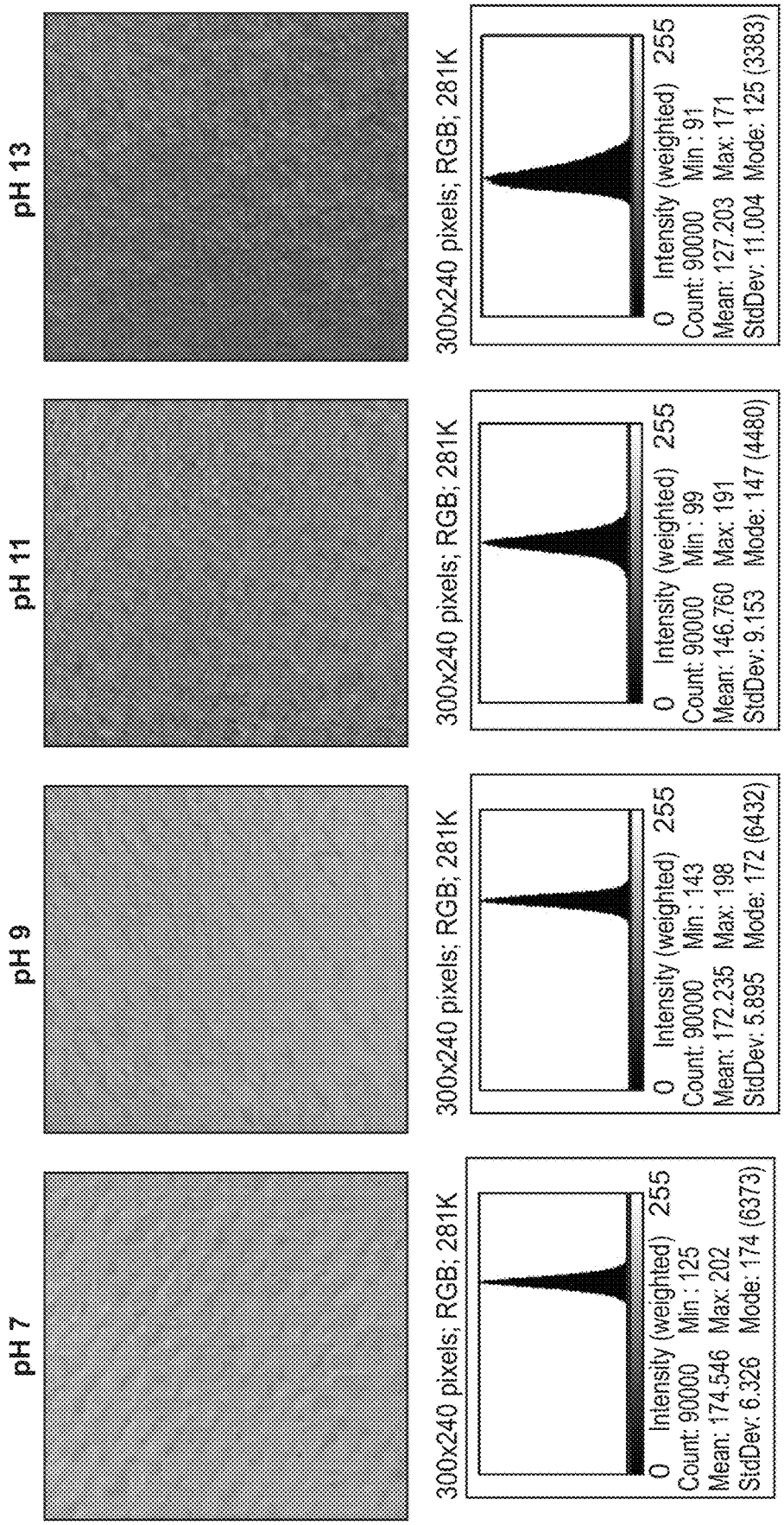

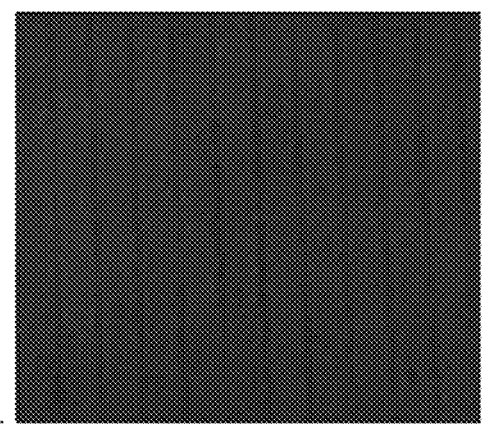
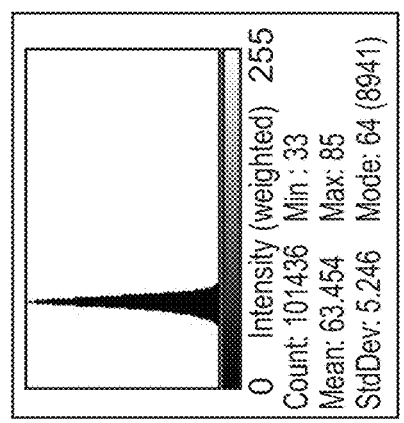
FIG. 14A  FIG. 14B
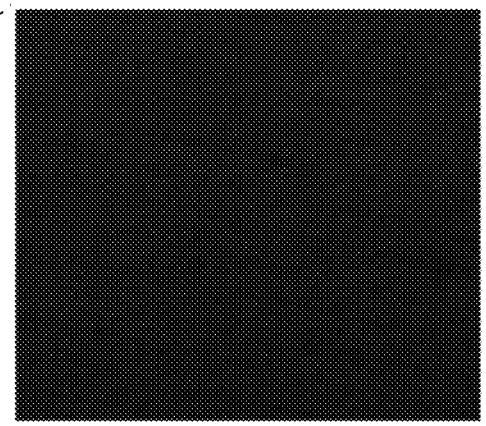
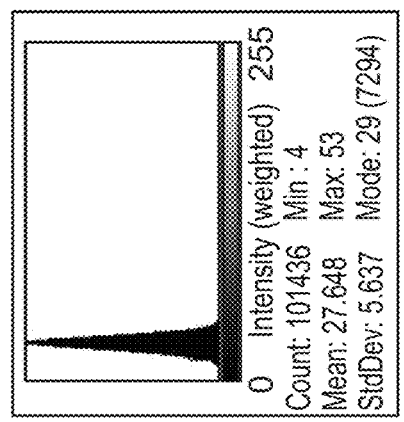
FIG. 14C  FIG. 14D

DURABLE GRAPHENE OXIDE MEMBRANES

RELATED APPLICATIONS

This application is a continuation of U.S. patent application Ser. No. 17/380,566, filed Jul. 20, 2021, and titled DURABLE GRAPHENE OXIDE MEMBRANES, which is a continuation of U.S. patent application Ser. No. 16/887,555, filed May 29, 2020, and titled DURABLE GRAPHENE OXIDE MEMBRANES, now U.S. Pat. No. 11,097,227, which is a continuation of International Patent Application No. PCT/US2020/033246, filed May 15, 2020, and titled DURABLE GRAPHENE OXIDE MEMBRANES, which claims priority to and the benefit of U.S. Provisional Patent Application No. 62/848,014, filed on May 15, 2019, and U.S. Provisional Patent Application No. 62/910,789, filed on Oct. 4, 2019, the disclosures of which are hereby incorporated by reference in their entireties.

TECHNICAL FIELD

The present disclosure relates generally to graphene oxide membranes and their use in separation processes.

BACKGROUND

Membranes can be used to separate a mixture by passing some components (filtrate or permeate) and retaining others preferentially with a balance of the mixture (rejects) according to any of a variety of properties of the membrane and/or of the components of the material being filtered. For example, membranes can be configured to separate rejects from a filtrate based on size exclusion (i.e., a physical barrier such as pores that are smaller than the excluded particles). Other examples include membranes that are configured to separate rejects from a filtrate based on chemical, electrochemical, and/or physical binding with one or more components of the material being filtered.

Polymer membranes are a common type of membrane. They have been used commercially for water softening, desalination, and for the concentration, removal, and purification of different salts, small molecules, and macromolecules. However, in certain environments (e.g., oxidizing conditions, high pH, high temperatures, or in some solvents), polymer membranes can become damaged or fail due to swelling, oxidation reactions, degradation, or softening of the polymer. Accordingly, there is a need in the art for new membranes that address one or more deficiencies of polymer membranes.

SUMMARY

Embodiments described herein relate generally to durable graphene oxide membranes for fluid filtration. For example, the graphene oxide membranes can be used for concentration, removal, and purification of different salts. For the membranes described herein, each of the graphene oxide sheets is not covalently crosslinked to the adjacent graphene oxide sheet.

One aspect of the present disclosure relates to a filtration apparatus comprising: a support substrate, and a graphene oxide membrane disposed on the support substrate. The graphene oxide membrane includes a plurality of graphene oxide sheets, each of the graphene oxide sheets covalently coupled to a chemical spacer. The graphene oxide membrane has a first lactose rejection rate of at least 50% with a first 1 wt % lactose solution at room temperature. The graphene oxide membrane has a second lactose rejection rate of at least 50% with a second 1 wt % lactose solution at room temperature after the graphene oxide membrane is contacted with a solution that is at least 80° C. for a period of time.

In some embodiments, the second lactose rejection rate is substantially the same as the first lactose rejection rate.

In some embodiments, the second lactose rejection rate is greater than the first lactose rejection rate.

In some embodiments, the first lactose rejection rate is less than or equal to 90%.

In some embodiments, the second lactose rejection rate is less than or equal to 90%.

In some embodiments, the chemical spacer comprises an amine or a derivative thereof. In some embodiments, the chemical spacer comprises —NH—$R_1$, wherein $R_1$ is an aryl, which can be optionally substituted. In some embodiments, the amine is 4-aminophenylacetic acid or 2-(4-aminophenyl) ethanol.

In some embodiments, the chemical spacer comprises an amide or a derivative thereof. In some embodiments, the chemical spacer comprises —NH—C(O)—$R_2$, wherein $R_2$ is $C_1$-$C_6$ alkyl or $C_2$-$C_6$ alkenyl, each of which can be optionally substituted. In some embodiments, the amide is acrylamide, propionamide, isobutyramide, or pivalamide.

In some embodiments, the solution has a pH of about 7.
In some embodiments, the solution has a pH of about 11.
In some embodiments, the solution has a pH of about 14.
In some embodiments, the solution is a phosphate buffer. In some embodiments, the phosphate buffer comprises $Na_2HPO_4$.

In some embodiments, the room temperature is about 20° C.

In some embodiments, the solution passes through the graphene oxide membrane.

In some embodiments, the period of time is about 2-6 hours.

One aspect of the present disclosure relates to a filtration apparatus comprising: a support substrate, and a graphene oxide membrane disposed on the support substrate. The graphene oxide membrane includes a plurality of graphene oxide sheets, each of the graphene oxide sheets covalently coupled to a chemical spacer. The graphene oxide membrane has a first lactose rejection rate of at least 50% with a first 1 wt % lactose solution at room temperature. The graphene oxide membrane has a second lactose rejection rate of at least 50% with a second 1 wt % lactose solution at room temperature after the graphene oxide membrane is contacted with a pH of at least 11 for a period of time.

In some embodiments, the solution has a pH of at least about 12. In some embodiments, the solution has a pH of at least about 14.

In some embodiments, the second lactose rejection rate is substantially the same as the first lactose rejection rate.

In some embodiments, the second lactose rejection rate is greater than the first lactose rejection rate.

In some embodiments, the first lactose rejection rate is less than or equal to 90%.

In some embodiments, the second lactose rejection rate is less than or equal to 90%.

In some embodiments, the chemical spacer comprises an amine or a derivative thereof. In some embodiments, the chemical spacer comprises —NH—$R_1$, wherein $R_1$ is an aryl, which can be optionally substituted. In some embodiments, the amine is 4-aminophenylacetic acid or 2-(4-aminophenyl) ethanol.

In some embodiments, the chemical spacer comprises an amide or a derivative thereof. In some embodiments, the chemical spacer comprises —NH—C(O)—$R_2$, wherein $R_2$ is $C_1$-$C_6$ alkyl or $C_2$-$C_6$ alkenyl, each of which can be optionally substituted. In some embodiments, the amide is acrylamide, propionamide, isobutyramide, or pivalamide.

In some embodiments, the solution comprises $Na_2HPO_4$.

In some embodiments, the room temperature is about 20° C.

In some embodiments, the solution passes through the graphene oxide membrane.

In some embodiments, the solution is a buffer solution.

In some embodiments, the period of time is about 2-6 hours.

One aspect of the present disclosure relates to a filtration apparatus, comprising: a support substrate, the support substrate has a thickness of at least about 150 µm and a Young's modulus of at least about 0.9 GPa; and a graphene oxide membrane disposed on the support substrate, the graphene oxide membrane including a plurality of graphene oxide sheets, each of the graphene oxide sheets covalently coupled to a chemical spacer, wherein: the graphene oxide membrane has a first lactose rejection rate of at least 50% with a first 1 wt % lactose solution at room temperature; and after the graphene oxide membrane is subjected to a pressure of about 1000 psi for a period of time, the graphene oxide membrane has a second lactose rejection rate of at least 50% with a second 1 wt % lactose solution at room temperature.

In some embodiments, the support substrate has a thickness of no more than about 500 µm.

In some embodiments, the support substrate has a Young's modulus of no more than about 2.5 GPa.

In some embodiments, the support substrate comprises polypropylene, polyolefin, polyethersulfone (PES), polytetrafluoroethylene (PTFE), polyacrylonitrile (PAN), nylon, or a combination thereof.

One aspect of the present disclosure relates to a method of processing black liquor, wherein black liquor is flowed through any one of the aforementioned filtration apparatuses, wherein the black liquor comprises lignin, sodium sulfate, sodium carbonate, sodium hydrosulfide, sodium thiosulfate, and/or sodium hydroxide.

In some embodiments, at least a portion of the lignin is rejected by the graphene oxide membrane. In some embodiments, at least 50% of the lignin is rejected by the graphene oxide membrane. In some embodiments, at least 90% of the lignin is rejected by the graphene oxide membrane.

In some embodiments, at least a portion of the sodium sulfate is rejected by the graphene oxide membrane. In some embodiments, at least 50% of the sodium sulfate is rejected by the graphene oxide membrane. In some embodiments, at least 90% of the sodium sulfate is rejected by the graphene oxide membrane.

In some embodiments, at least a portion of the sodium carbonate is rejected by the graphene oxide membrane. In some embodiments, at least 50% of the sodium carbonate is rejected by the graphene oxide membrane. In some embodiments, at least 90% of the sodium carbonate is rejected by the graphene oxide membrane.

In some embodiments, at least a portion of the sodium hydrosulfide is rejected by the graphene oxide membrane. In some embodiments, at least 50% of the sodium hydrosulfide is rejected by the graphene oxide membrane. In some embodiments, at least 90% of the sodium hydrosulfide is rejected by the graphene oxide membrane.

In some embodiments, at least a portion of the sodium thiosulfate is rejected by the graphene oxide membrane. In some embodiments, at least 50% of the sodium thiosulfate is rejected by the graphene oxide membrane. In some embodiments, at least 90% of the sodium thiosulfate is rejected by the graphene oxide membrane.

In some embodiments, at least a portion of the sodium hydroxide is rejected by the graphene oxide membrane. In some embodiments, at least 50% of the sodium hydroxide is rejected by the graphene oxide membrane. In some embodiments, at least 90% of the sodium hydroxide is rejected by the graphene oxide membrane.

One aspect of the present disclosure relates to a method of increasing a flux of the graphene oxide membrane described herein, the method comprising contacting the graphene oxide membrane with a solution that is at least about 50° C. for a period of time, wherein after the contacting step, the flux is increased by at least 50%.

Another aspect of the present disclosure relates to a method of increasing a flux of the graphene oxide membrane described herein, the method comprising contacting the graphene oxide membrane with a solution having a pH of at least about 10 for a period of time, wherein after the contacting step, the flux is increased by at least 50%.

BRIEF DESCRIPTION OF THE DRAWINGS

FIGS. 5A-5D, 6A-6D, 7A-7D, 8A-8D, and 9A-9E are graphs showing the recovery percentage of simulated permeate total dissolved solids (perm TDS) for different system sizes (as represented by recovery ratio). Each series of dots represents a different feed concentration. These figures show that sufficiently clean hot water streams can be produced by graphene oxide membranes. Multiple pass systems mean the permeate from the first membrane system passes through a second membrane system. The recovery is defined by the percentage of first system feed that becomes permeate from the second system in that case.

FIGS. 5A-5D are graphs showing simulation results for the effect of divalent rejection at 1000 psi in a single-pass system.

FIGS. 6A-6D are graphs showing simulation results for the effect of pressure at high rejection in a single-pass system.

FIGS. 7A-7D are graphs showing simulation results for the system size in a single-pass system.

FIGS. 8A-8D are graphs showing simulation results for the effect of rejection in a two-pass system.

FIGS. 9A-9E are graphs showing simulation results for multi-pass system sizing.

FIGS. 13A-13D are graphs showing the effect of pH on the color of the graphene oxide membrane, which can be indicative of the stability of the membrane. The color change may be quantified using image processing software by converting the red/green/blue (RGB) image to grayscale and comparing the grayscale mode value of the resulting signals. For the four membranes at pH's 7-13, the histograms below each image show the distribution of gray values for each image with the x-axis representing possible gray values (0-255) and the y-axis representing the number of pixels found at each gray value. Grayscale mode values closer to zero correspond to darker images. Conversely, grayscale mode values closer to 255 correspond to lighter images. FIGS. 13A-13D show the mode shift from a grayscale mode value of 174 for the sample at pH 7 (lightest) to a grayscale mode value of 127 for the sample at pH 13 (darkest) indicating pH has a quantifiable effect on color.

FIGS. 14A-14D are graphs showing the effect of temperature on the color of the graphene oxide membrane. The membrane that was exposed to the combination of pH 11.5 and 80° C. has a mode shift from 64 (before) to 29 (after). The membrane that was exposed to 50° C. at roughly pH 7 showed a negligible change in mode from 57 (before) to 56 (after).

DETAILED DESCRIPTION

Figure 1:
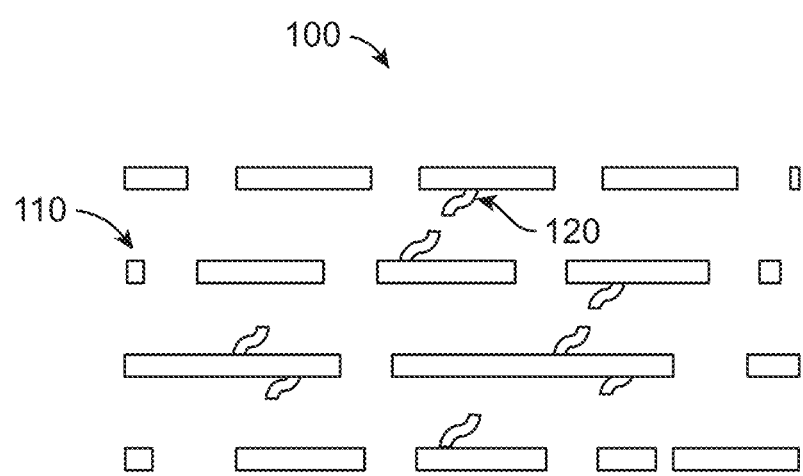
FIG. 1 is a schematic illustration of a graphene oxide membrane in accordance with some embodiments of the present disclosure.

Graphite is a crystalline form of carbon with its atoms arranged in a hexagonal structure layered in a series of planes. Due to its abundance on earth, graphite is very cheap and is commonly used in pencils and lubricants. Graphene is a single, one atomic layer of carbon atoms (i.e., one of the layers of graphite) with several exceptional electrical, mechanical, optical, and electrochemical properties, earning it the nickname "the wonder material." To name just a few, it is highly transparent, extremely light and flexible yet robust, and an excellent electrical and thermal conductor. Such extraordinary properties render graphene and related thinned graphite materials (e.g., few layer graphene) as promising candidates for a diverse set of applications. For example, graphene can be used in coatings to prevent steel and aluminum from oxidizing, and to filter salt, heavy metals, and oil from water.

Graphene oxide is an oxidized form of graphene having oxygen-containing pendant functional groups (e.g., epoxide, carboxylic acid, or hydroxyl) that exist in the form of single atom thick sheets. By oxidizing the graphene in graphite, graphene oxide sheets can be produced. For example, the graphene oxide sheets can be prepared from graphite using a modified Hummers method. Flake graphite is oxidized in a mixture of $KMnO_4$, $H_2SO_4$, and/or $NaNO_3$, then the resulting pasty graphene oxide was diluted and washed through cycles of filtration, centrifugation, and resuspension. The washed graphene oxide suspension is subsequently ultrasonicated to exfoliate graphene oxide particles into graphene oxide sheets and centrifuged at high speed to remove unexfoliated graphite residues. The resulting yellowish/light brown solution is the final graphene oxide sheet suspension. This color indicates that the carbon lattice structure is distorted by the added oxygenated functional groups. The produced graphene oxide sheets are hydrophilic and can stay suspended in water for months without a sign of aggregation or deposition.

Due in part to its low cost, high chemical stability, strong hydrophilicity, and compatibility with a variety of environments, graphene oxide has been explored for its use in membranes in filtration applications. For example, as compared to polymer membranes, which can be prone to oxidation, graphene oxide membranes can remain stable when exposed to oxidation conditions. However, existing graphene oxide membranes are plagued by durability issues when exposed to high temperatures or acidic/basic conditions. For example, some existing graphene oxide membranes can achieve a high lactose rejection rate (e.g., at least 50%) with a 1 wt % lactose solution at room temperature immediately after production. However, after exposure to high temperatures (e.g., greater than about 50° C.) and/or non-neutral pH environments (e.g., pH=11) for a period of time, the performance of these graphene oxide membranes diminishes. The lactose rejection rates at room temperature by these graphene oxide membranes can be reduced to 30%, 20%, or less after exposure to these conditions, rendering them ineffective for certain filtration applications. In contrast, the present disclosure provides graphene oxide membranes having a rejection rate of at least 50% with a 1 wt % lactose solution and can have a rejection rate of at least 50% with a 1 wt % lactose solution after exposure to high temperatures and/or non-neutral pH environments.

Thus, the present disclosure provides graphene oxide membranes having one or more superior properties over existing graphene oxide membranes. At least by tuning the chemistries that are covalently coupled to each graphene oxide sheet, the present disclosure provides graphene oxide membranes having temperature, pH, and/or pressure durability. Surprisingly, the inventors have discovered that graphene oxide membranes having temperature, pH, and/or pressure durability can be produced without crosslinking the graphene oxide sheets.

As shown in FIG. 1, one aspect of the present disclosure provides a graphene oxide membrane 100 that includes a plurality of graphene oxide sheets 110 and a plurality of chemical spacers 120. Each of the graphene oxide sheets 110 is not covalently crosslinked to the adjacent graphene oxide sheet 110.

In some embodiments, the graphene oxide sheets 110 can be arranged and oriented generally parallel to each other.

The spacing between the graphene oxide sheets 110 can be either interlayer spacing or intralayer spacing. The spacing between the graphene oxide sheets 110 can be engineered to control the molecular weight cutoff of the graphene oxide membrane 100.

In some embodiments, the chemical spacer 120 can form a covalent bond with an oxygen-containing functional group on the graphene oxide sheet 110. For example, the chemical spacer 120 can form a covalent bond with the epoxide groups, carboxylic groups, or hydroxyl groups on graphene oxide. In some embodiments, the chemical spacer 120 can also form a covalent bond with a non-oxygen-containing group (e.g., amine) on the graphene oxide sheet 110. In some embodiments, the chemical spacer 120 can also form a covalent bond with a carbon atom on the graphene oxide sheet 110.

In some embodiments, the chemical spacer 120 can form a noncovalent interaction with an adjacent graphene oxide sheet 110 through a variety of mechanisms. In some embodiments, the chemical spacer 120 can be coupled to the adjacent graphene oxide sheet 110 through an ionic interaction. In some embodiments, the chemical spacer 120 can be coupled to the adjacent graphene oxide sheet 110 through hydrogen bonding. In some embodiments, the chemical spacer 120 can be coupled to the adjacent graphene oxide sheet 110 through one or more Van der Waals forces. In some embodiments, the chemical spacer 120 can be coupled to the adjacent graphene oxide sheet 110 through one or more π-effects. In some embodiments, the chemical spacer 120 can be coupled to the adjacent graphene oxide sheet 110 through the hydrophobic effect.

In some embodiments, the chemical spacer 120 can include an amine or a derivative thereof. In some embodiments, the chemical spacer 120 can have the structure in accordance with Formula I:

wherein: $R_1$ is an aryl or heteroaryl, which can be optionally substituted with one or more substituents. In some embodiments, the substituents can be selected from $C_1$-$C_6$ alkyl and $C(=O)OR_{1a}$, wherein the alkyl can be optionally substituted with halogen, OH, $NH_2$, and SH; and $R_{1a}$ can be H or $C_1$-$C_6$ alkyl. In some embodiments, the aryl is phenyl. In some embodiments, $R_1$ is

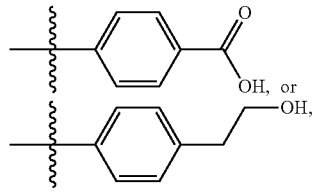

where  denotes the point of coupling with —NH in Formula I.

In some embodiments, the chemical spacer 120 can include 4-aminophenylacetic acid, 2-(4-aminophenyl) ethanol, 2-(4-aminophenyl) propanol, 2-(4-aminophenyl) butanol, or any combination thereof.

In some embodiments, the chemical spacer 120 can include an amide or a derivative thereof. In some embodiments, the chemical spacer 120 can include the structure in accordance with Formula II:

$$—NH—C(O)—R_2 \qquad (II),$$

wherein: $R_2$ is a $C_1$-$C_6$ alkyl or a $C_2$-$C_6$ alkenyl, each of which can be optionally substituted with one or more substituents. In some embodiments, non-limiting examples of $R_2$ can include methyl, ethyl, n-propyl, isopropyl, n-butyl, isobutyl, sec-butyl, tert-butyl, ethenyl, propenyl, and butenyl.

In some embodiments, the chemical spacer 120 can include acrylamide, propionamide, isobutyramide, pivalamide, or any combination thereof.

In some embodiments, the weight ratio of graphene oxide sheets 110 to chemical spacer 120 in the graphene oxide membrane 100 can be less than about 1,000, less than about 500, less than about 400, less than about 300, less than about 200, less than about 100, less than about 50, less than about 25, less than about 15, less than about 10, or less than about 5, inclusive of all values and ranges therebetween. In some embodiments, the weight ratio of graphene oxide sheets 110 to chemical spacer 120 in the graphene oxide membrane 100 can be at least about 5, at least about 10, at least about 15, at least about 20, at least about 25, at least about 30, at least about 35, at least about 40, at least about 45, or at least about 50, inclusive of all values and ranges therebetween.

Combinations of the above-referenced ranges for the weight ratio are also possible (e.g., at least about 5 and less than about 1000, or at least about 10 and less than about 200).

In some embodiments, the atomic percent (at %) content of nitrogen present on the surface of the graphene oxide membrane 100 measured by X-ray photoelectron spectroscopy can be less than about 5.0 at %, less than about 4.5 at %, less than about 4.0 at %, less than about 3.5 at %, less than about 3.2 at %, less than about 3.0 at %, less than about 2.8 at %, less than about 2.6 at %, less than about 2.4 at %, or less than about 2.0 at %, inclusive of all values and ranges therebetween. In some embodiments, the at % content of nitrogen present on the surface of the graphene oxide membrane 100 measured by X-ray photoelectron spectroscopy can be at least about 0.6 at %, at least about 1.1 at %, at least about 1.2 at %, at least about 1.3 at %, at least about 1.4 at %, at least about 1.5 at %, at least about 1.6 at %, at least about 1.8 at %, or at least about 2.0 at %, inclusive of all values and ranges therebetween.

Combinations of the above-referenced ranges for the at % content of nitrogen are also possible (e.g., at least about 0.6 at % and less than about 5.0 at %, or at least about 1.1 at % and less than about 3.2 at %).

In some embodiments, the at % content of carbon present on the surface of the graphene oxide membrane 100 measured by X-ray photoelectron spectroscopy can be less than about 80%, less than about 78%, or less than about 75%, inclusive of all values and ranges therebetween. In some embodiments, the at % content of carbon present on the surface of the graphene oxide membrane 100 measured by X-ray photoelectron spectroscopy can be at least about 50%, at least about 55%, or at least about 60%, inclusive of all values and ranges therebetween.

Combinations of the above referenced ranges for the at % content of carbon are also possible (e.g., at least about 50% and less than about 80%, or at least about 60% and less than about 75%). In contrast, existing graphene oxide membranes that are deliberately or unintentionally reduced often have at % content of carbon of greater than 80% or even greater than 95%.

In some embodiments, the graphene oxide membrane 100 can have a thickness greater than or equal to about 25 nm, greater than or equal to about 50 nm, greater than or equal to about 0.1 microns, greater than or equal to about 0.15 microns, greater than or equal to about 0.2 microns, greater than or equal to about 0.3 microns, greater than or equal to about 0.4 microns, greater than or equal to about 0.5 microns, greater man or equal to about 0.75 microns, greater than or equal to about 1 micron, or greater than or equal to about 2 microns. In some embodiments, the thickness of the graphene oxide membrane 100 may be less man or equal to about 5 microns, less than or equal to about 1 micron, less than or equal to about 0.75 microns, or less than or equal to about 0.5 microns.

Combinations of the above-referenced ranges for the thickness of the graphene oxide membrane 100 are also possible (e.g., greater than or equal to about 25 nm and less than or equal to about 5 microns, greater than or equal to about 0.15 microns and less than or equal to about 0.5 microns).

In some embodiments, the graphene oxide membrane 100 can have a thickness of about 25 nm, about 50 nm, about 0.1 microns, about 0.15 microns, about 0.2 microns, about 0.25 microns, about 0.3 microns, about 0.35 microns, about 0.4 microns, about 0.45 microns, about 0.5 microns, about 0.55 microns, about 0.6 microns, about 0.65 microns, about 0.7 microns, about 0.75 microns, about 0.8 microns, about 0.85 microns, about 0.9 microns, about 0.95 microns, about 1.0 micron, about 1.5 microns, or about 2 microns.

In some embodiments, the graphene oxide sheets 110 can include flakes. The flakes can have an aspect ratio (on the plane of the graphene oxide sheets 110). In some embodiments, the aspect ratio can be less than about 250,000:1, less than about 100,000:1, less than about 50,000:1, less than about 25,000:1, less than about 10,000:1, less than about 5,000:1, less than about 1,000:1, at least about 100:1, at least about 200:1, at least about 300:1, at least about 400:1, or at least about 500:1, inclusive of all values and ranges therebetween.

In some embodiments, the graphene oxide membrane 100 can include at least about 100 layers, at least about 125 layers, at least about 150 layers, at least about 200 layers, at least about 225 layers, or at least about 250 layers of graphene oxide sheets, inclusive of all values and ranges therebetween. In some embodiments, the graphene oxide membrane 100 can include no more than about 600 layers, no more than about 550 layers, no more than about 500 layers, no more than about 450 layers, no more than about 400 layers, no more than about 350 layers, or no more than about 300 layers of graphene oxide sheets.

Combinations of the above-referenced ranges for the number of layers in the graphene oxide membrane 100 are also possible (e.g., at least about 100 and no more than about 600, or at least about 300 and no more than about 600), inclusive of all values and ranges therebetween.

In some embodiments, the graphene oxide membrane 100 can include about 100 to about 600 layers of graphene oxide sheets 110, e.g., 200-500 layers, 200-400 layers, 200-300 layers, 200-250 layers, 300-600 layers, 300-500 layers, or 300-400 layers.

In some embodiments, the size of the space between graphene oxide sheets 110 is the d-spacing, which can be measured by X-ray diffraction such as grazing incidence X-ray diffraction (GIXRD). In some embodiments, the d-spacing for dried graphene oxide sheets 110 can be less than about 20 Å, less than about 15 Å, or less than about 10 Å, inclusive of all values and ranges therebetween. In some embodiments, the d-spacing for dried graphene oxide sheets 110 can be in the range of about 5 Å to about 20 Å, about 5 Å to about 15 Å, about 8 Å to about 20 Å, about 8 Å to about 15 Å, inclusive of all values and ranges therebetween. In some embodiments, the d-spacing for dried graphene oxide sheets 110 can be about 17 Å, about 16 Å, about 15 Å, about 14 Å, about 13 Å, about 12 Å, about 11 Å, about 10 Å, about 9 Å, about 8 Å, or about 7 Å. The length of the chemical spacer 120 is an important factor in controlling the d-spacing.

In some embodiments, the graphene oxide membrane 100 can have an average pore size of greater than or equal to about 0.5 nm, greater than or equal to about 1 nm, greater than or equal to about 2 nm, greater than or equal to about 3 nm, greater than or equal to about 4 nm, or greater than or equal to about 5 nm. In some embodiments, the graphene oxide membrane 100 can have an average pore size of less than or equal to about 6 nm, less than or equal to about 5 nm, less than or equal to about 4 nm, less than or equal to about 3 nm, or less than or equal to about 2 nm, inclusive of all values and ranges therebetween.

Combinations of the above-referenced ranges for the average pore size are also possible (e.g., greater than or equal to about 0.5 nm and less than or equal to about 6 nm, greater than or equal to about 1 nm and less than or equal to about 6 nm). In some embodiments, the graphene oxide membrane 100 can have an average pore size of about 0.5 nm, about 0.8 nm, about 1 nm, about 2 nm, about 3 nm, about 4 nm, about 5 nm, or about 6 nm.

It was discovered that the roughness of the support substrate can have an impact on the flux of the graphene oxide membrane. Specifically, a smooth support substrate can improve the flux and/or rejection rate of the graphene oxide membrane as compared to a rough support substrate. Accordingly, in some embodiments, the support substrate of the graphene oxide membrane 100 can have a root mean squared surface roughness of less than about 3 μm, less than about 2.5 μm, less than about 2 μm, less than about 1.5 μm, or less than about 1 μm. In some embodiments, the support substrate of the graphene oxide membrane 100 can have a root mean squared surface roughness of at least about 1 μm, at least about 1.2 μm, at least about 1.4 μm, at least about 1.5 μm, inclusive of all values and ranges therebetween. In some embodiments, the surface roughness is measured by a Dektak 6M Contact Profilometer.

Combinations of the above-referenced ranges for the root mean squared surface roughness are also possible (e.g., at least about 1 μm and less than 2.5 μm, or at least 1.4 μm and less than about 3 μm). In some embodiments, the support substrate has a root mean squared surface roughness of about 3 μm, about 2.5 μm, about 2 μm, about 1.5 μm, or about 1 μm.

In some embodiments, the color of the graphene oxide membrane 100 can be used to assess the membrane's stability under elevated temperatures and/or basic pH levels. The color of the graphene oxide membrane 100 can be characterized by recording images of the graphene oxide membrane 100, and calculating the grayscale mode value with the aid of using image processing software. The range of grayscale mode value that an image can assume is zero to 255, with values closer to zero corresponding to darker images, and values closer to 255 corresponding to lighter images.

In some embodiments, the graphene oxide membrane 100 can display a grayscale mode value of less than about 180, less than about 160, less than about 140, less than about 120, less than about 100, less than about 80, less than about 60, or less than about 40, inclusive of all values and ranges therebetween, where the image of the graphene oxide membrane 100 is collected in a lightbox with dimensions 9.4× 9.1×8.7" and two rows of 20 white LEDs on the top front and rear edge of the lightbox. In some embodiments, the graphene oxide membrane 100 can display a grayscale mode value of at least about 20, at least about 25, at least about 30, at least about 45, at least about 60, at least about 75, inclusive of all values and ranges therebetween, where the image of the graphene oxide membrane 100 is collected in a lightbox with dimensions 9.4×9.1×8.7" and two rows of 20 white LEDs on the top front and rear edge of the lightbox.

Combinations of the above-referenced ranges for the grayscale mode value are also possible (e.g., at least about 20 and less than about 180, or at least about 90 and less than about 120).

Other ways to quantify the color of the graphene oxide membrane 100 can also be used. For example, distribution shape, center of a fit, and/or standard deviation can be used.

The lighting level to obtain an image of the graphene oxide membrane 100 can have an effect on the grayscale mode value. For comparison purposes, the same or substantially the same lighting level should be used to obtain two or more images of the same membrane at different time points or different membranes.

The flux can have the unit of gallons per square foot per day per psi (GFD/psi). In some embodiments, the graphene oxide membrane 100 can have a flux of at least about $2.5\times10^{-4}$ GFD/psi, at least about $5.0\times10^{-4}$ GFD/psi, at least about $7.5\times10^{-4}$ GFD/psi, at least about $1.0\times10^{-3}$ GFD/psi, at least about $1.25\times10^{-3}$ GFD/psi, at least about $1.5\times10^{-3}$ GFD/psi, at least about $1.75\times10^{-3}$ GFD/psi, at least about $2.0\times10^{-3}$ GFD/psi, at least about $2.25\times10^{-3}$ GFD/psi, at least about $2.5\times10^{-3}$ GFD/psi, at least about $5.0\times10^{-3}$ GFD/psi, at least about $10.0\times10^{-3}$ GFD/psi, at least about $15.0\times10^{-3}$ GFD/psi, or at least about $20.0\times10^{-3}$ GFD/psi, inclusive of all values and ranges therebetween, measured with a 1 wt % lactose solution at room temperature.

In some embodiments, the graphene oxide membrane 100 can have a flux of no more than about $40.0\times10^{-3}$ GFD/psi, no more than about $35.0\times10^{-3}$ GFD/psi, no more than about $30.0\times10^{-3}$ GFD/psi, no more than about $20.0\times10^{-3}$ GFD/psi, no more than about $15.0\times10^{-3}$ GFD/psi, no more than about $10.0\times10^{-3}$ GFD/psi, inclusive of all values and ranges therebetween, measured with a 1 wt % lactose solution at room temperature.

Combinations of the above-referenced ranges for the flux are also possible (e.g., at least about $2.5\times10^{-4}$ GFD/psi and no more than about $40.0\times10^{-3}$ GFD/psi, or at least about $5.0\times10^{-3}$ GFD/psi and no more than about $30.0\times10^{-3}$ GFD/psi).

In some embodiments, the flux is measured at 50 psi to 1000 psi, such as about 50 psi, about 75 psi, about 100 psi, about 125 psi, about 150 psi, about 175 psi, about 200 psi, about 225 psi, about 250 psi, about 275 psi, about 300 psi, about 325 psi, about 350 psi, about 375 psi, about 400 psi, about 425 psi, about 450 psi, about 475 psi, about 500 psi, about 525 psi, about 550 psi, about 575 psi, about 600 psi, about 625 psi, about 650 psi, about 675 psi, about 700 psi, about 725 psi, about 750 psi, about 775 psi, about 800 psi, about 825 psi, about 850 psi, about 875 psi, about 900 psi, about 925 psi, about 950 psi, about 975 psi, or about 1000 psi.

In some embodiments, the graphene oxide membrane 100 can have a flux of about $2.5\times10^{-4}$ to about $3.75\times10^{-2}$ GFD/psi, about $2.5\times10^{-4}$ to about $2.5\times10^{-2}$ GFD/psi, about $2.5\times10^{-3}$ to about $2.5\times10^{-2}$ GFD/psi, or about $1.25\times10^{-2}$ to about $2.5\times10^{-2}$ GFD/psi, as measured with a 1 wt % lactose solution at room temperature.

The temperature and/or pH durability of the graphene oxide membrane 100 can be assessed by contacting the graphene oxide membrane 100 with a test solution that has a high temperature and/or non-neutral pH, and comparing the solute rejection rates before and after the contact.

In some embodiments, the graphene oxide membrane 100 can have a first solute rejection rate with a first solution having the solute at room temperature before exposure to a test solution with a high temperature and/or non-neutral pH. In some embodiments, the solute can include lactose, lignin, sodium sulfate, sodium carbonate, sodium hydrosulfide, sodium thiosulfate, sodium hydroxide, hydrochloric acid, nitric acid, phosphoric acid, sodium chloride, potassium chloride, and/or magnesium sulfate. The solute is dissolved in a solvent. In some embodiments, the solvent can include water, ethanol, methanol, acetone, or any other suitable solvent. In some embodiments, the graphene oxide membrane 100 can have a second solute rejection rate with a second solution having the solute at room temperature after exposure to the test solution for a contact period.

In some embodiments, the first solution and/or the second solution can include about 0.1 wt % solute, about 0.2 wt % solute, about 0.3 wt % solute, about 0.4 wt % solute, about 0.5 wt % solute, about 0.6 wt % solute, about 0.7 wt % solute, about 0.8 wt % solute, about 0.9 wt % solute, about 1 wt % solute, about 1.5 wt % solute, about 2 wt % solute, about 2.5 wt % solute, about 3 wt % solute, about 3.5 wt % solute, about 4 wt % solute, about 4.5 wt % solute, about 5 wt % solute, about 5.5 wt % solute, about 6 wt % solute, about 6.5 wt % solute, about 7 wt % solute, about 7.5 wt % solute, about 8 wt % solute, about 8.5 wt % solute, about 9 wt % solute, about 9.5 wt % solute, or about 10 wt % solute, inclusive of all values and ranges therebetween.

In some embodiments, the test solution can have a high temperature, a non-neutral pH, or any combination thereof. In some embodiments, the high temperature can be greater than about 50° C., greater than about 55° C., greater than about 60° C., greater than about 65° C., greater than about 70° C., greater than about 75° C., greater than about 80° C., greater than about 85° C., greater than about 90° C., or greater than about 95° C., inclusive of all values and ranges therebetween. In some embodiments, the high temperature can be no more than about 100° C., no more than about 95° C., no more than about 90° C., no more than about 85° C., or no more than about 80° C., inclusive of all values and ranges therebetween.

Combinations of the above-referenced ranges for the temperature are also possible (e.g., greater than about 50° C. and no more than about 100° C., greater than about 60° C. and no more than about 100° C., or greater than about 80° C. and no more than about 120° C.).

In some embodiments, the non-neutral pH can be at least about 8, at least about 8.5, at least about 9, at least about 9.5, at least about 10, at least about 10.5, at least about 11, at least about 11.5, at least about 12, at least about 12.5, at least about 13, at least about 13.5, or at least about 14. In some embodiments, the non-neutral pH can be less than about 6, less than about 5.5, less than about 5, less than about 4.5, less than about 4, less than about 3.5, less than about 3, less than about 2.5, less than about 2, less than about 1.5, less than about 1, or less than about 0.5, inclusive of all values and ranges therebetween. In some embodiments, the non-neutral pH can be about 0, about 0.5, about 1, about 1.5, about 2, about 2.5, about 3, about 3.5, about 4, about 4.5, about 5, about 5.5, about 6, about 8, about 8.5, about 9, about 9.5, about 10, about 10.5, about 11, about 11.5, about 12, about 12.5, about 13, about 13.5, or about 14, inclusive of all values and ranges therebetween.

In some embodiments, the first solute rejection rate can be at least about 50%, at least about 55%, at least about 60%, at least about 65%, at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, at least about 99%, at least about 99.5%, or about 100%, inclusive of all values and ranges therebetween.

In some embodiments, the second solute rejection rate can be at least about 50%, at least about 55%, at least about 60%, at least about 65%, at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, at least about 99%, at least about 99.5%, or about 100%, inclusive of all values and ranges therebetween.

In some embodiments, the first lactose rejection rate with a 1 wt % lactose solution can be at least about 50%, at least about 55%, at least about 60%, at least about 65%, at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, at least about 99%, at least about 99.5%, or about 100%, inclusive of all values and ranges therebetween.

In some embodiments, the second lactose rejection rate with a 1 wt % lactose solution can be at least about 50%, at least about 55%, at least about 60%, at least about 65%, at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, at least about 99%, at least about 99.5%, or about 100%, inclusive of all values and ranges therebetween.

In some embodiments, when the membrane is temperature and/or pH durable, the second solute rejection rate can be substantially the same as the first solute rejection rate. In some embodiments, when the membrane is temperature and/or pH durable, the second solute rejection rate can be greater than the first solute rejection rate. For example, the second solute rejection rate can be at least about 5%, at least about 10%, at least about 15%, or at least about 20% greater than the first solute rejection rate.

In some embodiments, the test solution can be a buffer. In some embodiments, the test solution can include a phosphate buffer. In some embodiments, the test solution can include $Na_2HPO_4$. In some embodiments, the test solution can have a concentration of about 0.1 M, about 0.2 M, about 0.3 M, about 0.4 M, about 0.5 M, about 0.6 M, about 0.7 M, about 0.8 M, about 0.9 M, about 1 M, about 2 M, about 3 M, about 4 M, about 5 M, or about 6 M, inclusive of all values and ranges therebetween.

In some embodiments, the contact period can be greater than about 10 minutes, greater than about 20 minutes, greater than about 30 minutes, greater than about 40 minutes, greater than about 50 minutes, greater than about 1 hour, greater than about 1.5 hours, greater than about 2 hours, greater than about 2.5 hours, greater than about 3 hours, greater than about 3.5 hours, greater than about 4 hours, greater than about 4.5 hours, greater than about 5 hours, greater than about 5.5 hours, greater than about 6 hours, greater than about 6.5 hours, greater than about 7 hours, greater than about 7.5 hours, greater than about 8 hours, greater than about 8.5 hours, greater than about 9 hours, greater than about 9.5 hours, or greater than about 10 hours, inclusive of all values and ranges therebetween.

In some embodiments, the contact period can be less than about 10 hours, less than about 9.5 hours, less than about 9 hours, less than about 8.5 hours, less than about 8 hours, less than about 7.5 hours, less than about 7 hours, less than about 6.5 hours, less than about 6 hours, less than about 5.5 hours, less than about 5 hours, less than about 4.5 hours, less than about 4 hours, less than about 3.5 hours, less than about 3 hours, less than about 2.5 hours, less than about 2 hours, less than about 1.5 hours, less than about 1 hour, less than about 50 minutes, less than about 40 minutes, less than about 30 minutes, or less than about 20 minutes, inclusive of all values and ranges therebetween.

In some embodiments, the contact period can be about 1 hour to about 10 hours, about 1 hour to about 9 hours, about 1 hour to about 8 hours, about 1 hour to about 7 hours, about 1 hour to about 6 hours, about 1 hour to about 5 hours, about 1 hour to about 4 hours, about 1 hour to about 3 hours, about 1 hour to about 2 hours, about 2 hours to about 10 hours, about 2 hours to about 9 hours, about 2 hours to about 8 hours, about 2 hours to about 7 hours, about 2 hours to about 6 hours, about 2 hours to about 5 hours, about 2 hours to about 4 hours, about 2 hours to about 3 hours, about 3 hours to about 10 hours, about 3 hours to about 9 hours, about 3 hours to about 8 hours, about 3 hours to about 7 hours, about 3 hours to about 6 hours, about 3 hours to about 5 hours, or about 3 hours to about 4 hours.

The temperature and/or pH durability of the graphene oxide membrane 100 can also be assessed by contacting the graphene oxide membrane 100 with a test solution that has a high temperature and/or non-neutral pH for a period of time, and comparing the grayscale mode values before and after the contact. In some embodiments, when the membrane is temperature and/or pH durable, the grayscale mode value changes by no more than about 30%, no more than about 25%, no more than about 20%, no more than about 15%, no more than about 10% after the contact. In some embodiments, when the membrane is temperature and/or pH durable, the grayscale mode value changes by no more than about 50, no more than about 40, no more than about 30, or no more than about 20 after the contact. The contact period can be about a few hours (e.g., about 2 hours, about 4 hours, about 6 hours, about 8 hours, about 10 hours, about 12 hours, about 14 hours, about 16 hours, about 18 hours, about 20 hours, or about 22 hours), about one day, or about 2 days.

The procedure for characterizing rejection and permeability of a graphene oxide membrane is as follows: (1) cut a 47 to 50 mm disc from the graphene oxide membrane using a razor blade or laser cuter; (2) load the disc with the graphene oxide side up onto a porous stainless steel frit, which is then mounted into a Sterlitech HP4750 filtration cell; (3) add 60 to 100 mL of 1 wt % lactose solution; (4) place the setup on a stir plate at approximately 750 rpm; and (5) close the feed chamber and pressurize it to 50 to 100 psi. Under this procedure, at least 15 mL of permeate is collected across three samples to ensure that the performance measurement was steady.

In some embodiments, the molecular weight cutoff for the graphene oxide membrane is about 100 Da. In some embodiments, the molecular weight cutoff for the graphene oxide membrane is about 150 Da. In some embodiments, the molecular weight cutoff for the graphene oxide membrane is about 200 Da. In some embodiments, the molecular weight cutoff for the graphene oxide membrane is about 250 Da. In some embodiments, the molecular weight cutoff for the graphene oxide membrane is about 300 Da. In some embodiments, the molecular weight cutoff for the graphene oxide membrane is about 350 Da.

In one aspect, the flux of the graphene oxide membrane 100 can be increased by contacting the membrane 100 with a pretreatment solution that is at least about 50° C. for a period of time. In some embodiments, the pretreatment solution flows through the membrane 100 during the contacting step.

In some embodiments, the membrane 100 is contacted with the pretreatment solution at no more than about 100° C., no more than about 90° C., no more than about 80° C., no more than about 70° C., or no more than about 60° C., inclusive of all values and ranges therebetween. In some embodiments, the membrane 100 is contacted with the pretreatment solution that is at least about 50° C., at least about 55° C., at least about 60° C., at least about 65° C., or at least about 70° C., inclusive of all values and ranges therebetween.

Combinations of the above-referenced ranges for the temperature of the test solution are also possible (e.g., a temperature of at least about 50° C. and no more than about 100° C., or at least about 60° C. and no more than about 90° C.).

In another aspect, the flux of the graphene oxide membrane 100 can be increased by contacting the membrane 100 with a basic pretreatment solution at room temperature or at a temperature greater than room temperature. In some embodiments, the pretreatment solution flows through the membrane 100 during the contacting step.

In some embodiments, the basic pretreatment solution has a pH of about 14, less than about 13.5, less than about 13, less than about 12.5, less than about 12, less than about 11.5, less than about 11, less than about 10.5, less than about 10, less than about 9.5, less than about 9, inclusive of all values and ranges therebetween. In some embodiments, the basic pretreatment solution has a pH of at least about 8.0, at least about 8.5, at least about 9.0, at least about 9.5, at least about 10, or at least about 10.5, inclusive of all values and ranges therebetween.

Combinations of the above referenced ranges for the pH of the basic pretreatment solution are also possible (e.g., at least about 8.0 and less than about 13, or at least about 9.0 and less than about 12).

In some embodiments, the period of time that the membrane is in contact with the pretreatment solution to increase the flux can be less than about 400 hours, less than about 300 hours, less than about 200 hours, less than about 100 hours, less than about 40 hours, less than about 20 hours, less than about 10 hours, less than about 8 hours, less than about 6 hours, less than about 4 hours, or less than about 2 hours, inclusive of all values and ranges therebetween. In some embodiments, the period of time that the membrane is in contact with a pretreatment solution to increase the flux can be at least about 0.5 hours, at least about 1 hour, at least about 1.5 hours, at least about 2 hours, at least about 3 hours, at least about 4 hours, or at least about 8 hours, inclusive of all values and ranges therebetween. Generally, when elevated temperature is used, a shorter period of time is needed to increase the flux than that when room temperature or lower temperature is used.

Combinations of the above referenced ranges for the period of time are also possible (e.g., at least about 0.5 hours and less than about 400 hours, at least about 2 hours and less than about 100 hours, or about 2 hours and less than about 10 hours).

In some embodiments, the flux increases after the contacting step can be less than about 1,000%, less than about 900%, less than about 800%, less than about 700%, less than about 600%, less than about 500%, less than about 400%, less than about 300%, less than about 200%, or less than about 100%, inclusive of all values and ranges therebetween. In some embodiments, the flux increase after the contacting step can be at least about 40%, at least about 50%, at least about 60%, at least about 90%, at least about 150%, or at least about 200%, inclusive of all values and ranges therebetween.

Combinations of the above-referenced ranges for the increase in flux are also possible (e.g., at least about 40% and less than about 1,000%, or at least about 60% and less than about 600%).

Filtration Apparatus

In another aspect, the present disclosure provides a filtration apparatus that includes a support substrate, the graphene oxide membrane 100 of the present disclosure, and optionally a housing. The graphene oxide membrane 100 can be disposed on the support substrate. The housing can enclose the support substrate and graphene oxide membrane 100.

The support substrate can include a non-woven fiber or polymer. In some embodiments, the support substrate can include a material selected from polypropylene (PP), polystyrene, polyethylene, polyethylene oxide, polyethersulfone (PES), polytetrafluoroethylene (PTFE), polyvinylidene fluoride, polymethylmethacrylate, polydimethylsiloxane, polyester, polyolefin, cellulose, cellulose acetate, cellulose nitrate, polyacrylonitrile, glass fiber, quartz, alumina, silver, polycarbonate, nylon, Kevlar or other aramid, or polyether ether ketone.

In some embodiments, the support substrate is a microporous substrate. The support substrate can have an average pore size of 0.1 μm to 10 μm, e.g., 0.1 μm to 8 μm, 0.1 μm to 5 μm, 0.2 μm to 5 μm, 0.2 μm to 2 μm, or 0.2 μm to 1 μm. In some embodiments, the support substrate can have an average pore size less than 1 μm, such as about 0.2 μm, about 0.3 μm, about 0.4 μm, about 0.45 μm, about 0.5 μm, about 0.55 μm, about 0.6 μm, about 0.65 μm, about 0.7 μm, or about 0.75 μm.

In some embodiments, the graphene oxide membrane 100 and the support substrate can have a combined thickness of about 100 microns, about 150 microns, about 200 microns, about 250 microns, about 300 microns, about 350 microns, about 400 microns, about 450 microns, about 500 microns, inclusive of all values and ranges therebetween.

In some embodiments, the support substrate can include two or more layers. For example, the support substrate can include a first layer and a second layer, the first layer is disposed on the second layer, wherein the first layer and the second layer have different average pore sizes. In some embodiments, the graphene oxide membrane is disposed on the first layer, and the first layer has a smaller average pore size than the second layer.

In some embodiments, the support substrate can comprise a hollow polymer tube. The hollow polymer tube can have a surface area greater than or equal to about 100 $cm^2$.

In some embodiments, the graphene oxide membrane 100 can comprise a plurality of flat polymer sheets combined to form a spiral filtration module. For example, in some embodiments, a spiral filtration module can comprise a plurality of flat polymer sheets stacked atop one another, and the plurality of stacked flat polymer sheets may be rolled around a core tube. In some embodiments, prior to being rolled around the core tube, adjacent flat polymer sheets may be separated by a sheet of feed channel spacer to form a leaf, and each leaf may be separated by a sheet of permeate spacer. When the flat polymer sheets, the one or more feed channel spacers, and the one or more permeate spacers are rolled around the core tube, each permeate spacer may form a permeate channel.

Without wishing to be bound by theory, the graphene oxide membranes described herein can endure high-pressure operations, e.g., operations at about 500 psi to 1600 psi or greater, as the chemical spacers keep the graphene oxide sheets together with strong hydrogen bonding and permit the sheets to shift past each other under high pressure compaction. In some embodiments, the support substrate can have a Young's modulus of no more than about 3.0 GPa, no more than about 2.5 GPa, no more than about 2.0 GPa, no more than about 1.8 GPa, no more than about 1.6 GPa, no more than about 1.4 GPa, or no more than about 1.2 GPa, inclusive of all values and ranges therebetween. In some embodiments, the support substrate can have a Young's modulus of at least about 0.5 GPa, at least about 0.6 GPa, at least about 0.7 GPa, at least about 0.8 GPa, at least about 0.9 GPa, at least about 1.0 GPa, at least about 1.1 GPa, at least about 1.3 GPa, at least about 1.5 GPa, or at least about 2.0 GPa, inclusive of all values and ranges therebetween.

Combinations of the above referenced ranges for the Young's modulus of the support substrate are also possible (e.g., a Young's modulus of at least about 0.5 GPa and no more than about 3.0 GPa, or at least about 1.5 GPa and no more than about 3.0 GPa).

In some embodiments, the high-pressure operation is about 900 psi, about 1000 psi, about 1100 psi, about 1200 psi, about 1300 psi, about 1400 psi, about 1500 psi, or about 1600 psi.

For high-pressure durability, the support substrate can have a thickness of no more than about 750 µm, no more than about 700 µm, no more than about 650 µm, no more than about 550 µm, no more than about 500 µm, no more than about 450 µm, or no more than about 400 µm, inclusive of all values and ranges therebetween. In some embodiments, the support substrate can have a thickness of at least about 200 µm, at least about 220 µm, or at least about 240 µm, inclusive of all values and ranges therebetween.

Combinations of the above referenced ranges for the thickness of the support substrate for high pressure durability are also possible (e.g., a thickness of at least about 200 µm and no more than about 750 µm, at least about 240 µm and no more than about 500 µm).

In some embodiments, the support substrate suitable for high pressure durability can comprise PES, PTFE, PP, PAN, polyolefin, nylon, or a combination thereof.

The support substrate can have one layer, two layers, three layers, or more. In some embodiments, the support substrate can comprise a first layer in contact with the membrane 100, and a second layer disposed on the first layer, the second layer configured to provide further mechanical support. The first layer can comprise the same material as the second layer. For example, the first layer can comprise PES, and the second layer can comprise PES. The first layer can comprise a different material from the second layer.

In some embodiments, the support substrate can comprise a first layer in contact with the membrane 100, a second layer disposed on the first layer, and a third layer disposed on the second layer. For example, the first layer can comprise PTFE; the second layer can comprise PP; and the third layer can comprise PES.

In some embodiments, the support substrate can comprise a first layer in contact with the membrane 100, a second layer disposed on the first layer, a third layer disposed on the second layer, and a fourth layer disposed on the third layer. For example, the first layer can comprise PTFE; the second layer can comprise PP; the third layer can comprise PTFE; and the fourth layer can comprise PP.

To test whether a graphene oxide membrane on a support substrate can endure high pressure operations, a graphene oxide membrane on a support substrate having a first lactose rejection rate of at least 50% with a first 1 wt % lactose solution at room temperature is subjected to a pressure of about 1000 psi for a period of time. Afterwards, if the graphene oxide membrane has a second lactose rejection rate of at least 50% with a second 1 wt % lactose solution at room temperature, then the membrane is deemed to be able to endure high pressure operations. In some embodiments, the period of time is about 1 hour to 24 hours, e.g., about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, or about 24 hours. In some embodiments, for testing purposes, the support substrate is mounted on a standard tricot permeate carrier (e.g. 0.012 inches thick, ~5 oz/sq yard, and 50 wales and 48 courses per inch).

Manufacture of the Graphene Oxide Membrane and Filtration Apparatus

The fabrication of the membrane 100 includes dispersing the graphene oxide sheets 110 in a solvent to produce a stable dispersion. In some embodiments, the solvent can be water. In some embodiments, the solvent can be organic. The dispersion may exhibit certain physical and chemical characteristics in order to produce continuous and uniform coatings substantially free of structural defects such as pinholes. For example, the hydrophilicity of the dispersion should be adequately matched to the support substrate to ensure wetting of the support substrate surface. This can be tested through contact angle measurements.

The stability of the dispersion can be inferred from the pH of the dispersion. For example, dispersions that exhibit acidic pH values (e.g., pH≤5) can develop visible aggregates. Fabricating coatings with such dispersions leads to poor coverage, coating non-uniformity, and poor membrane performance. In contrast, dispersions that have basic pH are stable. Moreover, addition of basic additives to the dispersion can increase the magnitude of the zeta potential on the graphene oxide sheets 110, which in turn leads to greater Coulombic stabilization.

The stability of the dispersion can be indirectly observed through UV-Vis spectroscopy measurements, owing to the absorption band at around 300 nm, attributed to n-to-p* transitions. At longer wavelengths (>500 nm) the graphene oxide sheets 110 absorb very weakly, and consequently, any signal in this region can be attributed to scattering, rather than absorption, due to the formation of aggregates. The ratio of UV-Vis signal at 300 nm (due to absorption) and that observed at 600 nm (due to aggregate scattering) can be used to characterize the dispersion in the solution. Generally, the higher this ratio is, the better the graphene oxide sheets 110 are dispersed.

In some embodiments, the ratio of UV-Vis signal at 300 nm and that observed at 600 nm can be less than about 4.4, less than about 4.2, less than about 4.0, less than about 3.8, less than about 3.6, less than about 3.4, less than about 3.2, or less than about 3.0, inclusive of all values and ranges therebetween. In some embodiments, the ratio of UV-Vis signal at 300 nm and that observed at 600 nm can be at least about 3.0, at least about 3.1, at least about 3.2, at least about 3.3, or at least about 3.4, inclusive of all values and ranges therebetween.

Combinations of the above referenced ranges for the ratio are also possible (e.g., a ratio of at least about 3.0 and less than about 4.4, at least about 3.2 and less than about 4.0).

In some embodiments, the dispersion can further include viscosity modifiers and/or surfactants. In some embodiments, the viscosity modifier is hydroxypropyl methyl cellulose (HPMC). For example, the dispersion can include about 0.01 wt % viscosity modifier. In some embodiments, the surfactant is sodium dodecyl sulfide (SDS). For example, the dispersion can include about 0.15 wt % surfactant.

In some embodiments, the viscosity of the dispersion can be no more than about 100 cP at a shear rate of about 50 Hz, no more than about 90 cP at a shear rate of about 50 Hz, no more than about 80 cP at a shear rate of about 50 Hz, or no more than about 70 cP at a shear rate of about 50 Hz. In some embodiments, the viscosity of the dispersion can be at least about 10 cP at a shear rate of about 50 Hz, at least about 20 cP at a shear rate of about 50 Hz, or at least about 30 cP at a shear rate of about 50 Hz.

Combinations of the above referenced ranges for the viscosity of the dispersion are also possible (e.g., a viscosity of at least about 10 cP and no more than about 100 cP at a shear rate of about 50 Hz, at least about 20 cP and no more than about 90 cP at a shear rate of about 50 Hz).

To produce dispersions that can coat well onto the support substrates, the order of addition of reagents can be important. For example, prior to deposition, dispersions that undergo carbodiimide coupling conditions require adjustment of the pH to be greater than 8.0 prior to the addition of 1-Ethyl-3-(3-dimethylaminopropyl)carbodiimide (EDC) and N-hydroxysuccinimide (NHS).

Prior to the reaction with a chemical spacer precursor, the graphene oxide sheets can be functionalized with one or more desirable chemical groups. For example, the graphene oxide sheets can be functionalized with amines. See Navaee, A. & Salimi, A, "Efficient amine functionalization of graphene oxide through the Bucherer reaction: an extraordinary metal-free electrocatalyst for the oxygen reduction reaction," *RSC Adv.* 5, 59874-59880 (2015), the contents of which are incorporated by reference.

The graphene oxide sheets can also be functionalized with carboxylic groups. See Sydlik, S. A. & Swager, T. M., "Functional Graphenic Materials Via a Johnson-Claisen Rearrangement," *Adv. Funct. Mater.* 23, 1873-1882 (2012); Collins, W. R., et al., "Rearrangement of Graphite Oxide: A Route to Covalently Functionalized Graphenes," *Angew. Chem., Int. Ed.* 50, 8848-8852 (2011), the contents of each of which are incorporated by reference.

In some embodiments, the graphene oxide sheets can be functionalized with hydroxyl groups. For example, a graphene oxide sheet can react with an epoxide so that the graphene oxide sheet is functionalized with hydroxyl groups. Examples of epoxides include, but are not limited to, 1,2-epoxypropane, styrene oxide, ethylene oxide, epichlorohydrine, 1,2-epoxybutane, bisphenol A diglycidyl ether, 1,3-butadiene diepoxide, and 1,2,7,8-diepoxyoctane.

Once the graphene oxide sheets have the desirable chemical groups, they can be placed in contact with the chemical spacer precursor to initiate a reaction between the graphene oxide sheets and the chemical spacer precursor. The reaction conditions can vary, depending on the chemical spacer precursor used. As compared to existing processes, some embodiments of the processes of the present disclosure can be performed under ambient environments (i.e., in the presence of oxygen and humidity).

Figure 2A:
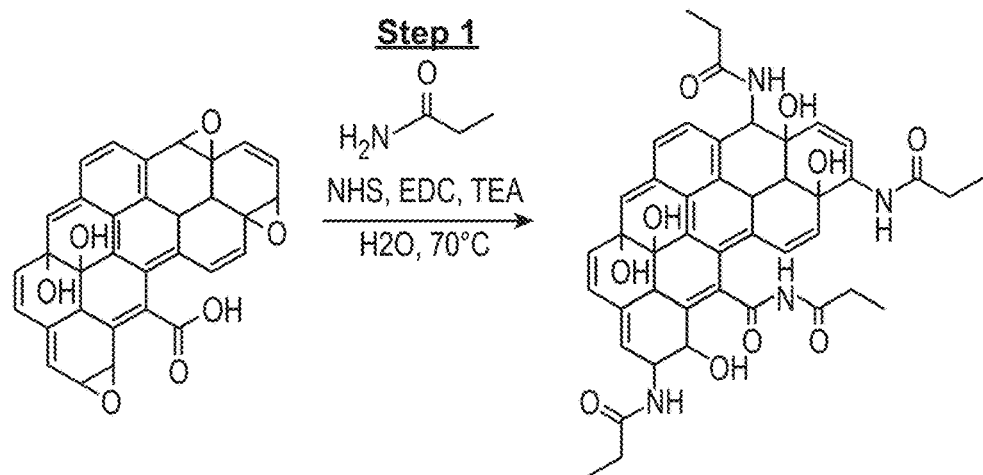
FIGS. 2A-2F present examples of one-step reactions between graphene oxide sheets and chemical spacers.
Figure 2B:
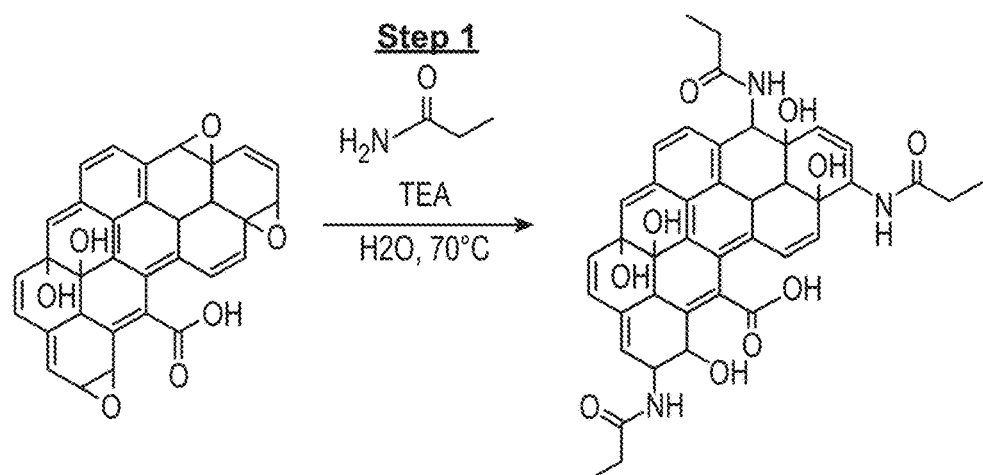
Figure 2C:
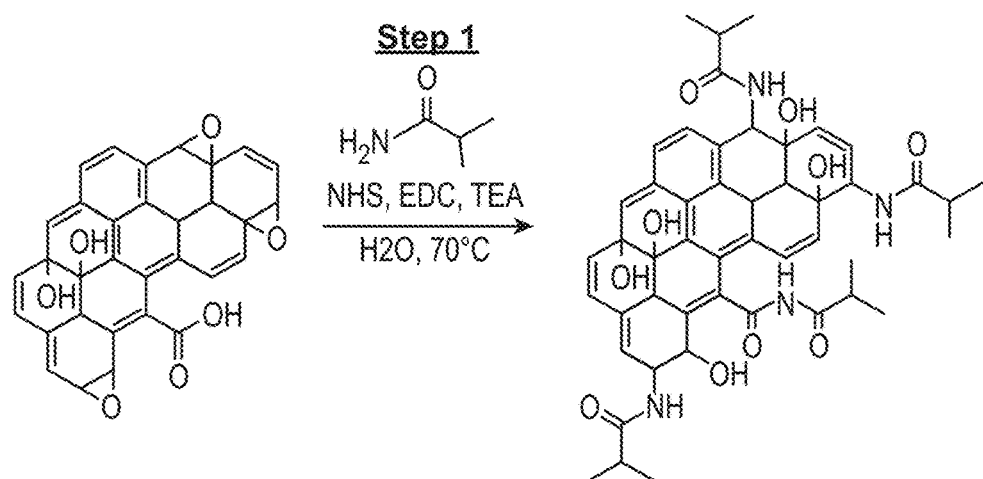
Figure 2D:
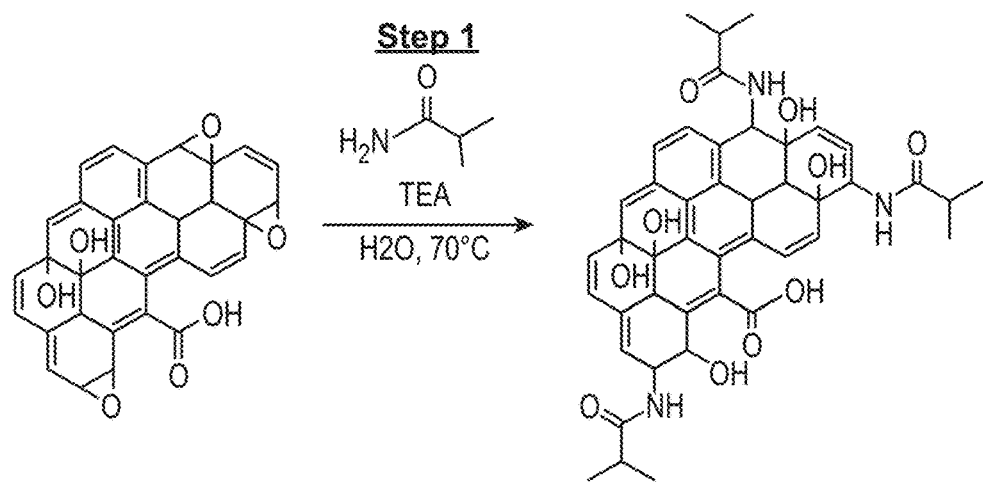
Figure 2E:
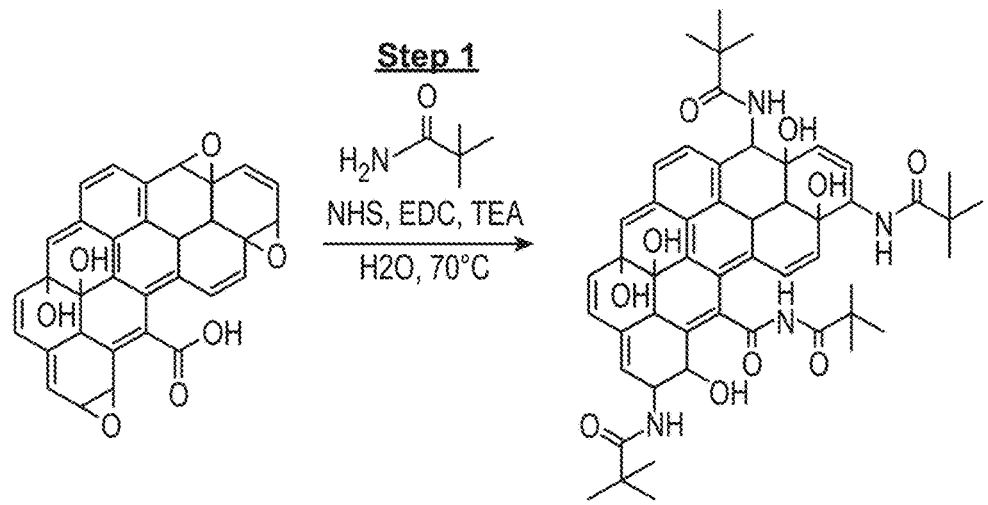
Figure 2F:
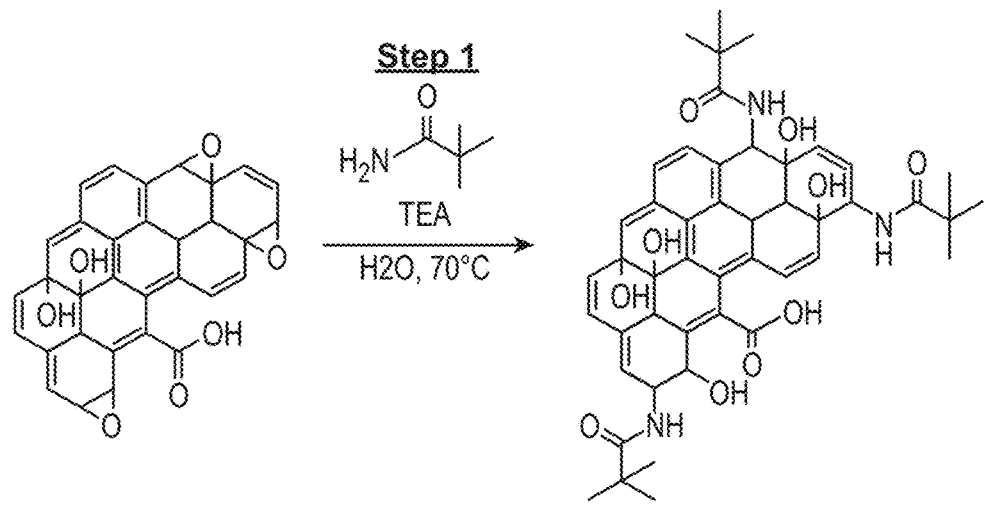

In some embodiments, reactions between graphene oxide sheets 110 and the chemical spacer precursor are carried out in solution to produce the graphene oxide membranes 100, and then graphene oxide membranes 100 are casted onto the support substrate. FIGS. 2A-2F present several examples of reactions involving graphene oxide sheets and chemical spacers. In FIGS. 2A and 2B, the graphene oxide sheets are reacted with propionamide, and each of the epoxide and carboxylic acid groups on the graphene oxide sheet are functionalized by the propionamide. In FIGS. 2C and 2D, the graphene oxide sheets are reacted with isobutyramide, and at least a portion of the epoxide and carboxylic acid groups on the graphene oxide sheet are functionalized by the isobutyramide. In FIGS. 2E and 2F, the graphene oxide sheets are reacted with pivalamide, and at least a portion of the epoxide and carboxylic acid groups on the graphene oxide sheet are functionalized by the pivalamide. Each of these reactions can occur in a solution of NHS, EDC, and triethylamine (TEA).

In some embodiments, triethylamine (TEA), 1,4-diazabicyclo[2.2.2]octane (DABCO), potassium hydroxide (KOH), sodium hydroxide (NaOH), cesium hydroxide (CsOH), lithium hydroxide (LiOH), or other bases can be used to deprotonate the relevant alcohol groups and accelerate the reaction in many cases. In some embodiments, the base is TEA. In some embodiments, the base is CsOH. In some embodiments, the pH of the reaction is in the range of about 9 to 13, e.g., about 9, about 9.5, about 10, about 10.5, about 11, about 11.5, about 12, about 12.5, or about 13.

In some embodiments, the reaction temperature is about 50° C. to 70° C., e.g., about 50° C., about 55° C., about 60° C., about 65° C., or about 70° C.

In some embodiments, the filtration apparatus can be manufactured by depositing the graphene oxide membrane onto a suitable support substrate.

In some embodiments, the filtration apparatus can be manufactured by depositing a plurality of graphene oxide sheets on a suitable support substrate and then forming a graphene oxide membrane in situ.

In some embodiments, the filtration apparatus can be manufactured according to the following steps: (a) depositing a plurality of graphene oxide sheets onto a suitable support substrate; (b) immersing the graphene oxide sheets and support substrate in a solution containing a chemical spacer precursor; (c) reacting the graphene oxide with the chemical spacer precursor under appropriate conditions; and (d) washing the graphene oxide sheets and support substrate. The graphene oxide sheets can be functionalized by one or more chemical groups prior to the deposition. If the substrate comprises PES, then DMF is not used to wash the substrate.

In some embodiments, the filtration apparatus can be manufactured according to the following steps: (a) mixing a plurality of graphene oxide sheets and a chemical spacer precursor in a solvent; (b) depositing the graphene oxide sheets and the chemical spacer precursor onto a suitable support substrate; (c) immersing or coating the support substrate with an activating agent; and (d) washing the graphene oxide sheets and support substrate. The graphene oxide sheets can be functionalized by one or more chemical groups prior to the deposition.

Applications

The graphene oxide membrane or filtration apparatus disclosed herein can be used for a wide range of nanofiltration or microfiltration applications, including but not limited to, concentration of molecules (e.g., whey, lactose), kraft pulping (e.g., wood pulp), sulfite pulping, desalting (e.g., lactose, dye, chemicals, pharmaceuticals), fractionation (e.g., sugars), extraction (e.g., nutraceuticals, plant oils), recovery (e.g., catalyst, solvent), and purification (e.g., pharmaceutical, chemical, fuel). For example, a fluid comprising a plurality of species (e.g., plurality of retentate species) may be placed in contact with a first side of the graphene oxide membrane. The graphene oxide membrane may have interlayer spacing and/or intralayer spacing that are sized to prevent at least a portion of the species from traversing the membrane through the interlayer spacing and/or intralayer spacing, i.e., flowing from the first side of the graphene oxide membrane and to a second, opposing side of the graphene oxide membrane. In some embodiments, the fluid may include one or more types of species (e.g., a retentate species or a permeate species). In some embodiments, the graphene oxide membrane may have an average interlayer spacing and/or intralayer spacing that is sized to prevent at least a portion of the retentate species from traversing the graphene oxide membrane, while allowing at least a portion (e.g., substantially all) of the permeate species to traverse the graphene oxide membrane.

The graphene oxide membrane or filtration apparatus disclosed herein can be used in reverse osmosis to remove ions, molecules, and larger particles from a fluid, e.g., drinking water.

In some embodiments, the graphene oxide membrane or filtration apparatus disclosed herein can be used in methods for filtering raw milk, cheese whey, whey protein concentrate, mixtures comprising lactose, and whey protein isolate. The methods can include flowing the raw milk through the graphene oxide membrane.

The graphene oxide membrane or filtration apparatus disclosed herein can also be used for the removal of lignin from black liquor. Weak black liquor from pulp digestion is generally produced at 80° C. to 90° C. Cooling the weak black liquor prior to filtration would be very expensive and energy intensive. Without the need for cooling, the weak black liquor can pass through the graphene oxide membrane described herein at a high temperature, e.g., 80° C. to 90° C. or 75° C. to 85° C. In some embodiments, black liquor can be flowed through the filtration apparatus described herein, wherein the black liquor comprises lignin, sodium sulfate, sodium carbonate, sodium hydrosulfide, sodium thiosulfate, and/or sodium hydroxide.

The performance of the membrane for black liquor filtration can be assessed by the rejection rate on a total solids basis. In some embodiments, the rejection rate is between about 75% and about 95% on a total solids basis, e.g., between about 75% and about 90%, between about 75% and about 85%, or between 80% and about 95% on a total solids basis.

In some embodiments, the graphene oxide membrane can reject at least a portion of the lignin. In some embodiments, the graphene oxide membrane can reject at least about 50%, at least about 60%, at least about 70%, at least about 80%, at least about 90%, at least about 95%, at least about 96%, at least about 97%, at least about 98%, at least about 99%, or at least about 99.5% of the lignin.

In some embodiments, the graphene oxide membrane can reject at least a portion of the sodium sulfate. In some embodiments, the graphene oxide membrane can reject at least about 50%, at least about 60%, at least about 70%, at least about 80%, at least about 90%, at least about 95%, at least about 96%, at least about 97%, at least about 98%, at least about 99%, or at least about 99.5% of the sodium sulfate.

In some embodiments, the graphene oxide membrane can reject at least a portion of the sodium carbonate. In some embodiments, the graphene oxide membrane can reject at least about 50%, at least about 60%, at least about 70%, at least about 80%, at least about 90%, at least about 95%, at least about 96%, at least about 97%, at least about 98%, at least about 99%, or at least about 99.5% of the sodium carbonate.

In some embodiments, the graphene oxide membrane can reject at least a portion of the sodium hydrosulfide. In some embodiments, the graphene oxide membrane can reject at least about 50%, at least about 60%, at least about 70%, at least about 80%, at least about 90%, at least about 95%, at least about 96%, at least about 97%, at least about 98%, at least about 99%, or at least about 99.5% of the sodium hydrosulfide.

In some embodiments, the graphene oxide membrane can reject at least a portion of the sodium thiosulfate. In some embodiments, the graphene oxide membrane can reject at least about 50%, at least about 60%, at least about 70%, at least about 80%, at least about 90%, at least about 95%, at least about 96%, at least about 97%, at least about 98%, at least about 99%, or at least about 99.5% of the sodium thiosulfate.

In some embodiments, the graphene oxide membrane can reject at least a portion of the sodium hydroxide. In some embodiments, the graphene oxide membrane can reject at least about 50%, at least about 60%, at least about 70%, at least about 80%, at least about 90%, at least about 95%, at least about 96%, at least about 97%, at least about 98%, at least about 99%, or at least about 99.5% of the sodium hydroxide.

Figure 3:
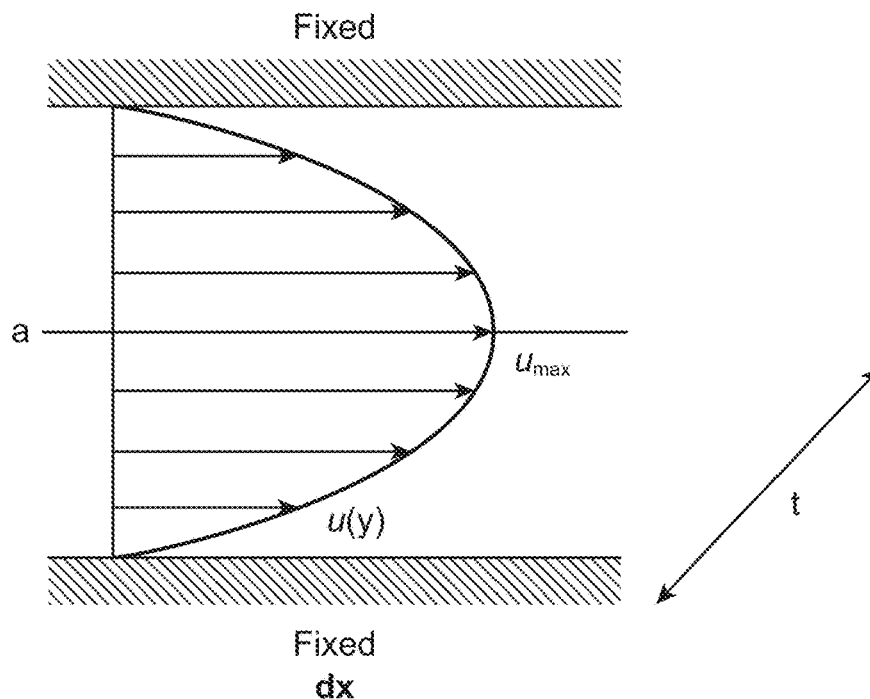
FIG. 3 is a modeling diagram that models an arbitrarily sized membrane system using a simple picture of permeability and rejection from dead end or crossflow. Every constituent species is tracked. Counter ions (e.g., sodium) given same rejection as pair ion (e.g., Na paired with lignin, Na paired with Cl, Na paired with $SO_4$, etc.). (Total or species flow rate in)*a*t=2*(flux through membrane)*dx*t+ (flow rate out)*a*t.

In some embodiments, the graphene oxide membrane can be designed using simulations. FIG. 3 is modeling diagram that models arbitrarily sized membrane system using simple picture of permeability and rejection from dead end or crossflow. Based on the results of these simulations, a high-rejection graphene oxide membrane can process dilute black liquor at high operating pressures. In some embodiments, a lower (<80%) rejection rates of specific salts can also accomplish the desired rejection percentage by passing permeate through a second, small system. In some embodiments, membranes designed have specific rejection targets for hydroxide, monovalent salts, divalent salts, weak black liquor (WBL), and/or different organic constituents of WBL. In some embodiments, the composition of permeates can be estimated based on the selected membrane systems.

In some embodiments, models of arbitrarily sized membrane system can be developed based on permeability data and rejection from dead end or crossflow. In some embodiments, every constituent species can be tracked. Counter ions (e.g., sodium) can be given the same rejection rate as pair ion (e.g., sodium pared with lignin, sodium paired with Cl, sodium paired with sulfates). In some embodiments, a total or species flow rate can be calculated based on the formula presented in FIG. 3.

In some embodiments, a system can be designed with a first pass only ("single-pass system"). In some embodiments, a feed can be split over sets of 5 spirals in series. In some embodiments, the system can be designed as a multi-pass system (e.g., a 2-pass system). In some embodiments, permeate from a first system can be passed to a second simulation as feed. In some embodiments, concentrates from both systems can be collected and combined. In some embodiments, system design is intended to lower operating pressure and/or provide cleaner permeate.

In some embodiments, a model of a filtration system can include fixed parameters and/or variable parameters. In some embodiments, the fixed parameters can include feed spacing, permeability, temperature, viscosity, molar volume, density, rejection of large organics, minimum driving pressure (feed pressure-feed osmotic pressure), relative amounts of each WBL component (percent of total dissolved solids for each non-hydroxide solute component), molecular weights, and/or methanol level. In some embodiments, the temperature can be about 80° C. In some embodiments, the minimum driving pressure can be about 1 MPa. In some embodiments, the molecular weight of lignin can be about 5,000 Da. In some embodiments, the molecular weight for dissolved carbohydrates and hemicelluloses can be about 500. In some embodiments, methanol level can be about 1 wt %.

In some embodiments, the variable parameters can include the number of modules in each pass, total dissolved solids (TDS), pressure, divalent rejection, difference between divalent and monovalent rejection, and/or hydroxide rejection. In some embodiments, TDS can be about 9 wt % to about 18 wt %. In some embodiments, TDS can be about 9 wt %, about 10 wt %, about 11 wt %, about 12 wt %, about 13 wt %, about 14 wt %, about 15 wt %, about 16 wt %, about 17 wt %, about 18 wt %, inclusive of all values and ranges therebetween. In some embodiments, TDS can be about 12.5 wt % to about 16.5 wt %. In some embodiments, pressure can be about 4 MPa to about 10 MPa. In some embodiments, the organic rejection can be about 1. In some embodiments, divalent rejection can be about 0.4 to about 1. In some embodiments, monovalent rejection can be about 0.05 to about 0.2 less than the divalent rejection. In some embodiments, hydroxide rejection can be about 0 to about equal to the monovalent rejection.

The high temperature capability of these membranes enables their use in reverse osmosis like concentration of WBL in the Kraft and sulfite pulping industries. This can be illustrated in FIGS. 4-9E. The concentration, production rate, and composition of WBL varies widely form mill to mill.

The concentration of liquors by membrane process was modeled. A discretized fluid flowing between two parallel sheets of membrane (FIG. 3) at high pressure is considered. An amount of fluid passes through the membrane sheets on either side according to the permeability of the membrane and the pressure of the fluid. The rejection properties of the membrane determine the composition of the permeate. The fluid then passes to the next discretized fluid element according to mass conservation. When the fluid reaches the end of the membrane system, the solution is now considered to be the concentrate. The sum of all the discretized permeate elements is the total permeate. The recovery ratio or percentage of the feed which becomes the permeate thus relates to the strength of the concentrate and the rate of permeate production by the system. Different feed pressures, membrane rejections and liquor strengths are illustrated.

Figure 4:
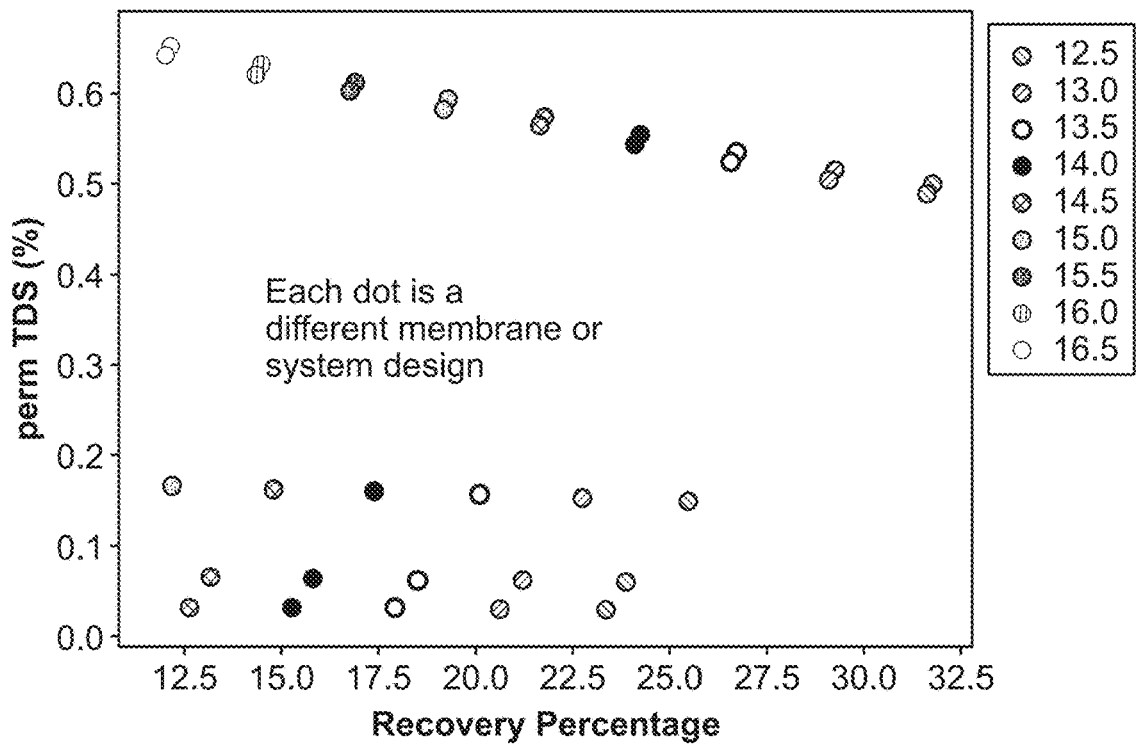
FIG. 4 is a graph showing simulation results for a 1.0 rejection coefficient for divalent salts, a 750-module system size, and 1000 psi operating pressure. Each series of dots represents a different feed concentration. Some mills will have more or less concentrated feed liquor.
Figure 6A:
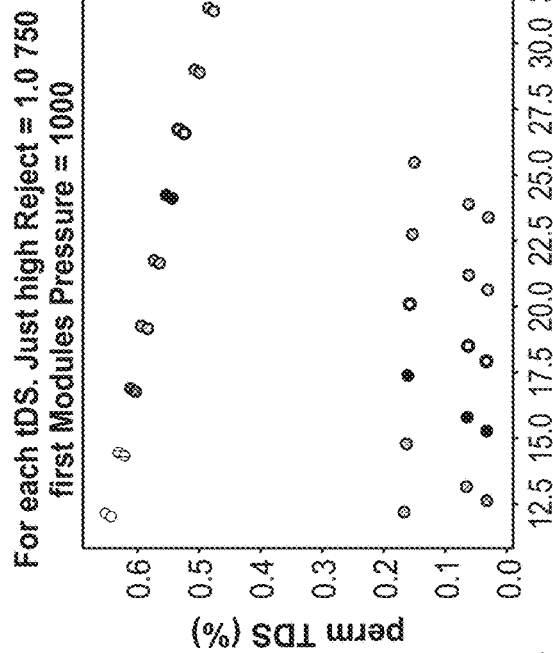
Figure 6B:
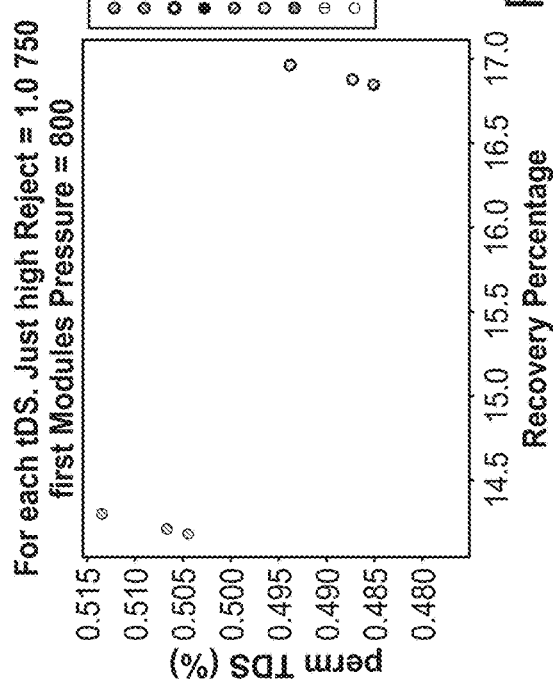
Figure 6C:
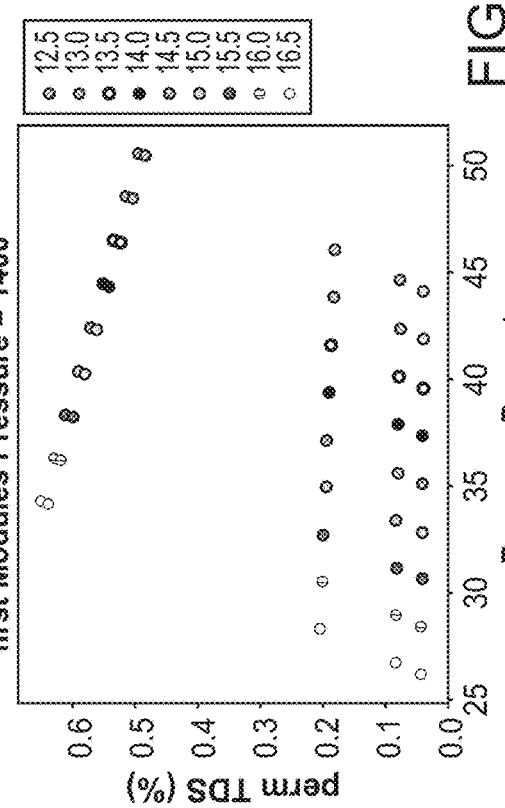
Figure 6D:
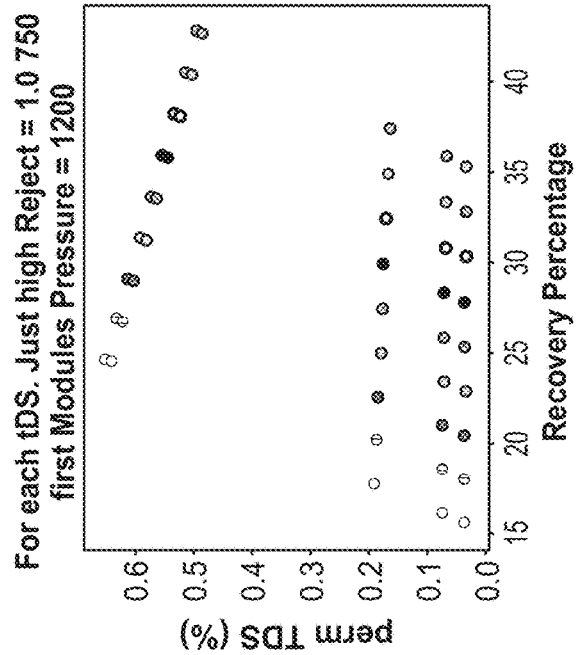
Figure 7A:
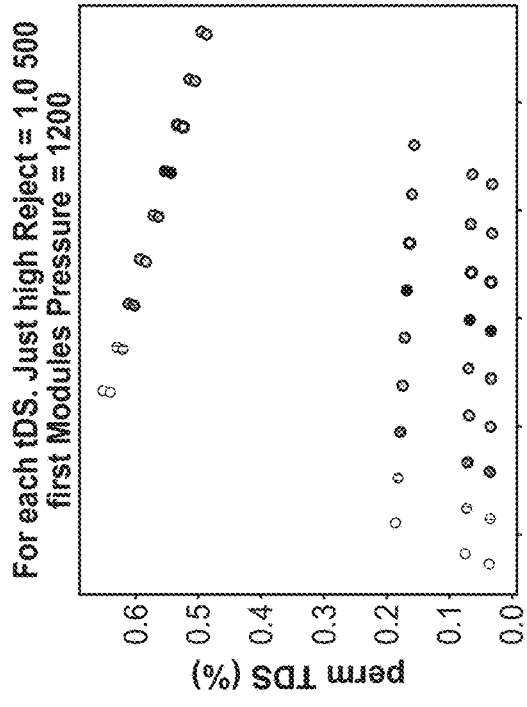
Figure 7C:
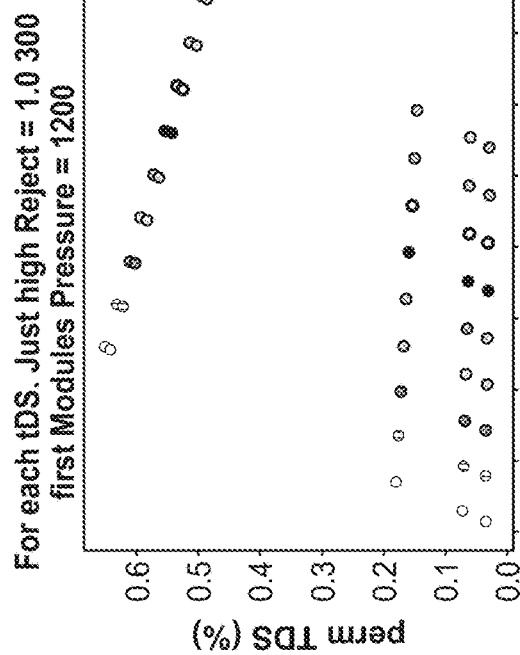
Figure 7B:
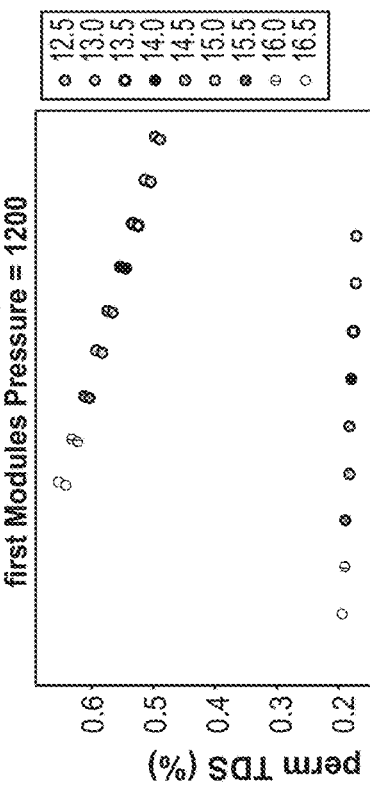
Figure 7D:
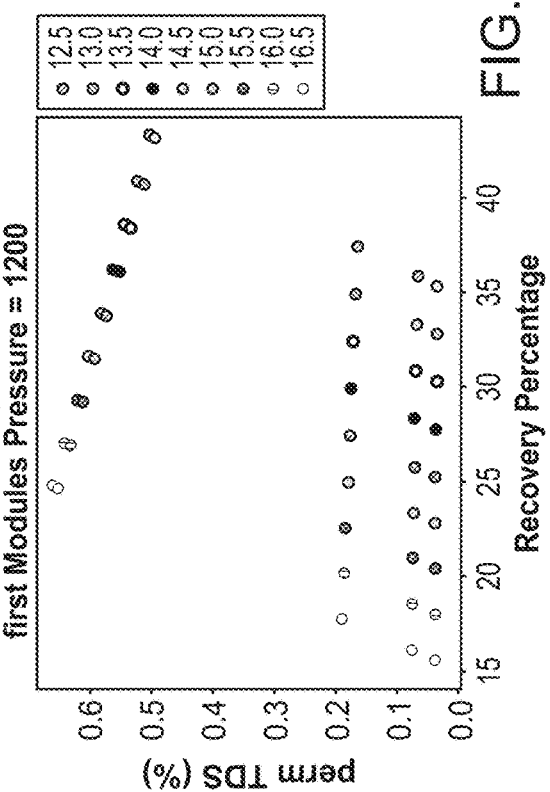
Figure 8A:
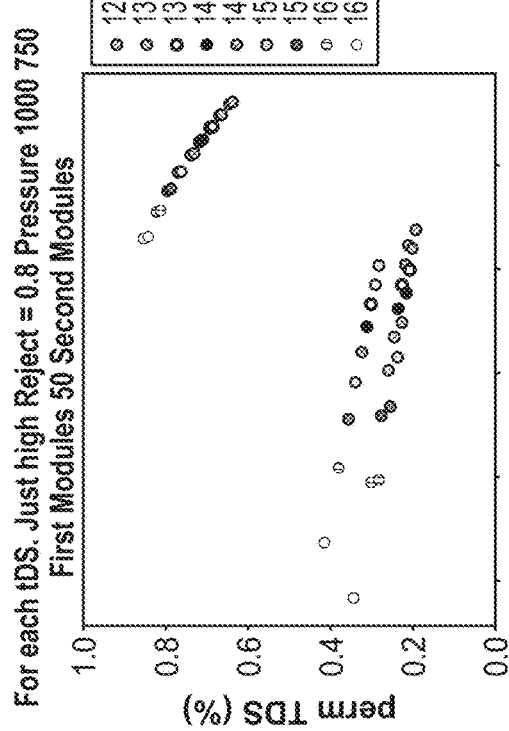
Figure 8B:
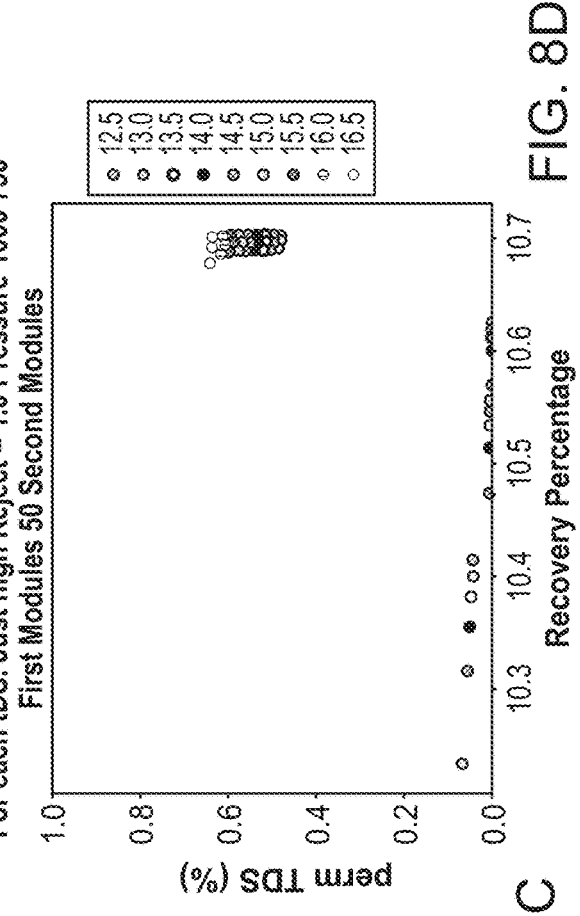
Figure 8C:
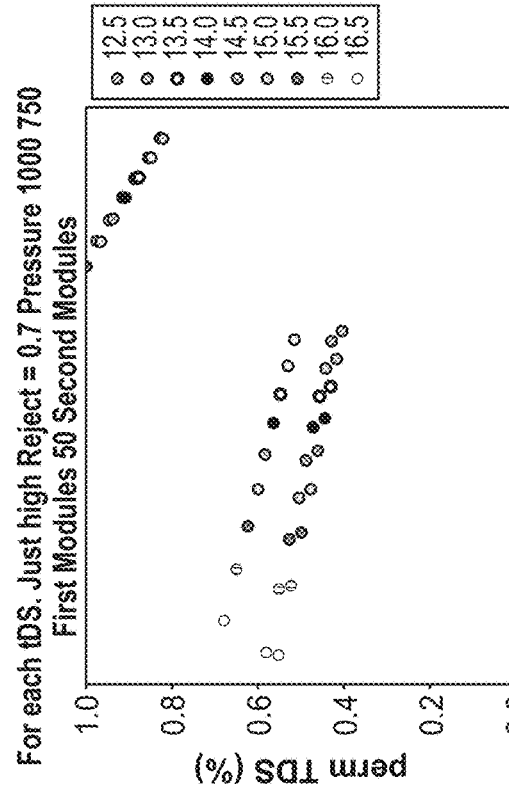
Figure 8D:
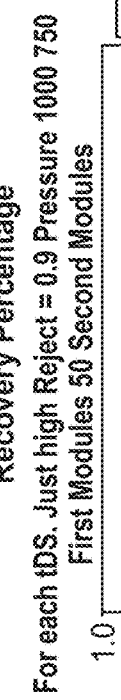
Figure 9A:
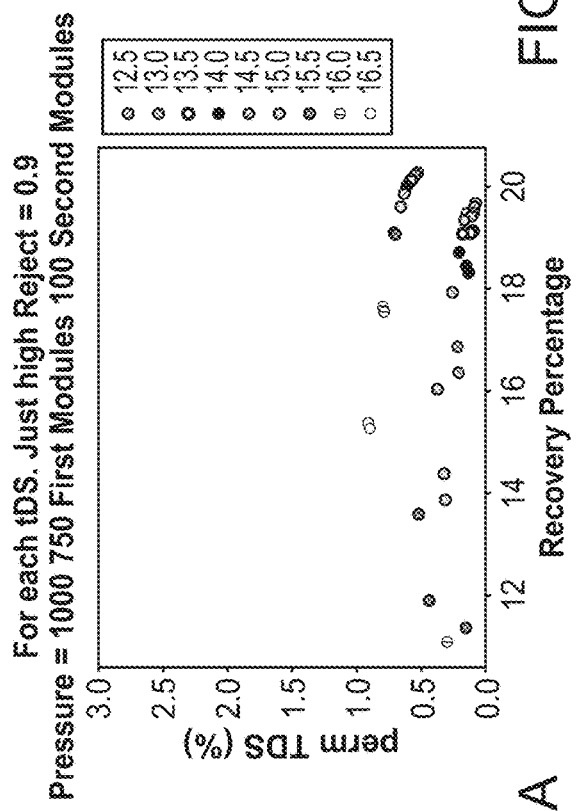
Figure 9B:
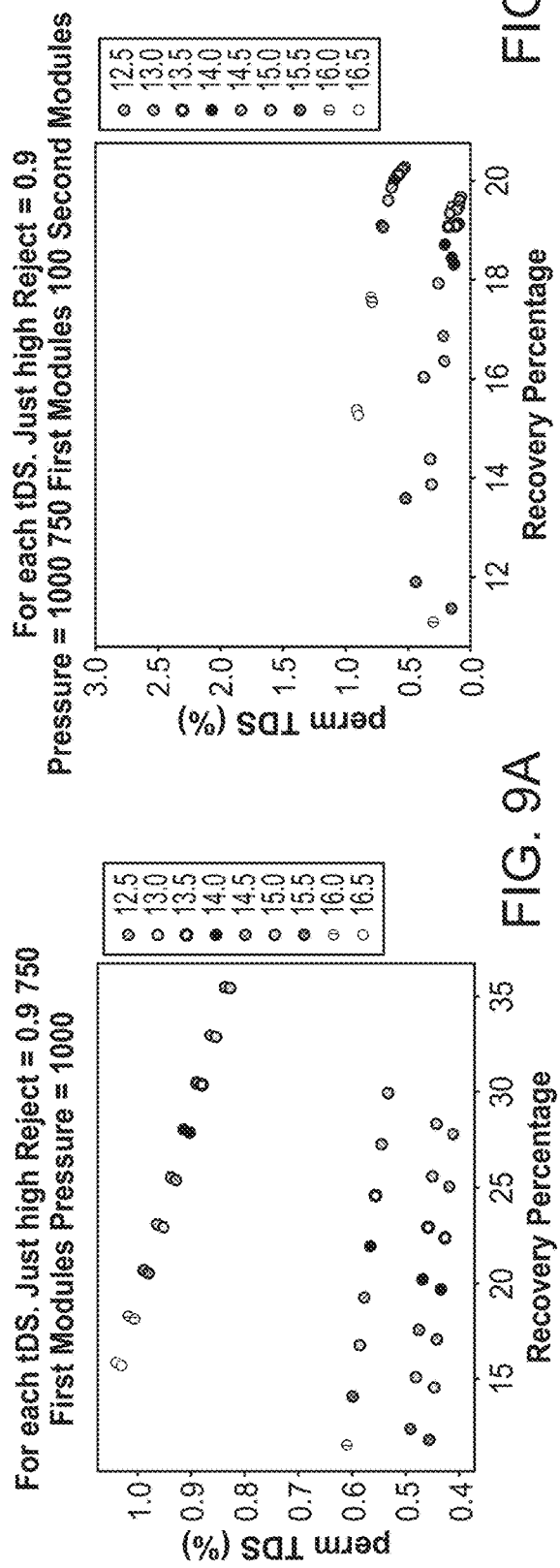
Figure 9C:
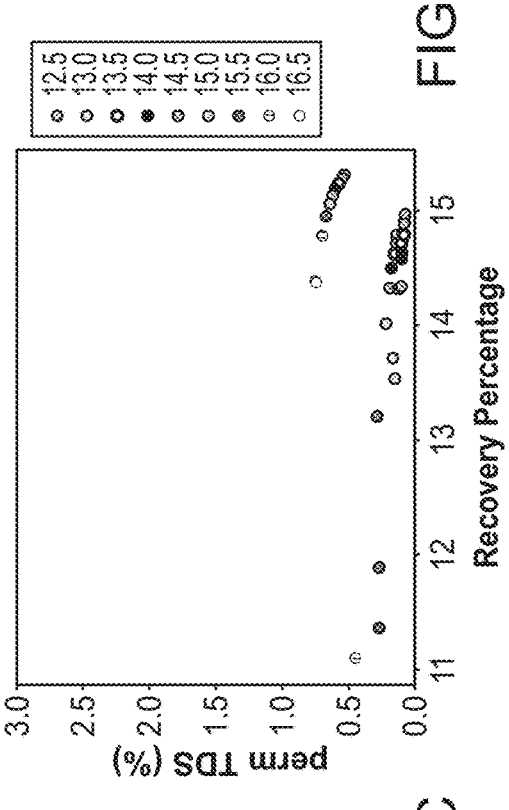
Figure 9D:
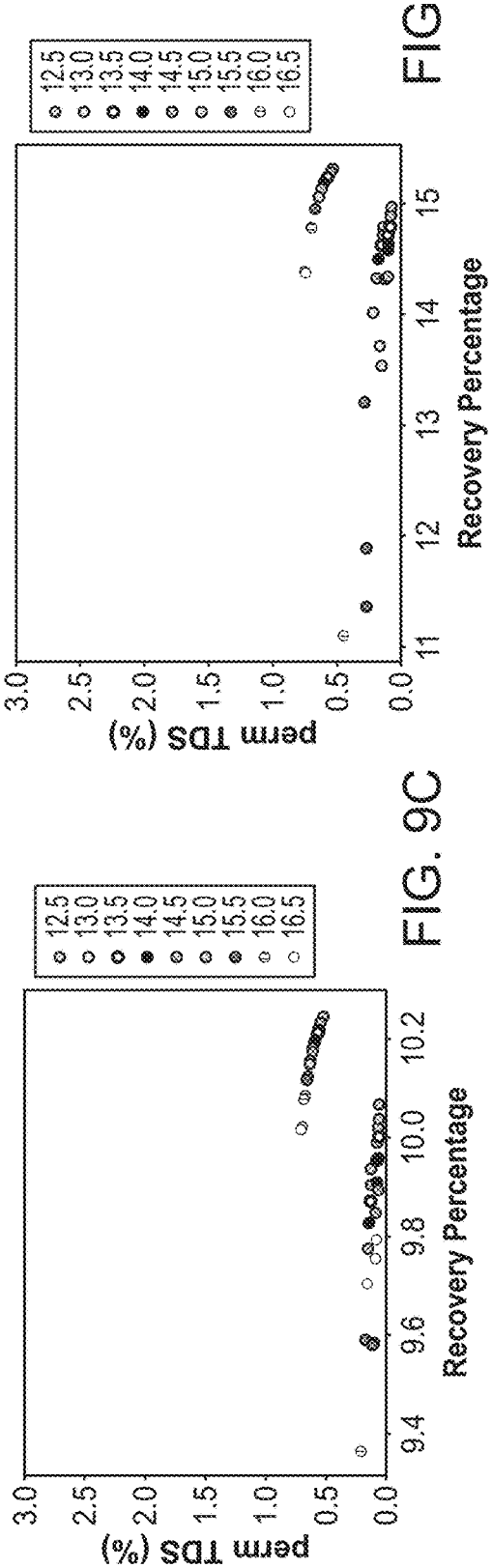
Figure 9E:
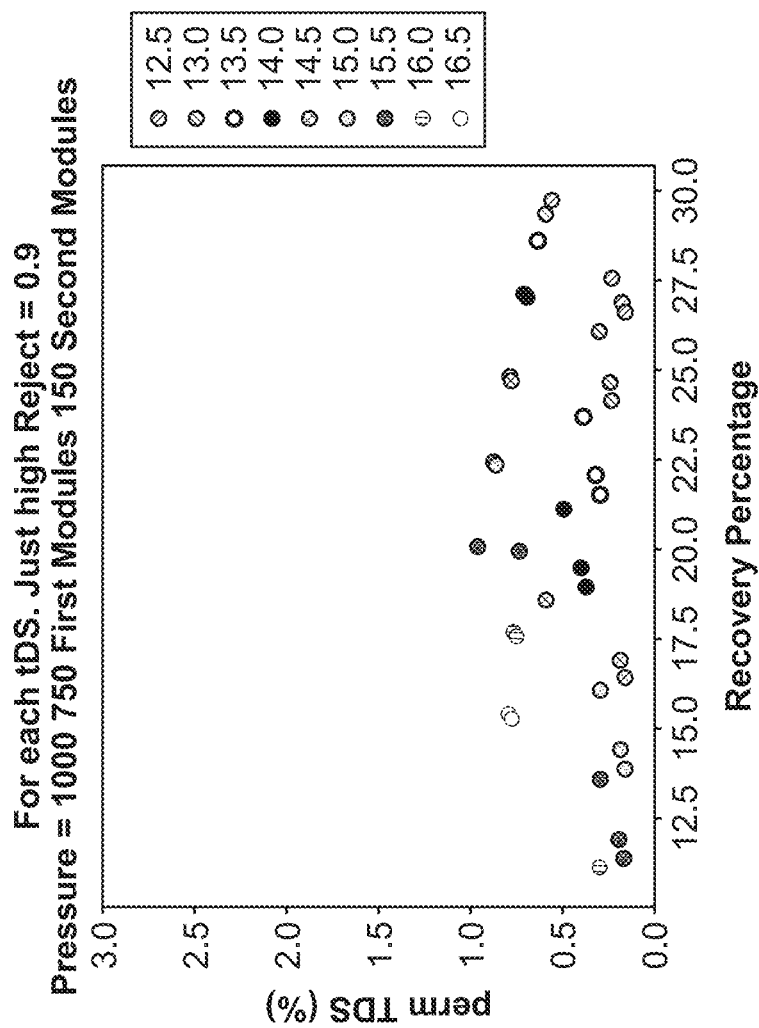
Figure 10:
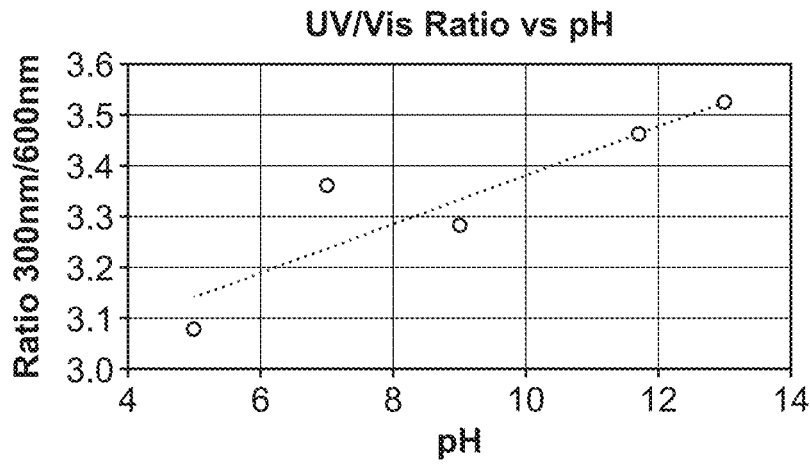
FIG. 10 is a graph showing the UV/Vis ratio versus pH for a graphene oxide dispersion.
Figure 11:
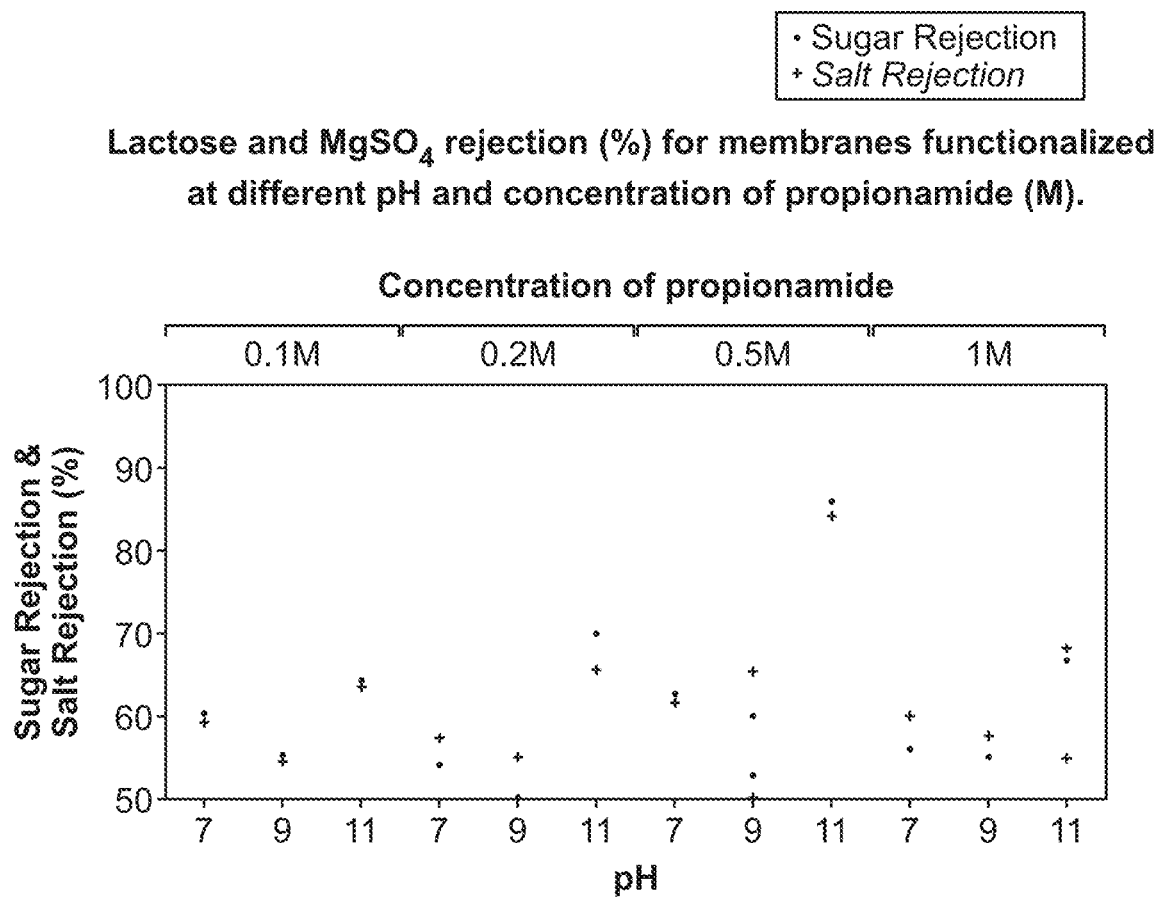
FIG. 11 is a graph showing sugar (lactose) and salt ($MgSO_4$) rejection for membranes functionalized with different concentrations of propionamide and at different pH. Graphene oxide membranes casted from a graphene oxide dispersion at pH 11 outperforms those casted at lower pH, independent of propionamide concentration.
Figure 12:
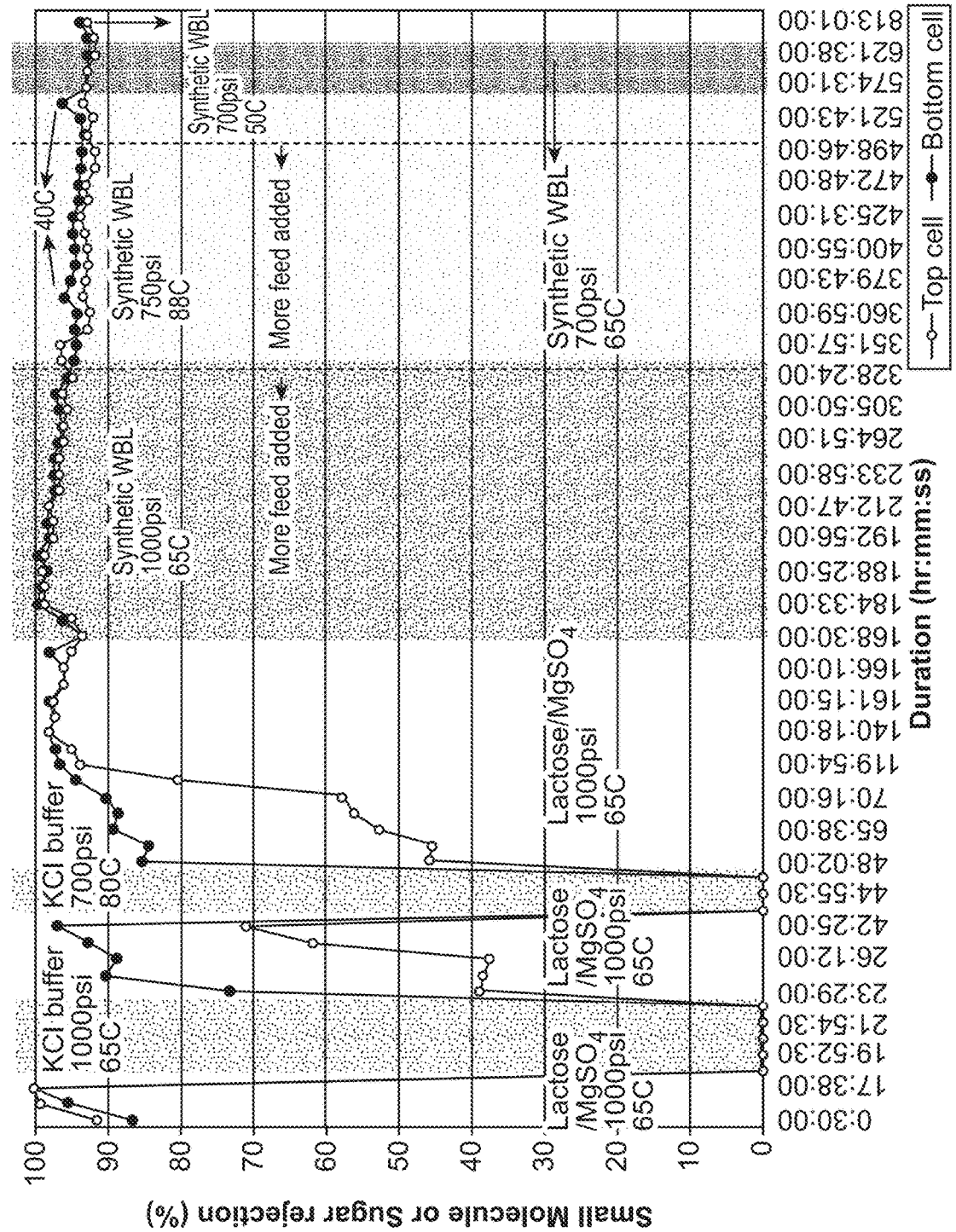
FIG. 12 is a graph showing tangential flow test that has been running for >4 weeks under a myriad of conditions. Initially, performance is benchmarked against the 1 wt % lactose and 0.1 wt % $MgSO_4$ solutions. The first two shaded regions from the left represent exposure to a partial phosphate buffer solution at pH 11.5, temperatures between 65-80° C., and pressures between 700-1000 psi. Small molecule rejection, plotted on the y-axis, does not drop after either exposure to elevated pH. The third shaded region from the left represents a switch from the lactose feed to the synthetic weak black liquor (SWBL) feed which permits running continuously at elevated temperature, pressure, and pH (pH=13). As the condition is oscillated between higher pressure (the third shaded region from the left) and higher temperature (the fourth shaded region from the left), constant performance in terms of small molecule rejection (y-axis) is observed. The SWBL includes 1 wt % Pyrogallol, 0.1 wt % $Na_2SO_4$, 0.61 wt % NaOH, and 0.4 wt % KCl. To produce the SWBL, KCl and NaOH are added to milli-Q water, then Pyrogallol and $Na_2SO_4$ are added sequentially to the mixture.
Figures 15A, 15B, 15C, 15D:
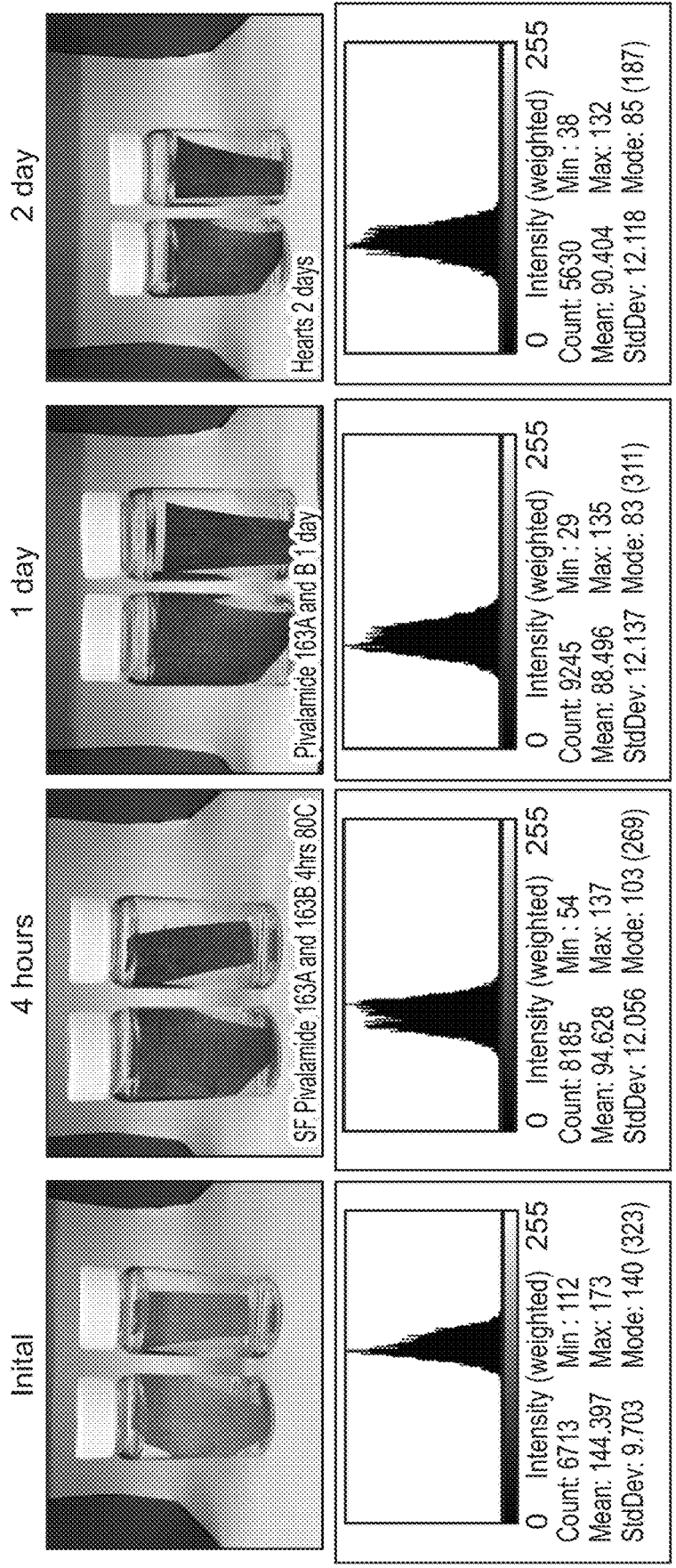
FIGS. 15A-15H are a series of photographs and graphs showing the stability of graphene oxide membranes exposed to partial phosphate buffer at 80° C. and pH 11.5, where the membranes have pivalamide as the chemical spacer. The grayscale mode values are similar from the 4-hour time point to the 7-day time point.
Figures 15E, 15F, 15G, 15H:
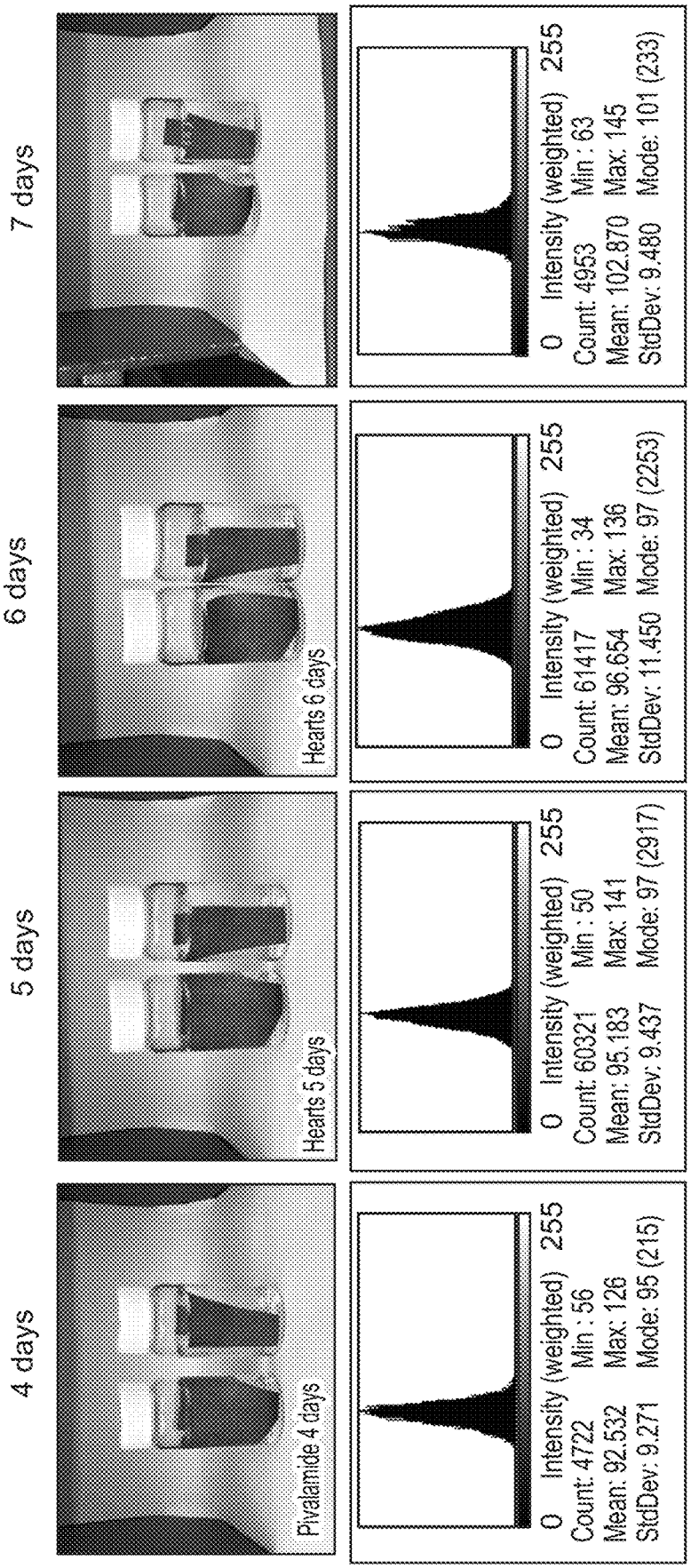

FIG. 4 shows how the composition of this permeate depends on the total strength (% solids) of the feed weak black liquor when the membrane rejects 100% of dissolved organics and divalent anions. The membrane rejects between 80 and 95% of monovalent anions. The lower the permeate TDS, the cleaner and easier it is to reuse the permeate. All membrane systems show low permeate solids for even a broad range of feed dissolved solids.

FIGS. 5A-5D illustrate the effect of different membrane rejections on the permeate quality. Divalent ion rejection varies between 70% and 100%. Within each figure, the monovalent anion rejection is 5 to 20 percentage points lower than the divalent. High rejection membrane designs are very effective at producing clean (<1%, <0.5%, or even <0.1% TDS) permeates. Lower rejecting systems produce even higher recovery percentages due to their reduced osmotic pressure and as can be shown in later figures, further purified by a second pass with the same or higher rejecting membranes.

FIGS. 6A-6D illustrate the range of operating pressures which can be used for the reverse osmosis type weak black liquor concentration using the assumption of an ideal solution (non-dilute). Low pressure (e.g., 800 psi) is not sufficient to produce high recovery ratios unless the liquor is weaker. High pressure (e.g., 1400 psi) can produce very high recovery ratios even with these high rejecting membranes and clean permeates (<0.1% or even 0.05% TDS).

FIGS. 7A-7D illustrate that for a fixed system feed rate, the size of the membranes system (more or less modules) changes the recovery ratio. The recovery ratio relates to the amount and the strength of the concentrate.

Additionally, the solution can pass through two membranes. The permeate from previous FIGS. 4-7D can then be passed between additional membranes to produce an even cleaner permeate. FIGS. 8A-8D shows that very clean permeates can thus be achieved with membranes rejecting only 70% or more of the divalent anions such as sulfate. With very high rejections of divalent (90% to 100%) and monovalent anions (80% to 95%), nearly perfectly clean permeates can be produced from this second membrane system.

FIGS. 8A-8D consider only fixed sizes of membranes systems for this second pass, while FIGS. 9A-9E show that for a fixed first system size (and thus amount of permeate passed to the second system), the size of the second system can be varied to produce high recovery ratios and clean permeates (<1%, <0.5%, or <0.1% TDS). The maximum recovery ratio observed in the bottom panel is set by the size of the first system (750 modules at 1000 psi). These durable membranes can produce high recovery ratios (approaching 50%) and clean permeates.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

As used herein in the specification and in the claims, the term "aspect ratio" can be defined as a ratio of an in-plane lateral dimension to the thickness of the final product. For example, if a graphene oxide sheet has an average lateral dimension of 300 µm and a thickness of 200 nm, the sheet size to thickness ratio, or "aspect ratio" can be defined as 300,000/200, or 1,500.

The terms "substantially," "approximately," and "about" used throughout this Specification and the claims generally mean plus or minus 10% of the value stated, e.g., about 100 would include 90 to 110.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein, the term "graphene oxide sheet" means a single atomic graphene oxide layer or a plurality of atomic graphene oxide layers. Each atomic graphene oxide layer may include out-of-plane chemical moieties attached to one or more carbon atoms on the layer. In some embodiments, the term "graphene oxide sheet" means 1 to about 20 atomic graphene oxide layers, e.g., 1 to about 18, 1 to about 16, 1 to about 14, 1 to about 12, 1 to about 10, 1 to about 8, 1 to about 6, 1 to about 4, or 1 to about 3 atomic graphene oxide layers. In some embodiments, the term "graphene oxide sheet" means 1, 2, or 3 atomic graphene oxide layers.

As used herein, the term "basic" means pH greater than 7.

As used herein, "wt %" refers to weight percent.

As used herein, the term "flux" means flow rate. It describes the permeability of a membrane.

As used herein, the term "optionally substituted" is understood to mean that a given chemical moiety (e.g., an alkyl group) can (but is not required to) be bonded other substituents (e.g., heteroatoms). For instance, an alkyl group that is optionally substituted can be a fully saturated alkyl chain (i.e., a pure hydrocarbon). Alternatively, the same optionally substituted alkyl group can have substituents different from hydrogen. For instance, it can, at any point along the chain be bounded to a halogen atom, a hydroxyl group, or any other substituent described herein. Thus the term "optionally substituted" means that a given chemical moiety has the potential to contain other functional groups, but does not necessarily have any further functional groups. Suitable substituents used in the optional substitution of the described groups include, without limitation, halogen, oxo, —OH, —CN, —COOH, —CH$_2$CN, —O—(C$_1$-C$_6$) alkyl, (C$_1$-C$_6$) alkyl, C$_1$-C$_6$ alkoxy, (C$_1$-C$_6$) haloalkyl, C$_1$-C$_6$ haloalkoxy, —O—(C$_2$-C$_6$) alkenyl, —O—(C$_2$-C$_6$) alkynyl, (C$_2$-C$_6$) alkenyl, (C$_2$-C$_6$) alkynyl, —OH, —OP(O)(OH)$_2$, —OC(O)(C$_1$-C$_6$) alkyl, —C(O)(C$_1$-C$_6$) alkyl, —OC(O)O(C$_1$-C$_6$) alkyl, —NH$_2$, —NH((C$_1$-C$_6$) alkyl), —N((C$_1$-C$_6$) alkyl)$_2$, —NHC(O)(C$_1$-C$_6$) alkyl, —C(O)NH(C$_1$-C$_6$) alkyl, —S(O)$_2$(C$_1$-C$_6$) alkyl, —S(O)NH(C$_1$-C$_6$) alkyl, and —S(O)N((C$_1$-C$_6$) alkyl)$_2$. The substituents can themselves be optionally substituted.

As used herein, the term "hydroxy" or "hydroxyl" refers to the group —OH or —O$^-$.

As used herein, "halo" or "halogen" refers to fluoro, chloro, bromo, and iodo.

The term "carbonyl" includes compounds and moieties which contain a carbon connected with a double bond to an oxygen atom. Examples of moieties containing a carbonyl include, but are not limited to, aldehydes, ketones, carboxylic acids, amides, esters, anhydrides, etc.

The term "carboxyl" refers to —COOH or its C$_1$-C$_6$ alkyl ester.

"Acyl" includes moieties that contain the acyl radical (R—C(O)—) or a carbonyl group. "Substituted acyl" includes acyl groups where one or more of the hydrogen atoms are replaced by, for example, alkyl groups, alkynyl groups, halogen, hydroxyl, alkylcarbonyloxy, arylcarbonyloxy, alkoxycarbonyloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, amino (including alkylamino, dialkylamino, arylamino, diarylamino and alkylarylamino), acylamino (including alkylcarbonylamino, arylcarbonylamino, carbamoyl and ureido), amidino, imino, sulfhydryl, alkylthio, arylthio, thiocarboxylate, sulfates, alkylsulfinyl, sulfonato, sulfamoyl, sulfonamido, nitro, trifluoromethyl, cyano, azido, heterocyclyl, alkylaryl, or an aromatic or heteroaromatic moiety.

The term "alkoxy" or "alkoxyl" includes substituted and unsubstituted alkyl, alkenyl and alkynyl groups covalently linked to an oxygen atom. Examples of alkoxy groups or alkoxyl radicals include, but are not limited to, methoxy, ethoxy, isopropyloxy, propoxy, butoxy and pentoxy groups. Examples of substituted alkoxy groups include halogenated alkoxy groups. The alkoxy groups can be substituted with groups such as alkenyl, alkynyl, halogen, hydroxyl, alkylcarbonyloxy, arylcarbonyloxy, alkoxycarbonyloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, amino (including alkylamino, dialkylamino, arylamino, diarylamino, and alkylarylamino), acylamino (including alkylcarbonylamino, arylcarbonylamino, carbamoyl and ureido), amidino, imino, sulfhydryl, alkylthio, arylthio, thiocarboxylate, sulfates, alkylsulfinyl, sulfonato, sulfamoyl, sulfonamido, nitro, trifluoromethyl, cyano, azido, heterocyclyl, alkylaryl, or an aromatic or heteroaromatic moieties. Examples of halogen substituted alkoxy groups include, but are not limited to, fluoromethoxy, difluoromethoxy, trifluoromethoxy, chloromethoxy, dichloromethoxy and trichloromethoxy.

The term "ester" includes compounds or moieties which contain a carbon or a heteroatom bound to an oxygen atom which is bonded to the carbon of a carbonyl group. The term "ester" includes alkoxycarboxy groups such as methoxycarbonyl, ethoxycarbonyl, propoxycarbonyl, butoxycarbonyl, pentoxycarbonyl, etc.

As used herein, "amino" or "amine," as used herein, refers to a primary (—NH$_2$), secondary (—NHR$_x$), tertiary (—NR$_x$R$_y$), or quaternary amine (—N$^+$R$_x$R$_y$R$_z$), where R$_x$, R$_y$, and R$_z$ are independently an aliphatic, alicyclic, heteroaliphatic, heterocyclic, aryl, or heteroaryl moiety, as defined herein. Examples of amine groups include, but are not limited to, methylamine, dimethylamine, ethylamine, diethylamine, methylethylamine, iso-propylamine, piperidine, trimethylamine, and propylamine. "Alkylamino" includes groups of compounds wherein the nitrogen of —NH$_2$ is bound to at least one alkyl group. Examples of alkylamino groups include benzylamino, methylamino, ethylamino, phenethylamino, etc. "Dialkylamino" includes groups wherein the nitrogen of —NH$_2$ is bound to two alkyl groups. Examples of dialkylamino groups include, but are not limited to, dimethylamino and diethylamino. "Arylamino" and "diarylamino" include groups wherein the nitrogen is bound to at least one or two aryl groups, respectively. "Aminoaryl" and "aminoaryloxy" refer to aryl and aryloxy substituted with amino. "Alkylarylamino," "alkylaminoaryl" or "arylaminoalkyl" refers to an amino group which is bound to at least one alkyl group and at least one aryl group. "Alkaminoalkyl" Refers to an alkyl, alkenyl, or alkynyl group bound to a nitrogen atom which is also bound to an alkyl group. "Acylamino" includes groups wherein nitrogen is bound to an acyl group. Examples of acylamino include, but are not limited to, alkylcarbonylamino, arylcarbonylamino, carbamoyl and ureido groups.

The term "amide" or "aminocarboxy" includes compounds or moieties that contain a nitrogen atom that is bound to the carbon of a carbonyl or a thiocarbonyl group. The term includes "alkaminocarboxy" groups that include alkyl, alkenyl or alkynyl groups bound to an amino group which is bound to the carbon of a carbonyl or thiocarbonyl group. It also includes "arylaminocarboxy" groups that include aryl or heteroaryl moieties bound to an amino group that is bound to the carbon of a carbonyl or thiocarbonyl group. The terms "alkylaminocarboxy", "alkenylaminocarboxy", "alkynylaminocarboxy" and "arylaminocarboxy" include moieties wherein alkyl, alkenyl, alkynyl and aryl moieties, respectively, are bound to a nitrogen atom which is in turn bound to the carbon of a carbonyl group. Amides can be substituted with substituents such as straight chain alkyl, branched alkyl, cycloalkyl, aryl, heteroaryl or heterocycle. Substituents on amide groups may be further substituted.

Unless otherwise specifically defined, the term "aryl" refers to cyclic, aromatic hydrocarbon groups that have 1 to 3 aromatic rings, including monocyclic or bicyclic groups such as phenyl, biphenyl or naphthyl. Where containing two aromatic rings (bicyclic, etc.), the aromatic rings of the aryl group may be joined at a single point (e.g., biphenyl), or fused (e.g., naphthyl). The aryl group may be optionally substituted by one or more substituents, e.g., 1 to 5 substituents, at any point of attachment. Exemplary substituents include, but are not limited to, —H, -halogen, —O—(C$_1$-C$_6$) alkyl, (C$_1$-C$_6$) alkyl, —O—(C$_2$-C$_6$) alkenyl, —O—(C$_2$-C$_6$) alkynyl, (C$_2$-C$_6$) alkenyl, (C$_2$-C$_6$) alkynyl, —OH, —OP(O)(OH)$_2$, —OC(O)(C$_1$-C$_6$) alkyl, —C(O)(C$_1$-C$_6$) alkyl, —OC(O)O(C$_1$-C$_6$) alkyl, NH$_2$, NH((C$_1$-C$_6$) alkyl), N((C$_1$-C$_6$) alkyl)$_2$, —S(O)$_2$—(C$_1$-C$_6$) alkyl, —S(O)NH(C$_1$-C$_6$) alkyl, and —S(O)N((C$_1$-C$_6$) alkyl)$_2$. The substituents can themselves be optionally substituted. Furthermore, when containing two fused rings the aryl groups herein defined may have an unsaturated or partially saturated ring fused with a fully saturated ring. Exemplary ring systems of these aryl groups include, but are not limited to, phenyl, biphenyl, naphthyl, anthracenyl, phenalenyl, phenanthrenyl, indanyl, indenyl, tetrahydronaphthalenyl, tetrahydrobenzoannulenyl, and the like.

Unless otherwise specifically defined, "heteroaryl" means a monocyclic aromatic radical of 5 to 24 ring atoms or a polycyclic aromatic radical, containing one or more ring heteroatoms selected from N, O, or S, the remaining ring atoms being C. Heteroaryl as herein defined also means a bicyclic heteroaromatic group wherein the heteroatom is selected from N, O, or S. The aromatic radical is optionally substituted independently with one or more substituents described herein. Examples include, but are not limited to, furyl, thienyl, pyrrolyl, pyridyl, pyrazolyl, pyrimidinyl, imidazolyl, isoxazolyl, oxazolyl, oxadiazolyl, pyrazinyl, indolyl, thiophen-2-yl, quinolyl, benzopyranyl, isothiazolyl, thiazolyl, thiadiazole, indazole, benzimidazolyl, thieno[3,2-b]thiophene, triazolyl, triazinyl, imidazo[1,2-b]pyrazolyl, furo[2,3-c]pyridinyl, imidazo[1,2-a]pyridinyl, indazolyl, pyrrolo[2,3-c]pyridinyl, pyrrolo[3,2-c]pyridinyl, pyrazolo[3,4-c]pyridinyl, thieno[3,2-c]pyridinyl, thieno[2,3-c]pyridinyl, thieno[2,3-b]pyridinyl, benzothiazolyl, indolyl, indolinyl, indolinonyl, dihydrobenzothiophenyl, dihydrobenzofuranyl, benzofuran, chromanyl, thiochromanyl, tetrahydroquinolinyl, dihydrobenzothiazine, dihydrobenzoxanyl, quinolinyl, isoquinolinyl, 1,6-naphthyridinyl, benzo[de]isoquinolinyl, pyrido[4,3-b][1,6]naphthyridinyl, thieno[2,3-b]pyrazinyl, quinazolinyl, tetrazolo[1,5-a]pyridinyl, [1,2,4]triazolo[4,3-a]pyridinyl, isoindolyl, pyrrolo[2,3-b]pyridinyl, pyrrolo[3,4-b]pyridinyl, pyrrolo[3,2-b]pyridinyl, imidazo[5,4-b]pyridinyl, pyrrolo[1,2-a]pyrimidinyl, tetrahydro pyrrolo[1,2-a]pyrimidinyl, 3,4-dihydro-2H-1$\lambda^2$-pyrrolo[2,1-b]pyrimidine, dibenzo[b,d]thiophene, pyridin-2-one, furo[3,2-c]pyridinyl, furo[2,3-c]pyridinyl, 1H-pyrido[3,4-b][1,4]thiazinyl, benzooxazolyl, benzoisoxazolyl, furo[2,3-b]pyridinyl, benzothiophenyl, 1,5-naphthyridinyl, furo[3,2-b]pyridine, [1,2,4]triazolo[1,5-a]pyridinyl, benzo[1,2,3]triazolyl, imidazo[1,2-a]pyrimidinyl, [1,2,4]triazolo[4,3-b]pyridazinyl, benzo[c][1,2,5]thiadiazolyl, benzo[c][1,2,5]oxadiazole, 1,3-dihydro-2H-benzo[d]imidazol-2-one, 3,4-dihydro-2H-pyrazolo[1,5-b][1,2]oxazinyl, 4,5,6,7-tetrahydropyrazolo[1,5-a]pyridinyl, thiazolo[5,4-d]thiazolyl, imidazo[2,1-b][1,3,4]thiadiazolyl, thieno[2,3-b]pyrrolyl, 3H-indolyl, and derivatives thereof. Furthermore, when containing two fused rings the aryl groups herein defined may have an unsaturated or partially saturated ring fused with a fully saturated ring. Exemplary ring systems of these heteroaryl groups include indolinyl, indolinonyl, dihydrobenzothiophenyl, dihydrobenzofuran, chromanyl, thiochromanyl, tetrahydroquinolinyl, dihydrobenzothiazine, 3,4-dihydro-1H-isoquinolinyl, 2,3-dihydrobenzofuran, indolinyl, indolyl, and dihydrobenzoxanyl. Furthermore, the terms "aryl" and "heteroaryl" include multicyclic aryl and heteroaryl groups, e.g., tricyclic, bicyclic, e.g., naphthalene, benzoxazole, benzodioxazole, benzothiazole, benzoimidazole, benzothiophene, quinoline, isoquinoline, naphthyridine, indole, benzofuran, purine, benzofuran, deazapurine, indolizine.

"Alkyl" refers to a straight or branched chain saturated hydrocarbon. $C_1$-$C_6$ alkyl groups contain 1 to 6 carbon atoms. Examples of a $C_1$-$C_6$ alkyl group include, but are not limited to, methyl, ethyl, propyl, butyl, pentyl, isopropyl, isobutyl, sec-butyl and tert-butyl, isopentyl and neopentyl.

An optionally substituted alkyl refers to unsubstituted alkyl or alkyl having designated substituents replacing one or more hydrogen atoms on one or more carbons of the hydrocarbon backbone. Such substituents can include, for example, alkyl, alkenyl, alkynyl, halogen, hydroxyl, alkylcarbonyloxy, arylcarbonyloxy, alkoxycarbonyloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, amino (including alkylamino, dialkylamino, arylamino, diarylamino and alkylarylamino), acylamino (including alkylcarbonylamino, arylcarbonylamino, carbamoyl and ureido), amidino, imino, sulfhydryl, alkylthio, arylthio, thiocarboxylate, sulfates, alkylsulfinyl, sulfonato, sulfamoyl, sulfonamido, nitro, trifluoromethyl, cyano, azido, heterocyclyl, alkylaryl, or an aromatic or heteroaromatic moiety.

As used herein, "alkenyl" includes unsaturated aliphatic groups analogous in length and possible substitution to the alkyls described above, but that contain at least one double bond. For example, the term "alkenyl" includes straight chain alkenyl groups (e.g., ethenyl, propenyl, butenyl, pentenyl, hexenyl, heptenyl, octenyl, nonenyl, decenyl), and branched alkenyl groups.

An optionally substituted alkenyl refers to unsubstituted alkenyl or alkenyl having designated substituents replacing one or more hydrogen atoms on one or more hydrocarbon backbone carbon atoms. Such substituents can include, for example, alkyl, alkenyl, alkynyl, halogen, hydroxyl, alkylcarbonyloxy, arylcarbonyloxy, alkoxycarbonyloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, amino (including alkylamino, dialkylamino, arylamino, diarylamino and alkylarylamino), acylamino (including alkylcarbonylamino, arylcarbonylamino, carbamoyl and ureido), amidino, imino, sulfhydryl, alkylthio, arylthio, thiocarboxylate, sulfates, alkylsulfinyl, sulfonato, sulfamoyl, sulfonamido, nitro, trifluoromethyl, cyano, heterocyclyl, alkylaryl, or an aromatic or heteroaromatic moiety.

"Alkynyl" includes unsaturated aliphatic groups analogous in length and possible substitution to the alkyls described above, but which contain at least one triple bond. For example, "alkynyl" includes straight chain alkynyl groups (e.g., ethynyl, propynyl, butynyl, pentynyl, hexynyl, heptynyl, octynyl, nonynyl, decynyl), and branched alkynyl groups. In certain embodiments, a straight chain or branched alkynyl group has six or fewer carbon atoms in its backbone (e.g., $C_2$-$C_6$ for straight chain, $C_3$-$C_6$ for branched chain). The term "$C_2$-$C_6$" includes alkynyl groups containing two to six carbon atoms. The term "$C_3$-$C_6$" includes alkynyl groups containing three to six carbon atoms.

As used herein, the term "molecular weight cutoff" refers to at least 90% (e.g., at least 92%, at least 95%, or at least 98%) rejection rate for molecules with molecular weights greater than the cutoff value.

As used herein, the term "room temperature" can refer to a temperature of about 15° C., about 16° C., about 17° C., about 18° C., about 19° C., about 20° C., about 21° C., about 22° C., about 23° C., about 24° C., or about 25° C. In some embodiments, the room temperature is about 20° C.

As used herein, the term "substantially the same" refers to a first value that is within 10% of a second value. For example, if A is substantially the same as B, and B is 100, A can have a value ranging from 90 to 110. If A is substantially the same as B, and B is 200, A can have a value ranging from 180 to 220.

As used herein, the term "grayscale mode value" refers to the mode value of an image recorded using the RGB color model, calculated with the aid of an image processing software (e.g., ImageJ) by first converting the image to grayscale, where each pixel is converted to grayscale using the formula: gray=0.299*red+0.587*green+0.114*blue, and then quantifying the mode of the distribution of the intensity of the pixels.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

EXAMPLES

Example 1. Monofunctionalization with Acrylamide

A graphene oxide membrane was produced with the following procedure: (1) 15 mL of 4 mg/mL graphene oxide sheets was treated with 0.1 mL TEA, 22 mg NHS, and 72 mg EDC. (2) Mixture was incubated at room temperature for 1 hour. (3) A 5 mL aliquot of the mixture was treated with 10.6 mg acrylamide. (4) Resulting mixture was heated at 4 hours in a 65° C. oven. (5) Mixture was cooled to room temperature. (6) Mixture was then casted with a 40-gauge rod onto a substrate, dried, and washed with DMF/Water.

The procedure for durability testing is as follows: (1) cut a 47 to 50 mm disc from the graphene oxide membrane using a razor blade or laser cuter; (2) load the disc with the graphene oxide side up onto a porous stainless steel frit, which is then mounted into a Sterlitech HP4750 filtration cell; (3) add 60 to 100 mL of 1 wt % lactose solution; (4) place the setup on a stir plate at approximately 750 rpm; (4) close the feed chamber and pressurize it to 50 to 100 psi; (5) Collect approximately 15 to 30 mL of permeate of a 1 wt % lactose and 0.1 wt % MgSO$_4$ solution at room temperature using 75 psi of driving pressure and ~500 rpm stir speed; and (6) Membrane is then exposed to partial phosphate buffer at exposure temperature for 4 hours and then tested for sugar and salt rejection again.

The partial phosphate buffer is made by mixing 500 mL of 0.025 M Na$_2$HPO$_4$ (1.77 g in 500 mL) with 111 mL of 0.1 M NaOH (0.444 g in 111 mL). Mixture is either sonicated to dissolve or allowed to rest overnight. Buffer is stored in the 4° C. fridge.

The membrane exhibited durability at an exposure temperature of 80° C.

Example 2. Monofunctionalization with Acrylamide

A graphene oxide membrane was produced with the following procedure: (1) 15 mL of 4 mg/mL graphene oxide sheets was treated with 0.8 mL TEA, 22 mg NHS, and 72 mg EDC. (2) Mixture was incubated at room temperature for 1 hour. (3) A 5 mL aliquot of the mixture was treated with 10.6 mg acrylamide. (4) Resulting mixture was heated at 4 hours in an 80° C. oven. (5) Mixture was cooled to room temperature. (6) Mixture was then casted with a 40-gauge rod onto a substrate, dried, and washed with DMF/Ethanol.

The membrane was evaluated using the durability testing procedure outlined in Example 1. The membrane exhibited an initial lactose rejection rate of 90% and a lactose rejection rate of 88% after exposure to a temperature of 80° C.

Example 3. Monofunctionalization with 2-(4-aminophenyl)ethanol

A graphene oxide membrane was produced with the following procedure: (1) 5 mg CsOH and 10 mg 2-(4-aminophenyl)ethanol were dissolved in 0.2 mL of water. (2) Mixture was added to 3 mL of 4 mg/mL graphene oxide sheets. (3) Resulting mixture was heated for 2 hours in a 60° C. oven followed by 19 hours in an 80° C. oven. (4) Mixture was cooled to room temperature. (5) Mixture was then casted with a 40-gauge rod onto a substrate and dried.

The membrane was evaluated using the durability testing procedure outlined in Example 1. The membrane exhibited an initial lactose rejection rate of 84% and a lactose rejection rate of 83% after exposure to a temperature of 50° C.

Example 4. Monofunctionalization with 4-aminophenethyl alcohol

A graphene oxide membrane was produced with the following procedure: (1) Mix 10 mL (4 mg/mL) graphene oxide sheets with 5 mL 1 M HCl. (2) Add 42 mg 4-aminophenethyl alcohol to the mixture. (3) Dissolve 69 mg NaNO$_2$ in 2 mL water and add the NaNO$_2$ solution dropwise to the graphene oxide mixture. (4) Stir overnight. (5) Centrifuge for 5 minutes at 5000 rpm, decant the supernatant, and replace with clean water. (6) Step (5) was repeated for a total of 3 times. (7) Mixture was vortexed, casted with a 40-gauge rod onto a substrate, and dried.

The membrane was evaluated using the durability testing procedure outlined in Example 1. The membrane exhibited an initial lactose rejection rate of 80% and a lactose rejection rate of 53% after exposure to a temperature of 50° C.

Example 5. Monofunctionalization with 4-aminobenzoic acid

A graphene oxide membrane was produced with the following procedure: (1) Mix 10 mL (4 mg/mL) graphene oxide sheets with 5 mL 1 M HCl. (2) Add 46 mg 4-aminobenzoic acid to the mixture. (3) Dissolve 69 mg NaNO$_2$ in 2 mL water and add the NaNO$_2$ solution dropwise to the graphene oxide mixture. (5) Centrifuge for 5 minutes at 5000 rpm. (6) Rinse 3 times with water and one time with ethanol.

The membrane was evaluated using the durability testing procedure outlined in Example 1. The membrane exhibited an initial lactose rejection rate of 82% and a lactose rejection rate of 75% after exposure to a temperature of 50° C.

Example 6. Pretreatment Flux Improvement

Flux is measured during filtration tests with 1 wt % lactose and 0.1 wt % MgSO$_4$ before and after exposure to elevated temperature and pH. On average, fluxes range between 0.3-0.6 gallons per square foot per day (GFD) with a feed pressure of 75 pounds per square inch (psi). A large increase in flux was observed after exposure to partial phosphate buffer (PPB), pH 11.5, at 80° C. for 4 hours (elevated pH and temp conditions).

Table 1 summarizes the results of the fluxes before and after exposure to various conditions. A flux improvement of ~1.8× is observed by increasing the temperature from 25° C. to 50° C. (Table 1, Entry 1). There is no additional flux improvement observed after increasing the temperature from 50° C. to 80° C. (Table 1, Entry 2). In both Entry 1 and 2 the exposure to elevated temperate is done with the 1 wt % lactose and 0.1 wt % MgSO$_4$ feedstock, and fluxes are measured at the temperatures specified in Table 1. By comparison, the combination of elevated temperature and pH affords a ~6× flux improvement (Table 1, Entry 3) which is not lost after the temperature decreases back to 25° C.

During the exposure to PPB at 80° C., the flux reaches 36 GFD, a ~72× improvement from the initial flux at 25° C. These results suggest exposure to elevated temperature will enable a finite flux improvement, and exposure to high pH enhances flux ~3× more than elevated temperate alone. All the membranes discussed in this example and referenced in Table 1 meet a minimum lactose rejection of 50%.

TABLE 1

| | Exposure Conditions | Initial Flux (GFD) | Final Flux (GFD) | Flux Improvement |
|---|---|---|---|---|
| Entry 1 | 25° C., 50° C. | 0.36 (25° C.) | 0.65 (50° C.) | 1.8× |
| Entry 2 | 50° C., 80° C. | 1.08 (50° C.) | 1.18 (80° C.) | None |
| Entry 3 | 80° C., pH 11.5, 4 hours | 0.48 (25° C.) | 2.84 (25° C.) | 6× |

Example 7. Pressure Durability

The durability of a graphene oxide membrane at high pressure was evaluated. A graphene oxide membrane was disposed on a 120 μm thick polyethersulfone support substrate, and was tested with a 1 wt % lactose and 0.1 wt % $MgSO_4$ solution at a temperature of 80° C. and a pressure of 1000 psi for several weeks. For testing purposes, the support substrate is mounted on a standard tricot permeate carrier (e.g. 0.012 inches thick, ~5 oz/sq yard, and 50 wales and 48 courses per inch).

Table 2 summarizes the results of the support substrate on the durability of the membrane under high pressure conditions.

TABLE 2

| | | Immediately under the graphene oxide membrane | |
|---|---|---|---|
| | | PES (~120 μm thick) | PTFE on PP (~250 μm thick) |
| Further Support Layer | PES (120 μm) | Stable for weeks at 1000 psi and 80° C. | |
| | PTFE on PP (~250 μm) | Stable for weeks at 1000 psi and 80° C. | Stable at 1000 psi for several days to weeks. Fails with elevated temperature. |
| | Nothing | Fails immediately or after a few days at 1000 psi | Fails at few hundred psi within a few days even at room temp. |

TABLE 3

| | | Summary of estimated composite modulus | |
|---|---|---|---|
| | | Immediately under GO | |
| | | PES (~120 μm thick) | PTFE on PP (~250 μm thick) |
| Further Support Layer | PES (120 μm) | 2 GPa; 240 μm thick | 1 GPa; 360 μm thick |
| | PTFE on PP (~250 μm) | 1.0 GPa; 360 μm thick | 0.8 GPa; 250 μm thick |
| | Nothing | 2 GPa; 120 μm thick | 0.8 GPa; 250 μm thick |

Example 8. Quantification of Membrane Color

The color of a graphene oxide membrane was characterized by recording images of the graphene oxide membrane and quantifying its grayscale mode value. Images of the graphene oxide membrane were collected in a lightbox with dimensions 9.4×9.1×8.7" and two rows of 20 white LEDs on the top front and rear edge of the lightbox. Samples of the graphene oxide membrane being photographed were placed in the center of the lightbox, and images were captured at a roughly 90° angle between camera lens, object, and LED light source. Data presented was averaged over multiple samples. Color was be quantified using image processing software (e.g., ImageJ) by converting the relative intensity of each pixel in the images from the additive color model RGB to gray scale, and comparing the intensity of the resulting signals plotted as a pixel histogram. Each gray scale pixel histogram displayed the distribution of gray values for each image with the x-axis representing possible gray values (0-255) and the y-axis representing the number of pixels found at each gray value. The grayscale mode value was calculated from the histogram, with gray values closer to zero corresponding to darker images, and gray values closer to 255 correspond to lighter images.

FIGS. 13A-15H show the quantification results using the method described above.

What is claimed is:

1. A filtration apparatus for processing a black liquor feed, comprising:
   a support substrate; and
   a graphene oxide membrane disposed on the support substrate, the graphene oxide membrane including a plurality of graphene oxide sheets, each of the graphene oxide sheets covalently coupled to a chemical spacer, wherein:
      the chemical spacer comprises an amine or a derivative thereof, the amine being 4-aminophenylacetic acid or 2-(4-aminophenyl) ethanol;
      each of the graphene oxide sheets is not covalently crosslinked to other graphene oxide sheets from the plurality of graphene oxide sheets; and
      the graphene oxide membrane has a lignin rejection rate of at least 50% with a black liquor feed containing 10 wt. % total dissolved solids at a temperature of at least 50° C. and a pressure of at least 200 psi.

2. The filtration apparatus of claim 1, wherein the black liquor feed comprises sodium sulfate, sodium carbonate, sodium hydrosulfide, sodium thiosulfate, sodium hydroxide, or a combination thereof.

3. The filtration apparatus of claim 2, wherein the graphene oxide membrane has a rejection rate on a total solid basis of at least 75%.

4. The filtration apparatus of claim 2, wherein the graphene oxide membrane has a rejection rate of sodium of at least 50%.

5. The filtration apparatus of claim 1, wherein the chemical spacer further comprises an amide or a derivative thereof.

6. The filtration apparatus of claim 5, wherein the chemical spacer comprises —NH—C(O)—$R_2$, wherein $R_2$ is $C_1$-$C_6$ alkyl or $C_2$-$C_6$ alkenyl, each of which can be optionally substituted.

7. The filtration apparatus of claim 5, wherein the amide is acrylamide, propionamide, isobutyramide, or pivalamide.

8. The filtration apparatus of claim 1, wherein the black liquor feed has a pH of about 11.

9. A filtration apparatus, comprising:
a support substrate; and
a graphene oxide membrane disposed on the support substrate, the graphene oxide membrane including a plurality of graphene oxide sheets, each of the graphene oxide sheets covalently coupled to a chemical spacer, wherein:
the chemical spacer comprises an amine or a derivative thereof, the amine being 4-aminophenylacetic acid or 2-(4-aminophenyl) ethanol;
each of the graphene oxide sheets is not covalently crosslinked to other graphene oxide sheets from the plurality of graphene oxide sheets; and
the graphene oxide membrane has a recovery ratio of at least 45% when the graphene oxide membrane is contacted with a black liquor solution containing at least 10 wt. % total dissolved solids at a predetermined pressure.

10. The filtration apparatus of claim 9, wherein the black liquor solution comprises lignin, sodium sulfate, sodium carbonate, sodium hydrosulfide, sodium thiosulfate, sodium hydroxide, or a combination thereof.

11. The filtration apparatus of claim 10, wherein the graphene oxide membrane has a lignin rejection rate of at least 50%.

12. The filtration apparatus of claim 9, wherein the graphene oxide membrane has a rejection rate of sodium of at least 50%.

13. The filtration apparatus of claim 9, wherein the chemical spacer further comprises an amide or a derivative thereof.

14. The filtration apparatus of claim 13, wherein the chemical spacer comprises —NH—C(O)—$R_2$, wherein $R_2$ is $C_1$-$C_6$ alkyl or $C_2$-$C_6$ alkenyl, each of which can be optionally substituted.

15. The filtration apparatus of claim 13, wherein the amide is acrylamide, propionamide, isobutyramide, or pivalamide.

16. The filtration apparatus of claim 9, wherein the black liquor solution has a pH of about 11.

* * * * *